(12) United States Patent
Cypher

(10) Patent No.: US 7,814,278 B2
(45) Date of Patent: Oct. 12, 2010

(54) MULTI-NODE SYSTEM WITH RESPONSE INFORMATION IN MEMORY

(75) Inventor: Robert E. Cypher, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1693 days.

(21) Appl. No.: 10/813,857

(22) Filed: Mar. 31, 2004

(65) Prior Publication Data

US 2004/0260889 A1 Dec. 23, 2004

Related U.S. Application Data

(60) Provisional application No. 60/461,986, filed on Apr. 11, 2003.

(51) Int. Cl.
G06F 12/00 (2006.01)
G06F 13/00 (2006.01)
(52) U.S. Cl. ................ 711/141; 711/100; 711/154
(58) Field of Classification Search ........... 711/141, 711/100, 118, 154
See application file for complete search history.

(56) References Cited

U.S. PATENT DOCUMENTS

| | | | |
|---|---|---|---|
| 5,434,993 A * | 7/1995 | Liencres et al. | ............ 711/133 |
| 5,761,721 A | 6/1998 | Baldus et al. | |
| 5,802,582 A | 9/1998 | Ekanadham et al. | |
| 6,088,768 A | 7/2000 | Baldus et al. | |
| 6,209,064 B1 | 3/2001 | Weber | |

OTHER PUBLICATIONS

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wisc.edu/multifacet/papers/tpds02_lamport.pdf.

"Multicast Snooping: A New Coherence Method Using a Multicast Address Network", Bilir, et al, *The 26th International Symposium on Computer Architecture*, IEEE, Atlanta, GA, May 2-4, 1999, http://csdl.computer.org/comp/proceedings/isca/1999/0170/00/01700294abs.htm.

"Architecture and Design of AlphaServer GS320", Gharachorloo, et al, *ACM Sigplan Notices*, vol. 35, Issue 11, Nov. 2000, http://portal.acm.org/citation.cfm?id=356991&dl=ACM&coll=portal.

(Continued)

*Primary Examiner*—Tuan V. Thai
(74) *Attorney, Agent, or Firm*—Meyertons, Hood, Kivlin, Kowert & Goetzel, P.C.

(57) ABSTRACT

A system may include several nodes coupled by an inter-node network. Each node includes several active devices, a memory subsystem, and an address network and a data network respectively configured to convey address packets and data packets between the active devices and the memory subsystem. The memory subsystem included in one of the nodes is configured to maintain a response indication indicating whether the memory subsystem should send a data packet corresponding to a coherency unit in response to receiving an address packet requesting an access right to the coherency unit from an active device in the same node. The node is also configured to store a node identifier for the coherency unit. The node identifier identifies which of the nodes that has the coherency unit is in a modified global access state.

48 Claims, 43 Drawing Sheets

OTHER PUBLICATIONS

"View Caching: Efficient Software Shared Memory for Dynamic Computations", Karamcheti, et al, *11th International Parallel Processing Symposium*, Geneva, Switzerland, Apr. 1-5, 1997, http://ipdps.eece.unm.edu/1997/s13/318.pdf.

"Cache-Coherent Distributed Shared Memory: Perspectives on Its Development and Future Challenges", Hennessy, et al, *Proceedings of the IEEE*, vol. 87, Issue 3, Mar. 1999, ISSN 0018-9219, http://cva.stanford.edu/cs99s/papers/hennessy-cc.pdf.

"Survey on Cache Coherence in Shared & Distributed Memory Multiprocessors", Garg, et al, Online, http://www.cse.psu.edu/~cg530/proj03/cache_coherence.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture* (*HPCA-8*), Cambridge, MA, Feb. 2-6, 2002.

"Timestamp Snooping: An Approach for Extending SMPs", Martin, et al., *9th International Conference on Architectural Support for Programming Languages and Operating Systems* (*ASPLOS-IX*), Cambridge, MA, Nov. 13-15, 2000.

\* cited by examiner

| Address 602 | Client 1 604 | Client 2 606 | Client 3 608 | Client 4 610 | Client 5 612 | Owner 614 |
|---|---|---|---|---|---|---|
| Aa | — | — | M | — | — | Client 3 |
| Ab | — | — | M | — | — | Client 3 |
| Ac | — | — | M | — | — | Client 3 |
| Ad | O | — | S | S | — | Client 1 |
| Ae | S | — | S | S | — | None |
| Af | S | — | O | — | — | Client 3 |
| Ag | — | — | — | M | — | Client 4 |
| . . . | . . . | . . . | . . . | . . . | . . . | . . . |

Fig. 4

| Address 602 | Client 1 604 | Client 2 606 | Client 3 608 | Client 4 610 | Client 5 612 | Owner 614 |
|---|---|---|---|---|---|---|
| Aa | — | — | W | — | — | Client 3 |
| Ab | — | — | W | — | — | Client 3 |
| Ac | — | — | W | — | — | Client 3 |
| Ad | R | — | R | R | — | Client 1 |
| Ae | R | — | R | R | — | None |
| Af | R | — | R | — | — | Client 3 |
| Ag | — | — | — | W | — | Client 4 |
| . . . | . . . | . . . | . . . | . . . | . . . | . . . |

*Fig. 4A*

| Packet Type | Full Name | Address Space | | Description |
|---|---|---|---|---|
| | | Cacheable | I/O | |
| RTS | ReadToShare | Y | | Requests read-only copy of cache line |
| RTO | ReadToOwn | Y | | Requests writable copy of cache line |
| RTWB | ReadToWriteBack | Y | | Requests to receive writable copy of cache line and send cache line to memory |
| RS | ReadStream | Y | | Request read-once copy of cache line |
| WS | WriteStream | Y | | Request to write entire cache line and send to memory |
| WB | WriteBack | Y | | Request to send cache line from owning device to memory, device does not keep copy |
| WBS | WriteBackShared | Y | | Request to send cache line from owning device to memory, device keeps read-only copy |
| RIO | ReadIO | | Y | Request to read IO locations |
| WIO | WriteIO | | Y | Request to write IO locations |
| INT | Interrupt | | | Sends an interrupt, target is specified by address |

Fig. 7

| Transaction Type | Initiator Receives | Initiator Sends |
|---|---|---|
| RTS | DATA | |
| RTO | DATA | |
| RTWB | DATA & PRN | DATA |
| RS | DATA | |
| WS | ACK & PRN | DATA |
| WB | PRN | DATA or NACK |
| WBS | PRN | DATA or NACK |

Fig. 8

| Transaction Type | Initiator Receives | Initiator Sends |
|---|---|---|
| RIO | DATA | |
| WIO | PRN | DATA |
| INT | PRN or NACK | DATA or Nothing |

Fig. 9

| Access Rights Symbol | Access Rights Name | Description | Data Present? |
|---|---|---|---|
| W | Write | Read and Write | Yes |
| A | All-Write | Write-only, must write entire cache line | Yes (or ACK) |
| R | Read | Read-only | Yes |
| T | Transient-Read | Read-only, read can be reordered | Yes |
| I | Invalid | No access rights | Yes or No |

Fig. 10A

| Ownership Status Symbol | Ownership Status Name | Description | Data Present? |
|---|---|---|---|
| O | Owner | Owns cache line | Yes or No |
| N | Not Owner | Does not own cache line | Yes or No |

Fig. 10B

| Access Right | Ownership Status |
|---|---|
| W | O |
| R | O |
| I | O |
| W | N |
| A | N |
| R | N |
| T | N |
| I | N |

Fig. 10C

| Transaction Type | New Owner |
|---|---|
| RTS | Previous Owner |
| RTO | Initiator |
| RTWB | Memory |
| RS | Previous Owner |
| WS | Memory |
| WB | Memory (or Previous Owner) |
| WBS | Memory (or Previous Owner) |
Fig. 11
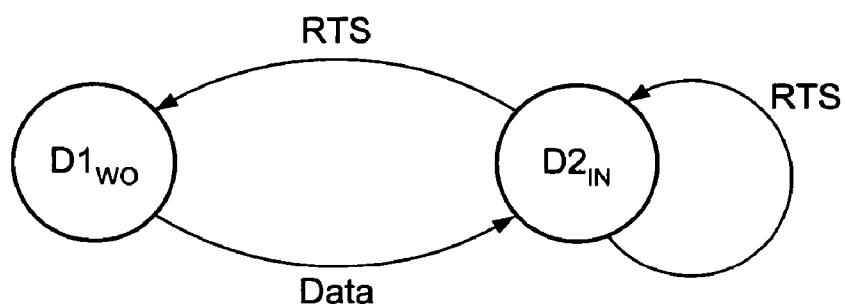
Fig. 12A
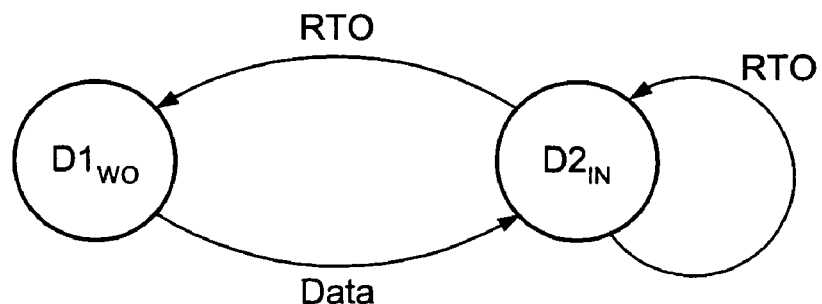
Fig. 12B

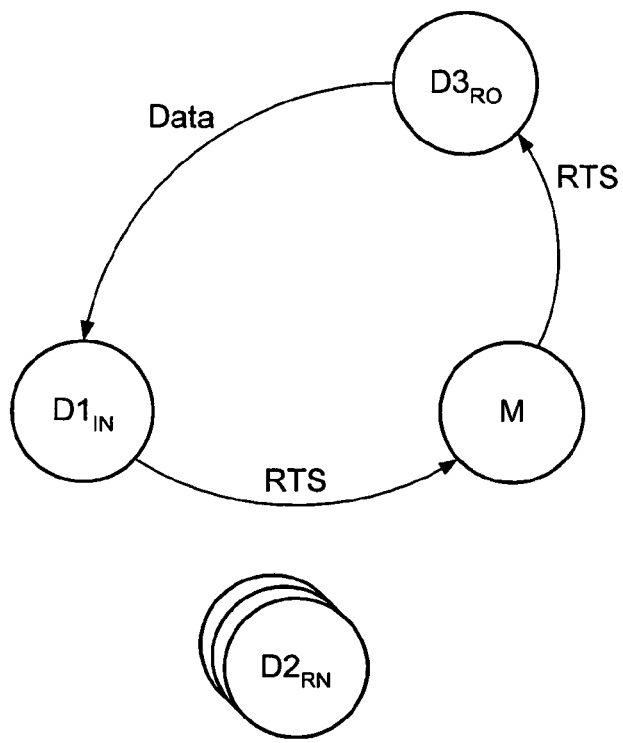
*Fig. 13E*
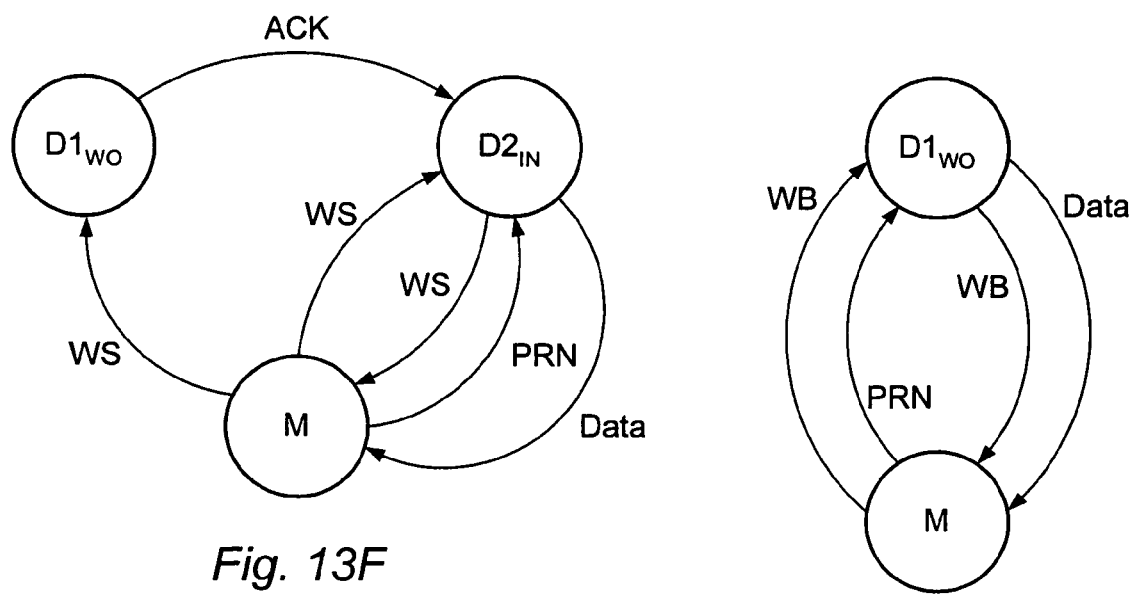
*Fig. 13F*
*Fig. 13G*

| State | Description |
|---|---|
| WOfh | Waiting for WAIT and ACK for local WS, has write access and ownership |
| WO | Stable state with write access and ownership |
| ROfh | Waiting for WAIT and ACK for local WS, has read access and ownership |
| ROe | Waiting for DATA for local RTO, has read access and ownership |
| ROde | Waiting for INV and DATA for local RTO, has read access and ownership |
| ROd | Waiting for INV for local RTO, has read access and ownership |
| ROce | Waiting for WAIT and DATA for local RTO, has read access and ownership |
| RO | Stable state with read access and ownership |
| IOe | Waiting for DATA for local RTO, has no access rights, has ownership |
| IOde | Waiting for INV and DATA for local RTO, has no access rights, has ownership |
| IOd | Waiting for INV for local RTO, has no access rights, has ownership |
| WNj | Able to send DATA/NACK for local WB/WBS, has write access and no ownership |
| WNi | Able to send DATA for local RTWB, write access, no ownership |
| WNh | Waiting for ACK for local WS, has write access, no ownership |
| WNe | Waiting for WAIT for local RTO, has write access, no ownership |
| WN | Stable state with write access, no ownership (caused by foreign transaction that took ownership, but for which no copyback has yet been performed) |
| ANi | Able to send DATA for local WS after performing write to entire cache line, no ownership |
| RNj | Able to send DATA/NACK for local WB/WBS, has read access and no ownership |
| RNh | Waiting for ACK for local WS, has read access, no ownership |
| RNg | Waiting for INV for local WS, has read access, no ownership |
| RNe | Waiting for DATA for local RTO, has read access, no ownership |
| RNde | Waiting for INV and DATA for local RTO, has read access, no ownership |
| RNd | Waiting for INV for local RTO, has read access, no ownership |
| RNce | Waiting for WAIT and DATA for local RTO, has read access, no ownership |
| RNcd | Waiting for WAIT and INV for local RTO, has read access, no ownership |
| RN | Stable state with read access, no ownership |
| TN | Performing read(s), which may be reordered, for local RTS or RS, no ownership |
| INk | Waiting for RTO, RTWB, WS, WB or WBS after receiving an ERR or ERRL. No access rights, no ownership |
| INj | Able to send DATA/NACK for local WB/WBS, has no access and no ownership |
| INh | Waiting for ACK for local WS or for DATA for local RTWB, has no access rights, no ownership |
| INg | Waiting for INV for local WS or for INV for local RTWB, has no access rights, no ownership |
| INe | Waiting for DATA for local RTO, has no access rights, no ownership |
| INde | Waiting for INV and DATA for local RTO, has no access rights, no ownership |
| INd | Waiting for INV for local RTO, has no access rights, no ownership |
| INce | Waiting for WAIT and DATA for local RTO, has no access rights, no ownership |
| INcd | Waiting for WAIT and INV for local RTO, has no access rights, no ownership |
| INa | Waiting for DATA for local RTS, DATA may grant read access, has no access rights, no ownership |
| IN | Stable state with no access rights, no ownership |

Fig. 15A

| Action Code | Meaning | Comments |
|---|---|---|
| /a | Commit to send an ACK packet as a copyback by appending an entry for the received foreign packet in a copyback list. Set copy tag to I. | ACK packet may be sent from any state that allows copyback packets to be sent. It must be sent within a finite time of first entering such a state, regardless of what other packets have been received. |
| c/ | Commit to send DATA and/or ACK packets for all outstanding copybacks for this cache line. Next, set copy tag to W. Then, perform state transition based on current state & local packet being received | If sending copybacks changes the state from a state X to a state Y, the local packet being received will be received in state Y (and as a result, the entry for state Y in the table must be consulted to determine the state transition caused by receiving the local packet). |
| /d | Commit to send DATA packet for local RTWB, WS, WB, or WBS transaction. DATA packet is sent in response to receiving a PRN packet for this transaction. | DATA packet may not be sent until a PRN packet is received. It must be sent within finite time of receiving the PRN packet & having entered a state that permits the packet to be sent, regardless of what other packets have been received. |
| e/ | Clear outstanding copyback commitments for this line by removing them from the copyback list. Do not send DATA or ACK packets for entries that were on the copyback list. Next, perform state transition based on current state & local packet being received. | The action code is used in response to receiving an ERR or ERRL packet. If an ERR packet was received in place of a PR or PRACK packet, or if an ERRL packet was received in place of a DATAP packet, a DATA packet may be sent to the error device. |
| /i | Commit to send a DATA packet as a copyback by appending an entry for the received foreign packet in the copyback list. Set copy tag to I. | DATA packet may be sent from any state that allows copyback packets to be sent. It must be sent within finite time of first entering such a state, regardless of what other packets have been received. |
| /j | Set write tag to I. | |
| /n | Commit to send NACK packet for local WB or WSB transaction & set write tag to W. NACK packet is sent in response to receiving a PRN packet for this transaction. | NACK packet may be sent at any time after receiving the PRN packet. It must be sent within finite time of receiving the PRN packet, regardless of what other packets have been received. |
| /r | Commit to send DATA packet as a copyback by appending an entry for the received foreign packet in the copyback list. If copy tag is W, set copy tag to R. | DATA packet may be sent from any state that allows copyback packets to be sent. It must be sent within finite time of first entering such a state, regardless of what other packets have been received. |
| /s | Set write tag to R. | |
| /w | Commit to send DATA packet as a copyback by appending an entry for the received foreign packet in the copyback list. | DATA packet may be sent from any state that allows copyback packets to be sent. It must be sent within finite time of first entering such a state, regardless of what other packets have been received. |
| /y | If copy tag is R, set copy to I. | Used to record invalidating transactions while a copyback for a foreign memory remap is pending. |
| /z | If write tag is R, set write to I. | Used to record invalidating transactions while a local WBS transaction is pending. |

| Old State | Receive | | | | | | | Send DATA or ACK copyback packet | | |
|---|---|---|---|---|---|---|---|---|---|---|
| | RS | RTS | RTO/RTWB | WS | INV | MRM | MDM | Copy tag W | Copy tag R | Copy tag I |
| WOfh | /w | /r | WNh/i | WNh/a | | ▓ | ▓ | ROfh | ▓ | ▓ |
| WO | /w | /r | WN/i | WN/a | /z | WN/r | WN/i | RO | | ▓ |
| ROfh | /w | /r | RNh/i | RNh/a | | ▓ | ▓ | | | ▓ |
| ROe | /w | /r | RNe/i | RNe/a | IOe | RNe/r | RNe/i | /// | /// | ▓ |
| ROde | /w | /r | RNde/i | RNde/a | IOde | ▓ | ▓ | | /// | ▓ |
| ROd | /w | /r | RNd/i | RNd/a | | ▓ | ▓ | | /// | ▓ |
| ROce | /w | /r | RNce/i | RNce/a | | ▓ | ▓ | | | ▓ |
| RO | /w | /r | RN/i | RN/a | /z | RN/r | RN/i | | | ▓ |
| IOe | /w | /r | INe/i | INe/a | | INe/r | INe/i | /// | /// | ▓ |
| IOde | /w | /r | INde/i | INde/a | | ▓ | ▓ | | /// | ▓ |
| IOd | /w | /r | INd/i | INd/a | | ▓ | ▓ | | /// | ▓ |
| WNi | | | | | | | | ▓ | ▓ | ▓ |
| WNh | | | | | | | | ▓ | RNh | INh |
| WNc | | | ▓ | ▓ | | ▓ | ▓ | | | |
| WNj | | | /yz | /yz | /z | | /yz | | RNj | INj |
| WN | | | /y | /y | /z | | /y | | RN | IN |
| ANi | | | | | | | | ▓ | ▓ | ▓ |
| RNh | | | | | INh | | | | | INh |
| RNg | | | ▓ | ▓ | | ▓ | ▓ | | | |
| RNe | | | /y | /y | INe | | /y | /// | /// | ▓ |
| RNde | | | ▓ | ▓ | INde | ▓ | ▓ | | /// | ▓ |
| RNd | | | ▓ | ▓ | | ▓ | ▓ | | /// | ▓ |
| RNce | | | ▓ | ▓ | INce | ▓ | ▓ | | | INce |
| RNcd | | | ▓ | ▓ | | ▓ | ▓ | | ▓ | ▓ |
| RNj | | | INj | INj | INj | | INj | | | INj |
| RN | | | IN | IN | IN | | IN | | | IN |
| TN | | | | | | | | ▓ | ▓ | ▓ |
| INh | | | | | | | | | | |
| INg | | | ▓ | ▓ | | ▓ | ▓ | | | |
| INe | | | /y | /y | | | /y | /// | /// | ▓ |
| INde | | | ▓ | ▓ | | ▓ | ▓ | | /// | ▓ |
| INd | | | ▓ | ▓ | | ▓ | ▓ | | /// | ▓ |
| INce | | | ▓ | ▓ | | ▓ | ▓ | | | ▓ |
| INcd | | | ▓ | ▓ | | ▓ | ▓ | | ▓ | ▓ |
| INk | | | | | | ▓ | ▓ | | | |
| INj | | | | | | | | | | |
| INa | | | IN | IN | IN | | IN | | | |
| IN | | | | | | | | | | |

Fig. 15D

| gTag | Description |
|---|---|
| gM | The maximum access right within the node is Write Access |
| gS | The maximum access right within the node is Read Access. No client device in the node can have Write Access. |
| gI | The maximum access right within the node is Invalid Access. No client device in the node can have Read or Write Access. |

*Fig. 21*

| Packet Type | Full Name | Address Space | | Description |
|---|---|---|---|---|
| | | Cacheable | I/O | |
| PRTS | Proxy RTS | Y | | Request from an interface in a gS or gi node in response to a RTS request from another node |
| PRTSM | Proxy RTS Modified | Y | | Request from an interface in a gM node in response to a RTS request from another node |
| PRTOM | Proxy RTO Modified | Y | | Request from an interface in a gM node in response to a RTO request from another node |
| PRTO | Proxy ReadToOwn | Y | | Request from an interface in response to a RTO request from another node |
| PU | Proxy Upgrade | Y | | Request from an interface asking memory to supply data for an outstanding RTO |
| PDU | ProxyDataUpgrade | Y | | Request from an interface asking memory to update gTag to gM; interface supplies data for an outstanding RTO |
| PRSM | Proxy ReadStream Modified | Y | | Request from an interface in a gM node in response to RS request from another node |
| PIM | ProxyInvalidate Modified | Y | | Request from an interface in a gM node to invalidate data in caches and memory |
| PI | ProxyInvalidate | Y | | Request from an interface in a gS or gI node to invalidate data in caches and memory |
| PMR | ProxyMemoryRead | Y | | Request from an interface to memory to read coherency state(s) and data or meta-data |
| PMW | ProxyMemoryWrite | Y | | Request from an interface to memory to write coherency state(s) and data or meta-data |

Fig. 22

| Packet Type | Full Name | Description |
|---|---|---|
| DATAM | Data-Meta | Data packet containing data and coherence state information |
| DATAN | Data-NoPull | Data packet sent in response to PRTSM indicating no PRN will be coming |
| REP | Report | Report from memory to an interface indicating a transaction to be handled by the interface |

Fig. 23

| Subtransaction | Preexisting Global Access State | New Global Access State |
|---|---|---|
| PRTSM | Modified | Shared |
| PRTOM | Modified | Invalid |
| PRTO | Shared, Invalid | Invalid |
| PU | Shared | Modified |
| PDU | Shared, Invalid, Modified | Modified |
| PRSM | Modified | Unchanged |
| PIM | Modified | Invalid |
| PI | Shared, Invalid | Invalid |
| PMR | Shared, Invalid, Modified | Unchanged |
| PMW | Shared, Invalid, Modified | Equal to new global access state specified in DATAM packet |

*Fig. 24*

| Response Info | Coherence State | Home Memory Subsystem Action |
|---|---|---|
| No | gM | BC Mode-- Allow owning device to respond. PTP Mode-- Forward response to owning device |
| No | gS | Send REP packet to interface if write access requested |
| No | gI | Send REP packet to interface |
| Yes | gM | Respond with copy of the requested coherency unit |

Fig. 35

| Response Info | Memory Subsystem's Action |
|---|---|
| mN | Does not respond with copy of coherency unit because a cache within the node owns the coherency unit |
| mR | Does respond because memory is the owner |
| mS | Does respond to requests for shared access because memory has shared copy and no active device has ownership; does not respond to requests for write access |
| mI | Does not respond because memory's copy is invalid |

Fig. 36

| Packet Type | Full Name | Description |
|---|---|---|
| RWB | Remote WB | Request sent from an active device in a multi-node system to an interface in order to initiate a WB transaction |
| RWBS | Remote WBS | Request sent from an active device in a multi-node system to an interface in order to initiate a WBS transaction |
| RWS | Remote WS | Request sent from an active device in a multi-node system to an interface in order to initiate a WS transaction |

*Fig. 39*

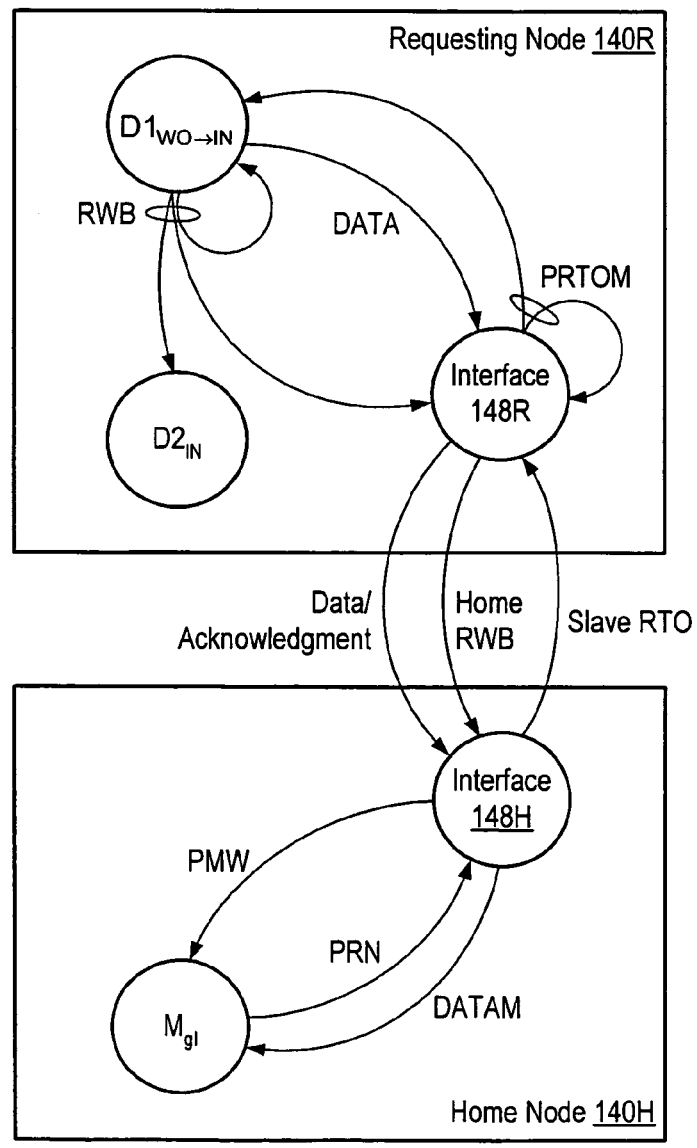

*Fig. 40*

MULTI-NODE SYSTEM WITH RESPONSE INFORMATION IN MEMORY

PRIORITY INFORMATION

This application claims priority to U.S. provisional application Ser. No. 60/461,986, entitled "MULTI-NODE SYSTEM WITH RESPONSE INFORMATION IN MEMORY", filed Apr. 11, 2003.

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory.

Shared memory multiprocessing systems generally employ either a broadcast snooping cache coherency protocol or a directory based cache coherency protocol. In a system employing a snooping broadcast protocol (referred to herein as a "broadcast" protocol), coherence requests are broadcast to all processors (or cache subsystems) and memory through a totally ordered address network. Each processor "snoops" the requests from other processors and responds accordingly by updating its cache tags and/or providing the data to another processor. For example, when a subsystem having a shared copy observes a coherence request for exclusive access to the coherency unit, its copy is typically invalidated. Likewise, when a subsystem that currently owns a coherency unit observes a coherence request for that coherency unit, the owning subsystem typically responds by providing the data to the requestor and invalidating its copy, if necessary. By delivering coherence requests in a total order, correct coherence protocol behavior is maintained since all processors and memories observe requests in the same order.

In a standard broadcast protocol, requests arrive at all devices in the same order, and the access rights of the processors are modified in the order in which requests are received. Data transfers occur between caches and memories using a data network, which may be a point-to-point switched network separate from the address network, a broadcast network separate from the address network, or a logical broadcast network which shares the same hardware with the address network. Typically, changes in ownership of a given coherency unit occur concurrently with changes in access rights to the coherency unit.

Unfortunately, the standard broadcast protocol suffers from a significant performance drawback. In particular, the requirement that access rights of processors change in the order in which snoops are received may limit performance. For example, a processor may have issued requests for coherency units A and B, in that order, and it may receive the data for coherency unit B (or already have it) before receiving the data for coherency unit A. In this case the processor must typically wait until it receives the data for coherency unit A before using the data for coherency unit B, thus increasing latency. The impact associated with this requirement is particularly high in processors that support out-of-order execution, prefetching, multiple core per-processor, and/or multi-threading, since such processors are likely to be able to use data in the order it is received, even if it differs from the order in which it was requested.

In contrast, systems employing directory-based protocols maintain a directory containing information indicating the existence of cached copies of data. Rather than unconditionally broadcasting coherence requests, a coherence request is typically conveyed through a point-to-point network to the directory and, depending upon the information contained in the directory, subsequent coherence requests are sent to those subsystems that may contain cached copies of the data in order to cause specific coherency actions. For example, the directory may contain information indicating that various subsystems contain shared copies of the data. In response to a coherence request for exclusive access to a coherency unit, invalidation requests may be conveyed to the sharing subsystems. The directory may also contain information indicating subsystems that currently own particular coherency units. Accordingly, subsequent coherence requests may additionally include coherence requests that cause an owning subsystem to convey data to a requesting subsystem. In some directory based coherency protocols, specifically sequenced invalidation and/or acknowledgment messages may be required. Numerous variations of directory based cache coherency protocols are well known.

Typical systems that implement a directory-based protocol may be associated with various drawbacks. For example, such systems may suffer from high latency due to the requirement that requests go first to a directory and then to the relevant processors, and/or from the need to wait for acknowledgment messages. In addition, when a large number of processors must receive the request (such as when a coherency unit transitions from a widely shared state to an exclusive state), all of the processors must typically send ACKs to the same destination, thus causing congestion in the network near the destination of the ACKs and requiring complex logic to handle reception of the ACKs. Finally, the directory itself may add cost and complexity to the system.

In certain situations or configurations, systems employing broadcast protocols may attain higher performance than comparable systems employing directory based protocols since coherence requests may be provided directly to all processors unconditionally without the indirection associated with directory protocols and without the overhead of sequencing invalidation and/or acknowledgment messages. However, since each coherence request must be broadcast to all other processors, the bandwidth associated with the network that interconnects the processors in a system employing a broadcast snooping protocol can quickly become a limiting factor in performance, particularly for systems that employ large numbers of processors or when a large number of coherence requests are transmitted during a short period. In such environments, systems employing directory protocols may attain overall higher performance due to lessened network traffic and the avoidance of network bandwidth bottlenecks.

Thus, while the choice of whether to implement a shared memory multiprocessing system using a broadcast snooping protocol or a directory based protocol may be clear based upon certain assumptions regarding network traffic and bandwidth, these assumptions can often change based upon the utilization of the machine. This is particularly true in scalable systems in which the overall numbers of processors connected to the network can vary significantly depending upon the configuration.

SUMMARY

Various embodiments of multi-node systems in which response information is maintained in memory are disclosed. In one embodiment, a system may include several nodes coupled by an inter-node network. Each node includes several active devices, a memory subsystem, and an address network and a data network respectively configured to convey address packets and data packets between the active devices and the memory subsystem. The memory subsystem included in one of the nodes is configured to maintain a response indication indicating whether the memory subsystem should send a data packet corresponding to a coherency unit in response to receiving an address packet requesting an access right to the coherency unit from an active device in the same node. The node is also configured to store a node identifier for the coherency unit. The node identifier identifies which of the nodes has the coherency unit is in a modified global access state.

BRIEF DESCRIPTION OF THE DRAWINGS

A better understanding of the present invention can be obtained when the following detailed description is considered in conjunction with the following drawings, in which:

FIG. 4 illustrates one embodiment of a directory.

FIG. 4a illustrates another embodiment of a directory.

FIG. 7 is a chart illustrating various requests that may be supported in one embodiment of a computer system.

FIG. 8 illustrates data packet transfers for cacheable transactions in accordance with one embodiment of a computer system.

FIG. 9 illustrates various data packet transfers for non-cacheable transactions that may be supported in one embodiment of a computer system.

FIGS. 10A and 10B illustrate types of access rights and ownership status that may be implemented in one embodiment of a computer system.

FIG. 10C illustrates combinations of access rights and ownership status that may occur in one embodiment of a computer system.

FIG. 11 is a chart illustrating the effects of various transactions on ownership responsibilities in one embodiment of a computer system.

FIGS. 12A-12F illustrate exemplary coherence operations that may be implemented in broadcast mode in one embodiment of a computer system.

FIGS. 13A-13G illustrate exemplary coherence operations that may be implemented in point-to-point mode in one embodiment of a computer system.

FIGS. 15A-15D illustrate specific cache states that may be implemented in one embodiment.

FIG. 21 shows exemplary global coherence states that may describe the maximum access right the devices in a node have to a particular coherency unit in one embodiment of a multi-node computer system.

FIG. 22 shows exemplary proxy address packets that may be sent by an interface in one embodiment of a multi-node computer system.

FIG. 23 shows exemplary data packets that may be sent to and from an interface in one embodiment of a multi-node computer system.

FIG. 24 show the changes in global coherence state that may be made in response to receipt of one of the proxy address packets shown in FIG. 22 in one embodiment of a multi-node computer system.

FIGS. 35-36 shows exemplary memory response information that may be maintained in some embodiments of a multi-node computer system.

FIG. 39 illustrates exemplary remote-type address packets that may be used in one embodiment.

FIG. 40 illustrates an exemplary RWB transaction, according to one embodiment.

Figure 1:
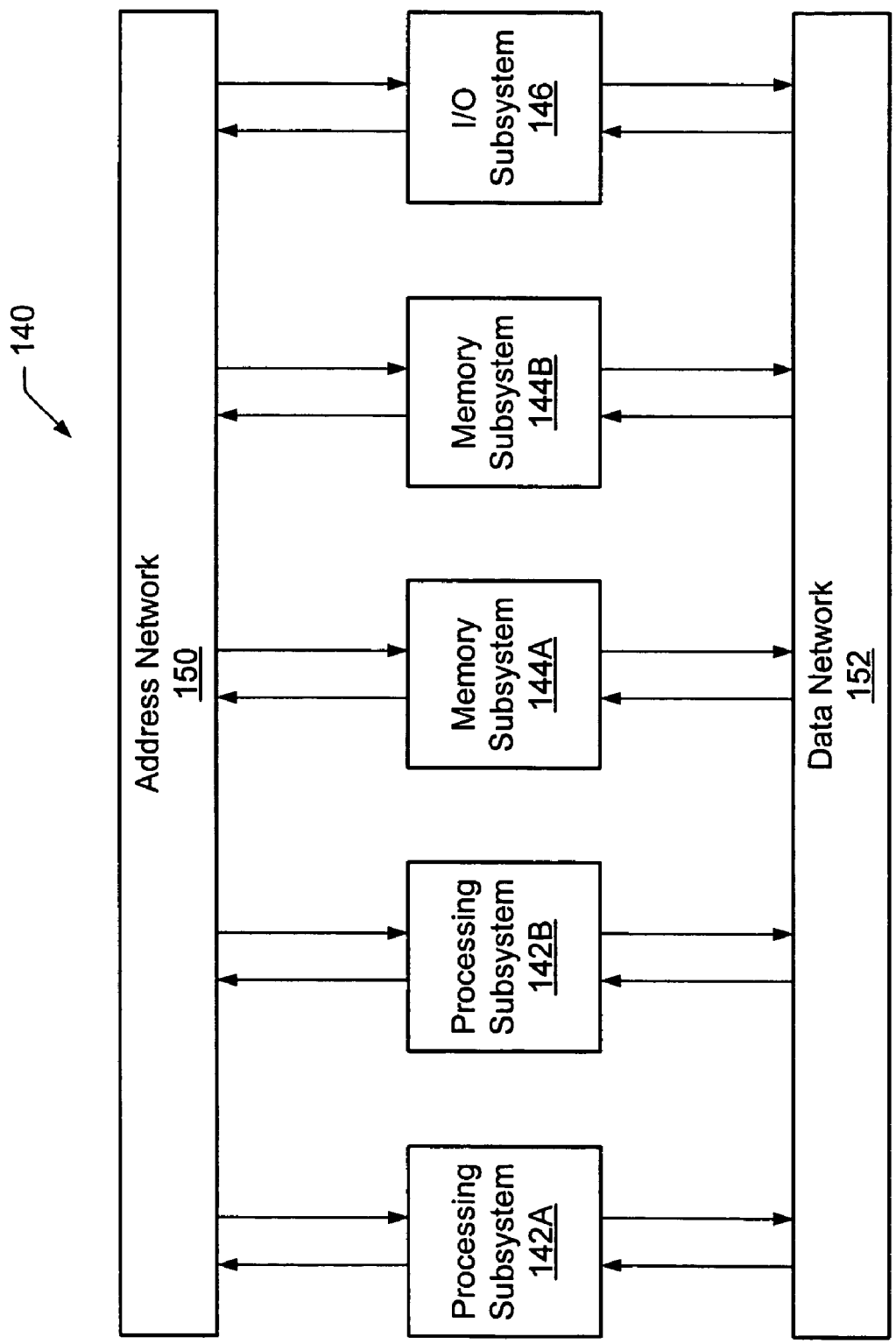
FIG. 1 is a block diagram of one embodiment of a multi-processing computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

FIG. 1 shows a block diagram of one embodiment of a computer system 140. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 are referred to as a client device. It is noted that although five client devices are shown in FIG. 1, embodiments of computer system 140 employing any number of client devices are contemplated. Elements referred to herein with a particular reference number followed by a letter will be collectively referred to by the reference number alone. For example, processing subsystems 142A-142B will be collectively referred to as processing subsystems 142.

Generally speaking, each of processing subsystems 142 and I/O subsystem 146 may access memory subsystems 144. Devices configured to perform accesses to memory subsystems 144 are referred to herein as "active" devices. Each client in FIG. 1 may be configured to convey address messages on address network 150 and data messages on data network 152 using split-transaction packets. Processing subsystems 142 may include one or more instruction and data caches which may be configured in any of a variety of specific cache arrangements. For example, set-associative or direct-mapped configurations may be employed by the caches within processing subsystems 142. Because each of processing subsystems 142 within computer system 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 may include dynamic random access memory (DRAM), although other types of memory may be used in some embodiments. Each address in the address space of computer system 140 may be assigned to a particular memory subsystem 144, referred to herein as the home subsystem of the address. Additionally, each memory subsystem 144 may include a directory suitable for implementing a directory-based coherency protocol. In one embodiment, each directory may be configured to track the states of memory locations assigned to that memory subsystem within computer system 140. Additional details regarding suitable directory implementations are discussed further below.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Data network 152 may implement a source-destination ordering property such that if a client device C1 sends a data message D1 before sending a data message D2 and a client device C2 receives both D1 and D2, C2 will receive D1 before C2 receives D2.

Address network 150 accommodates communication between processing subsystems 142, memory subsystems 144, and I/O subsystem 146. Messages upon address network 150 are generally referred to as address packets. When the destination of an address packet is a storage location within a memory subsystem 144, the destination may be specified via an address conveyed with the address packet upon address network 150. Subsequently, data corresponding to the address packet on the address network 150 may be conveyed upon data network 152. Typical address packets correspond to requests for an access right (e.g., a readable or writable copy of a cacheable coherency unit) or requests to perform a read or write to a non-cacheable memory location. Address packets may be sent by a device in order to initiate a coherence transaction. Subsequent address packets may be sent to implement the access right and/or ownership changes needed to satisfy the coherence request. In the computer system 140 shown in FIG. 1, a coherence transaction may include one or more packets upon address network 150 and data network 152. Typical coherence transactions involve one or more address and/or data packets that implement data transfers, ownership transfers, and/or changes in access privileges.

As is described in more detail below, address network 150 may be configured to transmit coherence requests corresponding to read or write memory operations using a point-to-point transmission mode. For coherence requests that are conveyed point-to-point by address network 150, a directory-based coherency protocol is implemented. In some embodiments, address network 150 may be configured to selectively transmit coherence requests in either point-to-point mode or broadcast mode. In such embodiments, when coherence requests are conveyed using a broadcast mode transmission, a snooping broadcast coherency protocol is implemented.

In embodiments supporting both point-to-point and broadcast transmission modes, clients transmitting a coherence request to address network 150 may be unaware of whether the coherence request will be conveyed within computer system 140 via a broadcast or a point-to-point mode transmission. In such an embodiment, address network 150 may be configured to determine whether a particular coherence request is to be conveyed in broadcast (BC) mode or point-to-point (PTP) mode. In the following discussion, an embodiment of address network 150 that includes a table for classifying coherence requests as either BC mode or PTP mode is described.

Hybrid Network Switch

Figure 2:
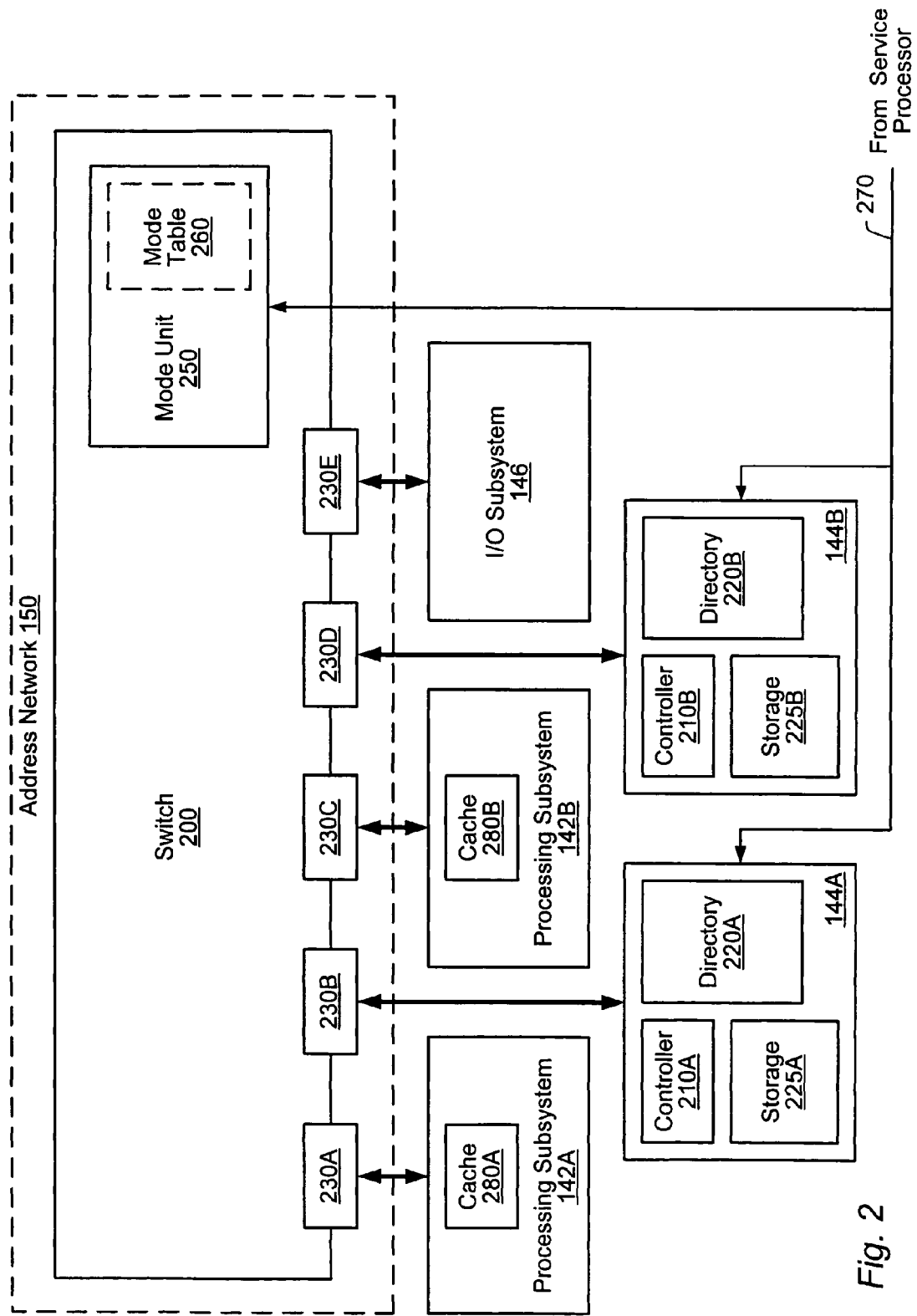
FIG. 2 is a diagram illustrating a portion of one embodiment of a computer system.

FIG. 2 is a diagram illustrating a portion of one embodiment of computer system 140. FIG. 2 shows address network 150, memory subsystems 144, processing subsystems 142, and I/O subsystem 146. In the embodiment shown, address network 150 includes a switch 200 including a mode control unit 250 and ports 230A-230E. Mode unit 250 illustratively includes a mode table 260 configured to store an indication of a mode of conveyance, BC or PTP, for received coherence requests. Mode unit may include special task oriented circuitry (e.g., an ASIC) or more general purpose processing circuitry executing software instructions. Processing units 142A-142B each include a cache 280 configured to store memory data. Memory subsystems 144A and 144B are coupled to switch 200 via ports 230B and 230D, respectively, and include controller circuitry 210, directory 220, and storage 225. In the embodiment shown, ports 230 may include bi-directional links or multiple unidirectional links. Storage 225 may include RAM or any other suitable storage device.

Also illustrated in FIG. 2 is a network 270 (e.g., a switched network or bus) coupled between a service processor (not shown), switch 200 and memory subsystems 144. The service processor may utilize network 270 to configure and/or initialize switch 200 and memory subsystems 144, as will be described below. The service processor may be external to computer system 140 or may be a client included within computer system 140. Note that embodiments of computer system 140 that only implement a PTP transmission mode may not include mode unit 250, network 270, and/or a service processor.

As previously described, address network 150 is configured to facilitate communication between clients within computer system 140. In the embodiment of FIG. 2, processing subsystems 142 may perform reads or writes which cause transactions to be initiated on address network 150. For example, a processing unit within processing subsystem 142A may perform a read to a memory location A that misses in cache 280A. In response to detecting the cache miss, processing subsystem 142A may convey a read request for location A to switch 200 via port 230A. The read request initiates a read transaction. Mode unit 250 detects the read request for location A and determines the transmission mode corresponding to the read request. In embodiments utilizing a mode table, the mode unit determines the transmission mode by consulting mode table 260. In one embodiment, the read request includes an address corresponding to location A that is used to index into an entry in mode table 260. The corresponding entry may include an indication of the home memory subsystem corresponding to location A and a mode of transmission corresponding to location A.

In the above example, location A may correspond to a memory location within storage 225A of memory subsystem 144A. Consequently, the entry in mode table 260 corresponding to the read request may indicate memory subsystem 144A is a home subsystem of location A. If the entry in mode table 260 further indicates that the address of the read request is designated for PTP mode transmissions, switch 200 is configured to only convey a corresponding request to memory subsystem 144A via port 230B. On the other hand, if the entry in mode table 260 indicates a BC transmission mode, switch 200 may be configured to broadcast a corresponding request to each client within computer system 140. Thus, switch 200 may be configured to utilize either PTP or BC modes as desired. Consequently, in this particular embodiment a single encoding for a transaction conveyed by an initiating device may correspond to either a BC mode or PTP mode transaction. The mode may be determined not by the client initiating a transaction, but by the address network. The transmission mode associated with switch 200 may be set according to a variety of different criteria. For example, where it is known that a particular address space includes widely shared data, mode unit 250 may be configured to utilize BC mode transactions. Conversely, for data that is not widely shared, or data such as program code that is read only, mode unit 250 may be configured to utilize PTP mode. Further details regarding various other criteria for setting the mode of switch 200 will be described further below.

Transmission Mode Table

Figure 3:
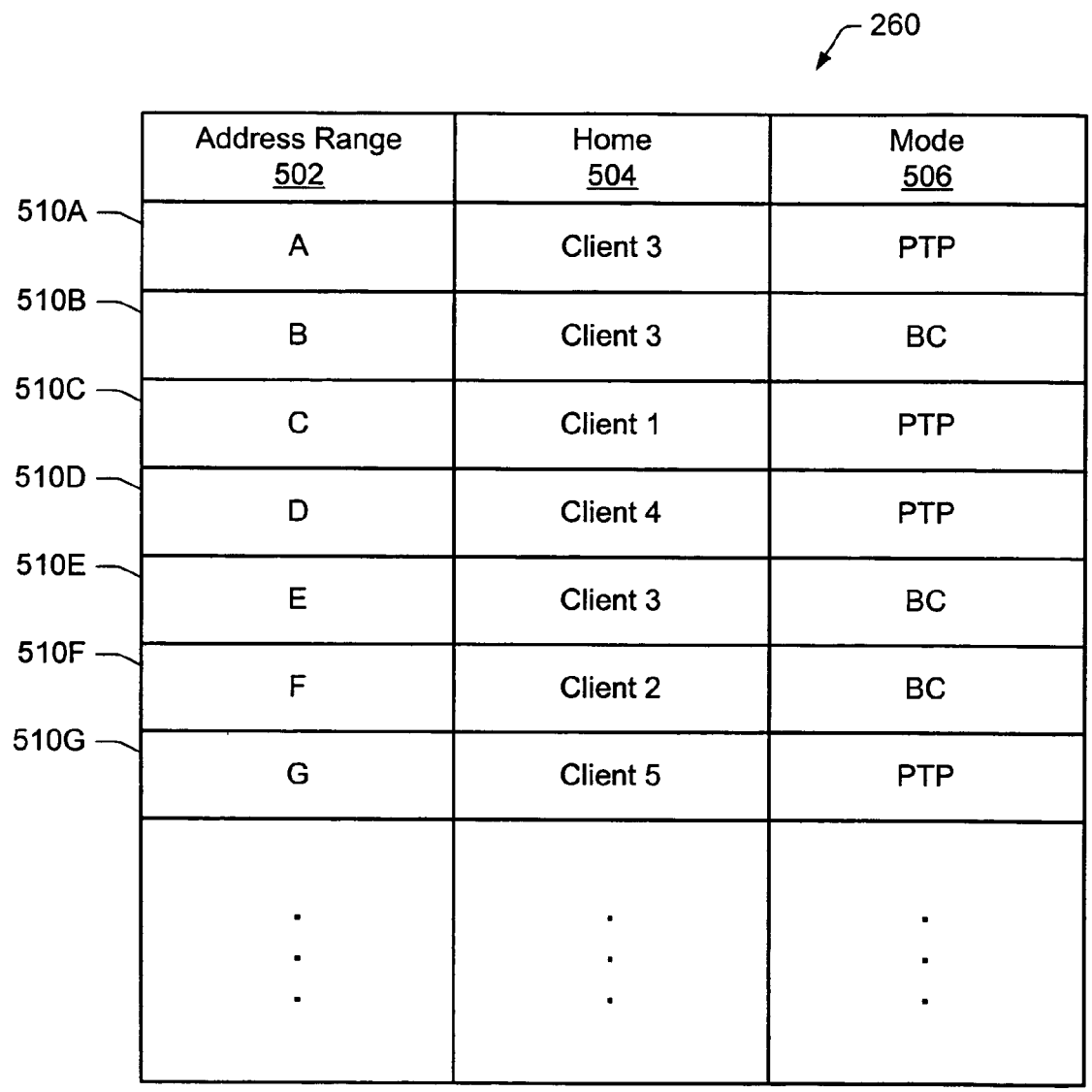
FIG. 3 shows one embodiment of a mode table.

Turning to FIG. 3, one embodiment of a mode table 260 is shown. While the embodiment of FIG. 3 shows mode table 260 as being included within mode unit 250, mode table 260 may be external to mode unit 250. Mode table 260 may include a dynamic data structure maintained within a storage device, such as RAM or EEPROM. In the embodiment of FIG. 3, table 260 is depicted as including columns 502, 504 and 506, and rows 510. Each row 510 corresponds to a particular portion of the address space. For example, each row 510 may correspond to a particular page of memory or any other portion of address space. In one embodiment, the address space corresponding to a computer system 140 is partitioned into regions called "frames." These frames may be equal or unequal in size. Address column 502 includes an indication of the frame corresponding to each row 510. Home column 504 includes an indication of a home subsystem corresponding to each row 510. Mode column 506 includes an indication of a transmission mode, BC or PTP, corresponding to each row 510 (and thus each memory frame). Note that in some embodiments, there may not be an entry in home column 504 for BC mode address ranges.

In the embodiment shown in FIG. 3, entries in table 260 are directly mapped to a specific location. Therefore, row 510A corresponds to entry A, row 510B corresponds to entry B, and so on. In a direct mapped implementation, table 260 need not actually include address column 502; however, it is illustrated for purposes of discussion. Each row 510 in the embodiment shown corresponds to an address space of equal size. As stated previously, table 260 may be initialized by a service processor coupled to switch 200. Note that in other embodiments, table 260 may be organized in an associative or other manner.

As illustrated in FIG. 3, row 510A contains an entry corresponding to address region A (502). In one embodiment, mode unit 250 may utilize a certain number of bits of an address to index into table 260. For example, address "A" in row 510A may correspond to a certain number of most significant bits of an address space identifying a particular region. Alternatively, address "A" in row 510A may correspond to a certain number of significant bits and a certain number of less significant bits of an address space identifying a particular region, where the region contains non-consecutive cache lines, in order to facilitate interleaving of the cache lines. Row 510A indicates a home 504 subsystem corresponding to "A" is CLIENT 3. Further, row 510A indicates the mode 506 of transmission for transactions within the address space corresponding to region "A" is PTP. Row 510B corresponds to a region of address 502 space "B", has a home 504 subsystem of CLIENT 3, and a transmission mode 506 of BC. Each of the other rows 510 in table 260 includes similar information.

While the above description contemplates a mode unit 250 that includes a mode table 260 for determining a transmission mode corresponding to received address packets, other embodiments are possible as well. For example, mode unit 250 may be configured to select a transmission mode based on network traffic. In such an implementation, mode unit 250 may be configured to monitor link utilization and/or the state of input/output queues within switch 200. If mode unit 250 detects that network congestion is low, a packet may be broadcast to take advantage of available bandwidth. On the other hand, if the mode unit 250 detects that network congestion is high, a packet may be conveyed point-to-point in order to reduce congestion. In such embodiments, mode unit 250 may coordinate with a directory when switching between BC and PTP mode (e.g., a service processor may coordinate the mode unit and directory). Other embodiments may include tracking which address regions are widely shared and using broadcasts for those regions. If it is determined a particular address region is not widely shared or is read-only code, a point-to-point mode may be selected for conveying packets for those regions. Alternatively, a service processor coupled to switch 250 may be utilized to monitor network conditions. In yet a further embodiment, the mode unit 250 may be configured such that all coherence requests are serviced according to PTP mode transmissions or, alternatively, according to BC mode transmissions. For example, in scalable systems, implementations including large numbers of processors may be configured such that mode unit 250 causes all address packets to be serviced according to PTP mode transmissions, while implementations including relatively small numbers of processors may be set according to BC mode transmissions. These and other embodiments are contemplated.

As mentioned above, when switch 200 receives a coherence request, mode unit 250 utilizes the address corresponding to the received coherence request as an index into table 260. In the embodiment shown, mode unit 250 may utilize a certain number of most significant bits to form an index. The index is then used to select a particular row 510 of table 260. If the mode 506 indication within the selected row indicates PTP mode, a corresponding coherence request is conveyed only to the home subsystem indicated by the home 504 entry within the row. Otherwise, if the mode 506 entry indicates BC mode, a corresponding coherence request is broadcast to clients within the computer system. In alternative embodiments, different "domains" may be specified within a single computer system. As used herein, a domain is a group of clients that share a common physical address space. In a system where different domains exist, a transaction that is broadcast by switch 200 may be only broadcast to clients in the domain that corresponds to the received coherence request. Still further, in an alternative embodiment, BC mode coherence requests may be broadcast only to clients capable of caching data and to the home memory subsystem. In this manner, certain coherence requests that may be unnecessary may be avoided while still implementing a broadcast snooping style coherence protocol.

Directories

As stated previously, for coherence requests that are conveyed in point-to-point mode by switch 200, a directory based coherence protocol is implemented. As shown in FIG. 2, each memory subsystem 144 includes a directory 220 that is used to implement a directory protocol. FIG. 4 illustrates one example of a directory 220A that may be maintained by a controller 210A within a memory subsystem 144A. In this embodiment, directory 220A includes an entry 620 for each memory block within storage 225A for which memory subsystem 144A is the home subsystem. In general, a directory may include an entry for each coherency unit for which the memory subsystem is a home subsystem. As used herein, a "coherency unit" is a number of contiguous bytes of memory that are treated as a unit for coherency purposes. For example, if one byte within the coherency unit is updated, the entire coherency unit is considered to be updated. In some embodiments, the coherency unit may be a cache line or a cache block. Thus, in one embodiment, directory 220A maintains an entry 620 for each cache line whose home is memory subsystem 144A. In addition, directory 220A may include an entry for each client 604-612 within computer system 140 that may have a copy of the corresponding cache line. Directory 220A may also include an entry 614 indicating the current owner of the corresponding cache line. Each entry in directory 220A indicates the coherency state of the corresponding cache line in each client in the computer system. In the example of FIG. 4, a region of address space corresponding to a frame "A" may be allocated to memory subsystem 144A. Typically, the size of frame A may be significantly larger than a coherency unit. Consequently, directory 220A may include several entries (i.e., Aa, Ab, Ac, etc.) that correspond to frame A.

It is noted that numerous alternative directory formats to support directory based coherency protocols may be implemented. For example, while the above description includes an entry 604-612 for each client within a computer system, an alternative embodiment may only include entries for groups of clients. For example, clients within a computer system may be grouped together or categorized according to various criteria. For example, certain clients may be grouped into one category for a particular purpose while others are grouped into another category. In such an embodiment, rather than including an indication for every client in a group, a directory within a memory subsystem 144 may include an indication as to whether any of the clients in a group have a copy of a particular coherency unit. If a request is received for a coherency unit at a memory subsystem 144 and the directory indicates that a group "B" may have a copy of the coherency unit, a corresponding coherency transaction may be conveyed to all clients within group "B." By maintaining entries corresponding to groups of clients, directories 220 may be made smaller than if an entry were maintained for every client in a computer system.

Other directory formats may vary the information stored in a particular entry depending on the current number of sharers. For example, in some embodiments, a directory entry may include a pointer to a client device if there is a single sharer. If there are multiple sharers, the directory entry may be modified to include a bit mask indicating which clients are sharers. Thus, in one embodiment, a given directory entry may store either a bit mask or a pointer depending on the number of sharers.

By maintaining a directory as described above, appropriate coherency actions may be performed by a particular memory subsystem (e.g., invalidating shared copies, requesting transfer of modified copies, etc.) according to the information maintained by the directory. A controller 210 within a subsystem 144 is generally configured to perform actions necessary for maintaining coherency within a computer system according to a specific directory based coherence protocol. For example, upon receiving a request for a particular coherency unit at a memory subsystem 144, a controller 210 may determine from directory 220 that a particular client may have a copy of the requested data. The controller 210 may then convey a message to that particular client which indicates the coherency unit has been requested. The client may then respond with data (e.g., if the coherency unit is modified) or with an acknowledgment or any other message that is appropriate to the implemented coherency protocol. In general, memory subsystems 144 maintain a directory and controller suitable for implementing a directory-based coherency protocol. As used herein, a directory based cache coherence protocol is any coherence protocol that maintains a directory containing information regarding cached copies of data, and in which coherence commands for servicing a particular coherence request are dependent upon the information contained in the directory.

General Operations

Figure 5:
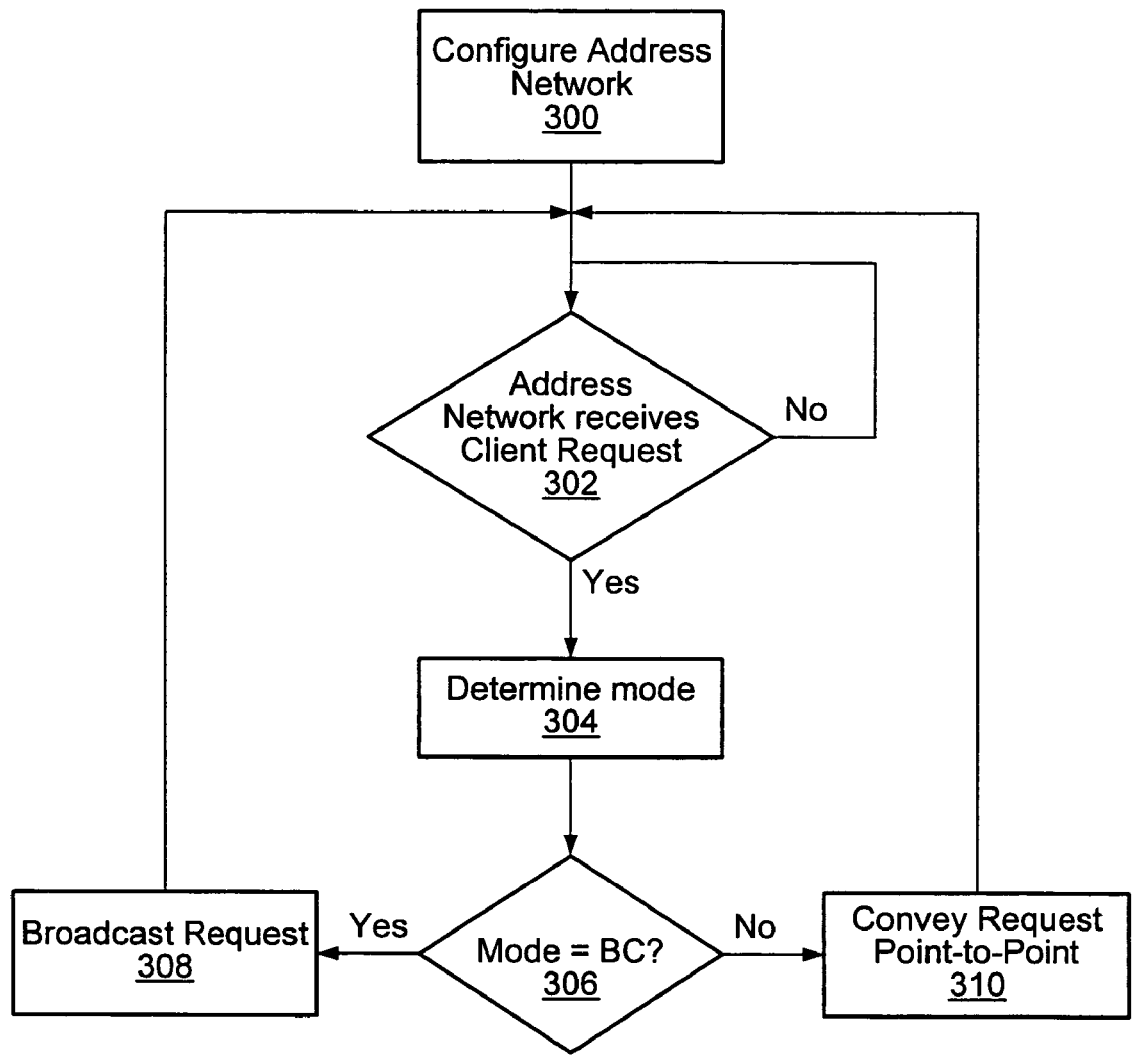
FIG. 5 illustrates one embodiment of a method for mixed mode determination and transmission.

Turning next to FIG. 5, one embodiment of a method for mixed mode determination and transmission is illustrated. An address network within a computer system is initially configured (block 300). Such configuration may include initializing a mode control unit and/or a mode table via a service processor. During system operation, if the address network receives a coherence request from a client (decision block 302), the address network determines the transmission mode (block 304) corresponding to the received request. In the embodiment described above, the mode control unit 250 makes this determination by accessing a mode table 260. If the mode corresponding to the request is determined to be BC mode (decision block 306), a corresponding request is broadcast to clients in the computer system. In contrast, if the mode corresponding to the request is determined to be PTP mode (decision block 306), a corresponding request is conveyed point-to-point to the home subsystem corresponding to the request and (not unconditionally) to other clients within the computer system.

During operation, it may be desirable to change the configuration of switch 200 to change the transmission mode for certain address frames (or for the entire computer system). For example, a mode unit 250 within switch 200 may be initially configured to classify a particular region of address space with a PTP mode. Subsequently, during system operation, it may be determined that the particular region of address space is widely shared and modified by different clients within the computer system. Consequently, significant latencies in accessing data within that region may be regularly encountered by clients. Thus, it may be desirable to change the transmission mode to broadcast for that region. While transmission mode configuration may be accomplished by user control via a service processor, a mechanism for changing modes dynamically may alternatively be employed.

As stated previously, numerous alternatives are contemplated for determining when the transmission mode of a coherence request or a region of address space may be changed. For example, in one embodiment an address switch or service processor may be configured to monitor network congestion. When the switch detects congestion is high, or some other condition is detected, the switch or service processor may be configured to change the modes of certain address regions from BC to PTP in order to reduce broadcasts. Similarly, if the switch or service processor detects network congestion is low or a particular condition is detected, the modes may be changed from PTP to BC.

Figure 6:
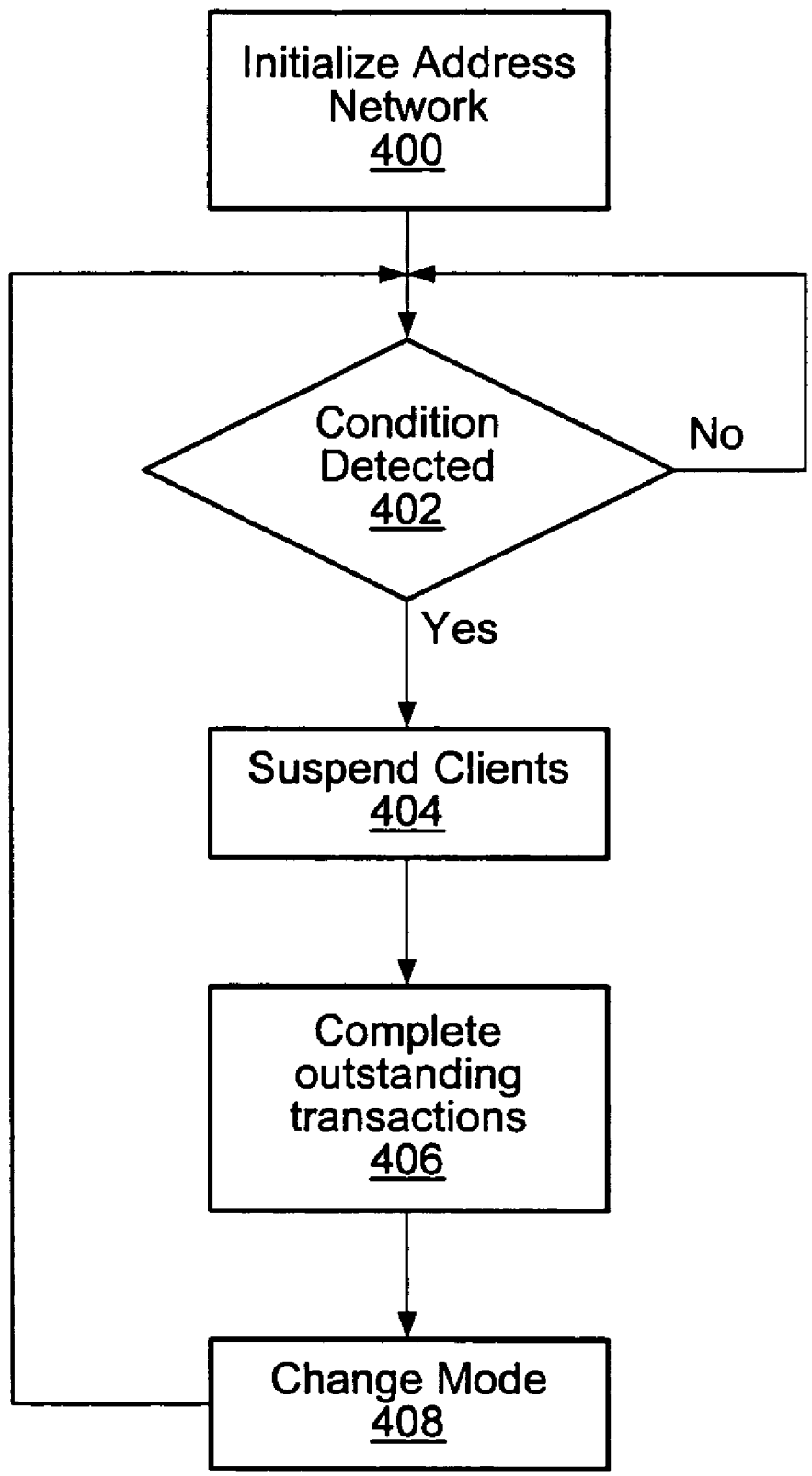
FIG. 6 illustrates one embodiment of a method for dynamically changing transmission modes.

FIG. 6 illustrates one embodiment of a method for dynamically changing transmission modes corresponding to coherence requests within an address network. An initial address network configuration (block 400) is performed which may include configuring a mode table 260 as described above or otherwise establishing a mode of transmission for transactions. During system operation, a change in the transmission mode of switch 200 may be desired in response to detection of a particular condition, as discussed above (decision block 402). In the embodiment shown, when the condition is detected (decision block 402), new client transactions are temporarily suspended (block 404), outstanding transactions within the computer system are allowed to complete (block 406), and the mode is changed (block 408). In one embodiment, changing the mode may include updating the entries of mode table 260 as described above. It is further noted that to accommodate transitions from broadcast mode to point-to-point mode, directory information (e.g., information which indicates an owning subsystem) may be maintained even for broadcast mode coherence requests.

Generally speaking, suspending clients (block 404) and allowing outstanding transactions within the computer system to complete (block 406) may be referred to as allowing the computer system to reach a quiescent state. A quiescent state may be defined as a state when all current traffic has reached its destination and there is no further traffic entering the computer system. Alternative embodiments may perform mode changes without requiring a computer system to reach a quiescent state. For example, rather than waiting for all transactions to complete, a mode change may be made upon arrival of all pending address packets at their destination devices (but while data packets are still being conveyed). Further, in embodiments which establish transmission modes on the basis of regions of memory, as in the discussion of frames above, a method may be such that only those current transactions which correspond to the frame whose mode is being changed need complete. Various alternatives are possible and are contemplated.

Coherence Transactions

In one embodiment of computer system 140, read-to-share (RTS) transactions may be initiated by active devices upon address network 150 by requesting read-only copies of coherency units. Similarly, read-to-own (RTO) transactions may be initiated by active devices requesting writable copies of coherency units. Other coherence transactions may similarly be initiated by active devices upon address network 150, as desired. These coherence requests may be conveyed in either PTP or BC mode in some embodiments, as described above.

FIG. 7 is a chart illustrating various coherence requests, including a description of each, that may be supported by one embodiment of computer system 140. As illustrated, in addition to read-to-share and read-to-own requests, further coherence requests that may be supported include read-stream (RS) requests, write-stream (WS) requests, write-back (WB) requests, and write-back-shared (WBS) requests. A read-stream request initiates a transaction to provide a requesting device with a read-once copy of a coherency unit. A write-stream request initiates a transaction to allow a requesting device to write an entire coherency unit and send the coherency unit to memory. A write-back request initiates a transaction that sends a coherency unit from an owning device to memory, where the owning device does not retain a copy. Finally, a write-back-shared request initiates a transaction that sends a coherency unit from an owning device to memory, where the owning device retains a read-only copy of the coherency unit. Active devices may also be configured to initiate other transaction types on address network 150 such as I/O read and write transactions and interrupt transactions using other requests. For example, in one embodiment, a read-to-write-back (RTWB) transaction may also be supported to allow I/O bridges (or other devices) to perform a write to part of a coherency unit without gaining ownership of the coherency unit and responding to foreign requests for the coherency unit.

It is noted that transactions may be initiated upon address network 150 by sending encoded packets that include a specified address. Data packets conveyed on data network 152 may be associated with corresponding address transactions using transaction IDs, as discussed below.

In one embodiment, cacheable transactions may result in at least one packet being received by the initiating client on the data network 152. Some transactions may require that a packet be sent from the initiating client on the data network 152 (e.g., a write-back transaction). FIG. 8 illustrates data packet transfers on data network 152 that may result from various transactions in accordance with one embodiment of computer system 140. A PRN data packet type is a pull request, sent from the destination of a write transaction to the source of the write transaction, to send data. An ACK data packet type is a positive acknowledgment from an owning device allowing a write stream transaction to be completed. A NACK data packet type is a negative acknowledgment to memory aborting a WB, WBS, or to the initiator aborting an INT transaction.

When an initiator initiates a transaction, the address packet for that transaction may include a transaction ID. In one embodiment, the transaction ID may be formed by the initiator's device ID and a packet ID assigned by the initiator. The DATA, ACK and/or PRN packets that the initiator receives may be routed to the initiator through data network 152 by placing the initiator's device ID in the packets' routing prefixes. In addition, the DATA, ACK and/or PRN packets may contain a destination packet ID field which matches the packet ID assigned by the initiator, allowing the initiator to match the DATA, ACK, and/or PRN packet to the correct transaction. Furthermore, PRN packets may include a pull ID consisting of the source's device ID and a packet ID assigned by the source (that is, the client which sent the PRN packet). After receiving a PRN packet, the initiator may send a DATA or NACK packet to the source of the PRN. This DATA or NACK packet may be routed by placing the device ID of the source of the PRN in the packet's routing prefix. The DATA or NACK packet may contain a destination packet ID field that allows it to be matched with the correct PRN (in addition, the packet may include a flag which indicates that it was sent in response to a PRN, thus preventing confusion between transaction IDs and pull IDs).

In one embodiment, an ACK packet sent in response to a WS may not contain any data. The ACK packet may be used to indicate the invalidation of the previous owner. The PRN packet that an initiator receives as part of a cacheable transaction is sent by the memory device that maps the coherency unit. The DATA or NACK packet that the initiator sends is sent to the memory device that maps the coherency unit (which is also the source of the PRN received by the initiator).

As illustrated in FIG. 8, the initiator may receive separate DATA and PRN packets for a RTWB transaction. However, when the owner of the coherency unit is the memory device that maps the coherency unit, these two packets would be sent by the same client. Thus, in one embodiment, instead of sending two packets in this situation, a single DATAP packet may be sent. A DATAP package combines the information of a DATA packet and a PRN packet. Similarly, a single PRACK packet, which combines the information of a PRN packet and an ACK packet, may be sent in response to a WS request when the owner of the coherency unit is the memory device that maps the coherency unit. Finally, in those cases where the initiator is the owner of the coherency unit, the initiator may not send a DATA or ACK packet to itself (logically, this can be viewed as a transmission of a DATA or ACK packet from the initiator to itself which does not leave the initiator). Similarly, in those cases where the initiator is the memory device that maps the coherency unit, the initiator may not send a PRN packet to itself, nor need it send a DATA or NACK packet to itself.

In the embodiment of FIG. 1, non-cacheable transactions and interrupt may similarly result in at least one packet being received by the initiating client from the data network, and some transactions may require that a packet be sent from the initiating client device on the data network. FIG. 9 illustrates various non-cacheable and interrupt transaction types that may be supported in one embodiment of computer system 140, along with resulting data packet types that may be conveyed on data network 152. The columns in FIG. 9 are indicative of the sequence of packets sent on the address and data networks, in order from left to right.

The DATA, PRN, or NACK packets that an initiator may receive as part of non-cacheable and interrupt transactions are routed to the initiator through data network 152 and may be matched to the correct transaction at the receiver through the use of transaction IDs, as was described for cacheable data transfers. Similarly, the DATA packets that the initiator sends may be routed to their destination and matched to the correct transaction at their destination through the use of pull IDs, as was described for cacheable transactions.

For RIO and WIO transactions, the DATA, and/or PRN packets that the initiator receives are sent from the client that maps the coherency unit. For INT transactions, the PRN or NACK packet that the initiator receives is sent from the target of the interrupt (which may be specified in an address field of the INT packet). When the initiator sends a DATA packet, it sends the DATA packet to the source of the PRN that it received. It is noted that when the initiator would be both the source and destination of a DATA, PRN, or NACK packet, no DATA, PRN, or NACK packet needs to be sent. It is also noted that when an initiator receives a PRN packet in response to an INT transaction, the initiator sends a data packet. When the initiator receives a NACK packet as part of an INT transaction, the initiator may not send any packet on the data network.

Coherency Mechanism

Computer system 140 employs a cache coherence protocol to provide a coherent view of memory for clients with caches. For this purpose, state information for each coherency unit may be maintained in each active device. The state information specifies the access rights of the active device and the ownership responsibilities of the active device.

The access right specified by the state information for a particular coherency unit is used to determine whether the client device can commit a given operation (i.e., a load or a store operation) and constraints on where that operation can appear within one or more partial or total orders. In one embodiment, the memory access operations appear in a single total order called the "global order." In such an embodiment, these constraints upon where an operation can be placed in the global order can be used to support various well-known memory models, such as, for example, a sequentially consistent memory model or total-store-order (TSO), among others.

The ownership responsibility specified by the state information for a particular coherency unit indicates whether the client device is responsible for providing a copy of the coherency unit to another client that requests it. A client device owns a coherency unit if it is responsible for providing data to another client which requests that coherency unit.

In one embodiment, the coherence protocol employed by computer system 140 is associated with the following properties:

1) Changes in ownership status occur in response to the reception of address packets. Sending address packets, sending data packets, and receiving data packets do not affect the ownership status;
2) An active device may own a coherency unit without having the data associated with that ownership responsibility;
3) Access rights transition with receiving address packets, sending data packets, and receiving data packets. Sending address packets does not affect the access rights (although it may affect the way in which other packets are processed);
4) An active device which has an access right to a coherency unit always has the data associated with that access right; and
5) Reception of address packets is not blocked based on the reception of particular data packets. For example, it is possible to receive a local read request packet before the data being requested is also received.

Since access rights and ownership status can transition separately in the protocol employed by computer system 140, various combinations of coherence states are possible. FIGS. 10A and 10B illustrate types of access rights and ownership status that may occur in one embodiment of computer system 140. FIG. 10C illustrates possible combinations of access rights and ownership status. It is noted that these combinations differ from those of traditional coherence protocols such as the well-known MOSI protocol. It is also noted that other specific forms of access rights may be defined in other embodiments.

As illustrated in FIG. 10A, the W (Write) access right allows both reads and writes. The A (All-Write) access right allows only writes and requires that the entire coherency unit be written. The R (Read) access right allows only reads. The T (Transient-Read) access right allows only reads; however, unlike reads performed under the W or R access rights, reads performed under the T access right may be reordered, as discussed below. Finally, the I (Invalid) access right allows neither reads nor writes. When the system is first initialized, all active devices have the I access right for all coherency units. As will be discussed further below, when a coherency unit is in the A access right state, because the entire coherency unit must be modified, the data contained in the coherency unit prior to this modification is not needed and may not be present. Instead, an ACK packet, which acts as a token representing the data, must have been received if the data is not present.

As illustrated in FIG. 10B, an active device may have an O (owner) ownership status or an N (non-owner) ownership status with respect to a given coherency unit. In either state, data corresponding to the coherency unit may or may not be present in the cache.

Once an active device has acquired a given access right, it may exercise that access right repeatedly by performing multiple reads and/or writes until it loses the access right. It is noted that for access rights other than A (All-Write), an active device is not required to exercise its read and/or write access rights for a given coherency unit. In contrast, the A access right requires that the entire coherency unit be written, so the active device must perform at least one write to each byte in the coherency unit.

In the embodiment of FIG. 1, changes in access rights may occur in response to receiving address packets, sending data packets, or receiving data packets. Generally speaking, and as will be described in further detail below, when a transaction transfers exclusive access to a coherency unit from a processor P1 to a processor P2, the sending of the data from P1 terminates P1's access right to the coherency unit and the reception of the data at P2 initiates P2's access right. When a transaction changes exclusive access to a coherency unit at a processor P1 to a shared state with a processor P2 (i.e., each having a read access right), the sending of the data from P1 terminates P1's write access right (though it can continue to read the coherency unit) and the arrival of the data at P2 initiates its shared access right. When a transaction transfers a coherency unit from a shared state to exclusive access at a processor P2, the access rights at all processors other than P2 and the processor which owns the coherency unit (if any) are terminated upon reception of the coherence request, the access right of the processor that owns the coherency unit (if there is one) is terminated when it sends the data, and the write access right at P2 is initiated once P2 has received the data from the previous owner (or from memory) and has received the coherence request. Finally, when a coherence request adds a processor P2 to a set of processors that is already sharing a coherency unit, no processor loses access rights and P2 gains the read access right when it receives the data.

Ownership responsibilities may transition in response to the reception of address packets. In the embodiment of FIG. 1, sending and receiving data packets do not affect ownership responsibilities. FIG. 11 is a chart illustrating ownership transitions in response to particular transactions in one embodiment of computer system 140. In FIG. 11, "previous owner" indicates that ownership is unchanged, "initiator" indicates that the client who initiated the transaction becomes the owner, and "memory" indicates that the memory subsystem 144 that maps the coherency unit becomes the owner. In the case of a WB or WBS transaction, the new owner is the memory if the initiator sends a DATA packet to the memory, and the new owner is the previous owner if the initiator sends a NACK packet to the memory. The owner of the coherency unit is either an active device or the memory device that maps the coherency unit. Given any cacheable transaction T which requests a data or ACK packet, the client that was the owner of the coherency unit immediately preceding T will send the requested data or ACK packet. When the system is first initialized, memory is the owner for each coherency unit.

FIG. 4A shows an exemplary directory 220B that may store information regarding the access rights and ownership responsibilities held by various client devices for each coherency unit mapped by the directory. Instead of storing information related to the MOSI states (as shown in FIG. 4), directory 220B stores information relating to the coherence protocol described above. Thus, directory 220B identifies which client device, if any, has an ownership responsibility for a particular coherency unit. Directory 220B may also track which client devices have a shared access right to the coherency unit. For example, a directory entry 620 may indicate the access rights of each client device (e.g., read access R, write access W, or invalid access I) to a coherency unit. Note that in other embodiments, additional or different information may be included in a directory 220B. Furthermore, some directories may include less information. For example, in one embodiment, a directory may only maintain information regarding ownership responsibilities for each coherency unit.

Virtual Networks and Ordering Points

In some embodiments, address network 150 may include four virtual networks: a Broadcast Network, a Request Network, a Response Network, and a Multicast Network. Each virtual network is unordered with respect to the other virtual networks. Different virtual networks may be configured to operate in logically different ways. Packets may be described in terms of the virtual network on which they are conveyed. In the following discussion, a packet is defined to be "received" (or "sent") when any changes in ownership status and/or access rights in response to the packet at the receiving client (or the sending client) have been made, if necessary, pursuant to the coherence protocol.

The Broadcast Network may implement a logical broadcast medium between client devices within a computer system and only convey packets for BC mode transactions. In one embodiment, the Broadcast Network may satisfy the following ordering properties:
1) If a client C1 sends a broadcast packet B1 for a non-cacheable or interrupt address before sending a broadcast packet B2 for a non-cacheable or interrupt address, and if a client C2 receives packets B1 and B2, then C2 receives B1 before it receives B2.
2) If clients C1 and C2 both receive broadcast packets B1 and B2, and if C1 receives B1 before it receives B2, then C2 receives B1 before it receives B2.

The Request Network may implement a logical point-to-point medium between client devices in a computer system and may only convey packets for PTP mode transactions. In one embodiment, coherence requests sent on the Request Network are sent from the client device that initiates a transaction to the device that maps the memory location corresponding to the transaction. The request network may implement the following ordering property:
1) If a client C1 sends a request packet R1 for a non-cacheable or interrupt address before sending a request packet R2 for a non-cacheable or interrupt address, and if a client C2 receives request packets R1 and R2, then C2 receives R1 before it receives R2.

The Response Network may also implement a logical point-to-point medium between client devices in a computer system and may only be used for PTP mode transactions. Packets sent on the Response Network may implement requests for data transfers and changes of ownership. In one embodiment, packets sent on the Response Network are only sent to requesting and/or owning clients. The Response Network may implement the following ordering property:
1) If a client C1 sends a response packet R1 before sending a response packet R2, and if a client C2 receives packets R1 and R2, and if R1 and R2 were both sent for transactions that reference the same coherency unit, then C2 receives R1 before it receives R2.

Finally, the Multicast Network may implement a logical point-to-multipoint medium between client devices in a computer system and is used only for PTP mode transactions. In one embodiment, packets sent on the Multicast Network are sent to the requesting client and non-owning sharers in order to implement changes in access rights. Packets on the Multicast Network may also be sent to additional clients in some embodiments. For example, a computer system may be divided into N portions, and a directory may indicate whether there are non-owning devices that have shared copies of a given coherency unit in each of the N portions. If a single non-owning device in a given portion has shared access to a coherency unit, a multicast may be sent to each device in that portion. The Multicast Network may implement the following ordering property:
1) If a client C1 sends a multicast packet M1 before sending a multicast packet M2, and if a client C2 receives packets M1 and M2, then C2 receives M1 before it receives M2.

In the embodiment of computer system 140 discussed above, various ordering points are established within the computer system. These ordering points govern ownership and access right transitions. One such ordering point is the Broadcast Network. The Broadcast Network is the ordering point for cacheable and non-cacheable BC mode transactions corresponding to a given memory block. All clients in a computer system or domain receive broadcast packets for a given memory block in the same order. For example, if clients C1 and C2 both receive broadcast packets B1 and B2, and C1 receives B1 before B2, then C2 also receives B1 before B2.

In other situations, a client may serve as an ordering point. More particularly, in the embodiment described above, for cacheable PTP mode address transactions, the order in which requests are serviced by the home memory subsystem directory establishes the order of the PTP mode transactions. Ordering for non-cacheable PTP mode address transactions may be established at the target of each non-cacheable transaction.

Packets in the same virtual network are subject to the ordering properties of that virtual network. Thus, packets in the same virtual network may be ordered with respect to each other. However, packets in different virtual networks may be partially or totally unordered with respect to each other. For example, a packet sent on the Multicast network may overtake a packet sent on the Response network and vice versa.

In addition to supporting various virtual networks, computer system 140 may be configured to implement the Synchronized Networks Property. The Synchronized Networks Property is based on the following orders:
1) Local Order ($<_l$): Event X precedes event Y in local order, denoted $X <_l Y$, if X and Y are events (including the sending or reception of a packet on the address or data network, a read or write of a coherency unit, or a local change of access rights) which occur at the same client device C and X occurs before Y.
2) Message Order ($<_m$): Event X precedes event Y in message order, denoted $X <_m Y$, if X is the sending of a packet M on the address or data network and Y is the reception of the same packet M.
3) Invalidation Order ($<_i$): Event X precedes event Y in invalidation order, denoted $X <_i Y$, if X is the reception of a broadcast or multicast packet M at a client device C1 and Y is the reception of the same packet M at a client C2, where C1 does not equal C2, and where C2 is the initiator of the transaction that includes the multicast or broadcast packet.

Using the orders defined above, the Synchronized Networks Property holds that:
1) The union of the local order $<_l$, the message order $<_m$, and the invalidation order $<_i$ is acyclic.

The Synchronized Networks Property may also be implemented in embodiments of address network 150 that do not support different virtual networks.

Coherence Transactions in Broadcast (BC) Mode

The following discussion describes how one embodiment of computer system 140 may perform various coherence transactions for coherency units in BC mode. In one embodiment of a computer system supporting both BC and PTP modes, BC mode address packets may be conveyed on a broadcast virtual network like the one described above.

Figure 12C:
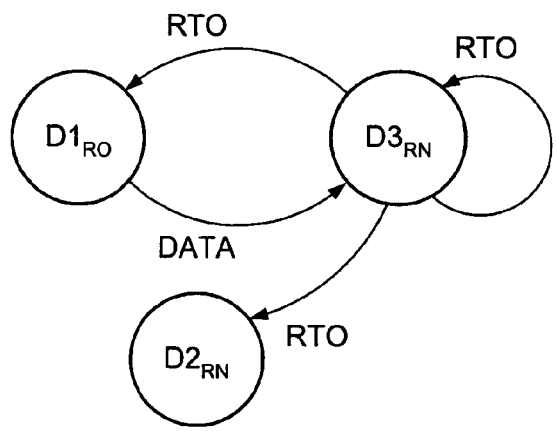

The transitioning of access rights and ownership responsibilities of client devices for coherency transactions in BC mode may be better understood with reference to the exemplary coherence operations depicted in FIGS. 12A-12F. Note that the examples shown in FIGS. 12A-12F are merely exemplary. For simplicity, these examples show devices involved in a particular transaction and do not show other devices that may also be included in the computer system. FIG. 12A illustrates a situation in which an active device D1 has a W (write) access right and ownership (as indicated by the subscript "WO"). An active device D2 (which has an invalid access right and is not an owner, as indicated by the subscript "IN") initiates an RTS in order to obtain the R access right. In this case, D1 will receive the RTS packet from D2 through address network 150. Since the RTS packet is broadcast, D2 (and any other client devices in computer system 140) also receives the RTS packet through address network 150. In response to the RTS, D1 sends a corresponding data packet (containing the requested data) to device D2. It is noted that D1 can receive additional address and data packets before sending the corresponding data packet to D2. When D1 sends the corresponding data packet to D2, D1 loses its W access right and changes its access right to an R access right. When D2 receives the corresponding data packet, it acquires an R access right. D1 continues to maintain ownership of the coherency unit.

FIG. 12B illustrates a situation in which an active device D1 has a W access right and ownership (as indicated by the subscript "WO"), and an active device D2 (which has invalid access and no ownership) initiates an RTO transaction in order to obtain a W access right. In this case, D1 will receive the RTO packet from D2 over address network 150. As a result, D1 changes its ownership status to N (not owner) and sends a corresponding data packet to D2. It is noted, however, that D1 can receive additional address and/or data packets before sending the corresponding data packet to D2. D2 also receives its own RTO via address network 150 since the RTO is broadcast. When D1 sends the corresponding data packet to D2, D1 loses its W access right and changes its right to an I access right. When D2 receives its own RTO via address network 150, its ownership status changes to O (owned). When D2 receives the corresponding data packet, it acquires a W access right.

FIG. 12C illustrates a situation in which an active device D1 has a read (R) access right to and ownership of a particular coherency unit. Active devices D2 and D3 also have an R access right to the coherency unit. Devices D2 and D3 do not have an ownership responsibility for the coherency unit. Active device D3 sends an RTO in order to obtain a W access right. In this case, D1 will receive the RTO from D3 via address network 150. Upon receipt of the RTO address packet, D1 changes its ownership status to N (no ownership) and sends a corresponding data packet (DATA) to D3. It is noted, however, that D1 can receive additional address and data packets before sending the corresponding data packet to D3. When D1 sends the corresponding data packet to D3, D1 changes its access right to an I access right. In addition, D2 will also receive the RTO via address network 150. When D2 receives the RTO, it changes its R access right to an I access right. Furthermore, when D3 receives its own RTO via address network 150, its ownership status is changed to O. When D3 receives the corresponding data packet (DATA) from D1, it acquires a W access right to the coherency unit. It is noted that the corresponding data packet and its own RTO may be received by D3 before the invalidating RTO packet arrives at D2. In this case, D2 could continue to read the coherency unit even after D3 has started to write to it.

Figure 12D:
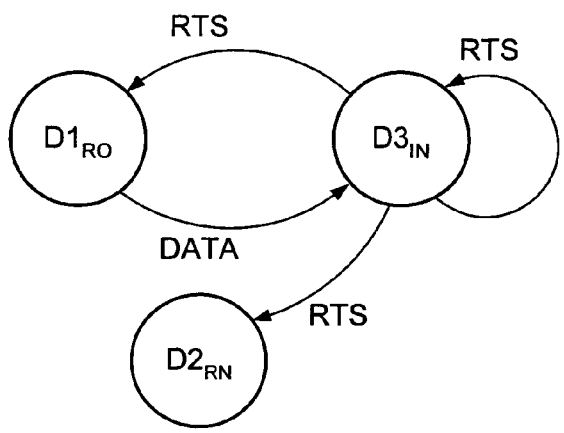

FIG. 12D illustrates a situation in which an active device D1 has an R access right and ownership of a particular coherency unit, active device D2 has an R access right (but not ownership) to the coherency unit, and active device D3 issues an RTS in order to obtain the R access right to the coherency unit. In this case, D1 will receive the RTS from D3 via the address network 150. In response to the RTS, D1 sends a corresponding data packet to D3. When D3 receives the corresponding data packet, its access right changes from an I access right to an R access right. The reception of the RTS at D1 and D2 does not cause a change in the access rights at D1 or D2. Furthermore, receipt of the RTS address packet at D1 and D2 does not cause any change in ownership for the coherency unit.

In the case of WS (Write Stream) transaction in which an entire coherency unit is written by an active device and sent to memory, the device initiating the WS may receive an ACK packet from the processing subsystem 142 (or memory subsystem 144) that most recently (in address broadcast order) owned the coherency unit. It is noted that this ACK packet may be sent in place of a regular data message (and in fact a data packet may be used), and that only one such ACK message may be sent in response to the WS.

Figure 12E:
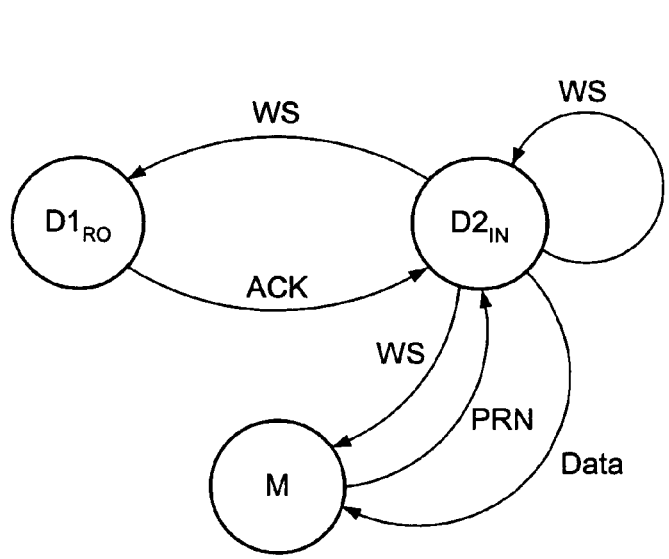

FIG. 12E illustrates a situation in which an active device D1 has an R access right and ownership of a coherency unit and an active device D2 initiates a WS transaction for that coherency unit. As shown, the WS request is received by D1 as well as the home memory subsystem 144 that maps the coherency unit through address network 150. In response to D2's WS packet, D1 sends a corresponding ACK packet to D2 (e.g., on data network 152). It is noted, however, that D1 can receive additional address and data packets before sending the corresponding ACK packet to D2. When D1 sends the corresponding ACK packet to D2, D1 changes its access right to an I access right. When D2 receives the ACK packet from D1, its access right changes to A (All-Write). In addition, the memory subsystem (M) that maps the coherency unit forwards a PRN packet on data network 152 to D2. When D2 writes to the entire coherency unit, D2 forwards a data packet to the memory subsystem M. Upon receipt of the WS request through address network 150, D1 changes its ownership status to N (not-owned), and the memory subsystem M changes its ownership status to owned.

Figure 12F:
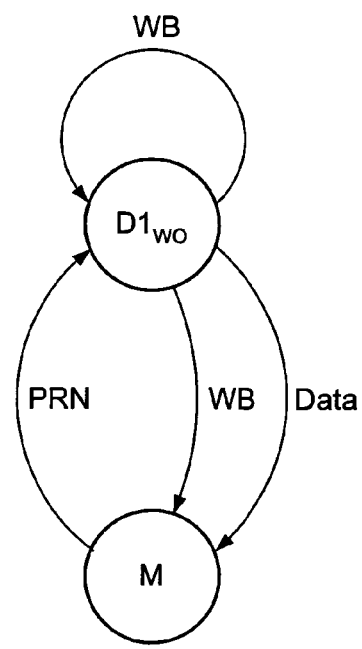

FIG. 12F illustrates a situation in which an active device D1 has a W access right and ownership of a coherency unit and initiates a WB transaction in order to write that coherency unit back to memory. The memory subsystem (M) that maps the coherency unit receives the WB packet through address network 150, and responsively forwards a PRN packet through data network 152 to D1. As a result, D1 sends a corresponding data packet (DATA) to memory M. It is noted that D1 can receive additional address and/or data packets before sending the corresponding data packet to memory M. When D1 receives its own WB through address network 150, its ownership status changes to N. When D1 sends the corresponding data packet to memory M, its access right is changed to an I access right. In response to receiving the WB packet on the address network 152, memory M may become the owner of the coherence unit. WBS (write back shared) transactions may be handled similarly.

It is contemplated that numerous variations of computer systems may be designed that employ the principle rules for changing access rights in active devices as described above while in BC mode. Such computer systems may advantageously maintain cache consistency while attaining efficient operation. It is noted that embodiments of computer system 140 are possible that implement subsets of the transactions described above in conjunction with FIGS. 12A-12F. Furthermore, other specific transaction types may be supported, as desired, depending upon the implementation.

It is also noted that variations with respect to the specific packet transfers described above for a given transaction type may also be implemented. Additionally, while ownership transitions are performed in response to receipt of address packets in the embodiments described above, ownership transitions may be performed differently during certain coherence transactions in other embodiments.

In addition, in accordance with the description above, an owning device may not send a corresponding data packet immediately in response to receiving a packet (such as an RTO or RTS) corresponding to a transaction initiated by another device. In one embodiment, a maximum time period (e.g., maximum number of clock cycles, etc.) may be used to limit the overall length of time an active device may expend before sending a responsive data packet.

Coherence Transactions in Point-to-Point (PTP) Mode

FIGS. 13A-13G illustrate how various coherence transactions may be carried out in PTP mode. In the following discussion, a variety of scenarios are depicted illustrating coherency activity in a computer system utilizing one exemplary directory-based coherency protocol, although it is understood that other specific protocols may alternatively be employed. In some embodiments, PTP-mode address packets may be conveyed in one of three virtual networks: the Request Network, the Response Network, and the Multicast Network.

In one embodiment of a computer system that implements PTP mode transactions on address network 150, a device may initiate a transaction by sending a request packet on the Request Network. The Request Network may convey the request packet to the device that maps the coherency unit (the home subsystem for that coherency unit) corresponding to the request packet. In response to receiving a request packet, the home subsystem may send one or more packets on the Response, Multicast, and/or Data Networks.

Figure 13A:
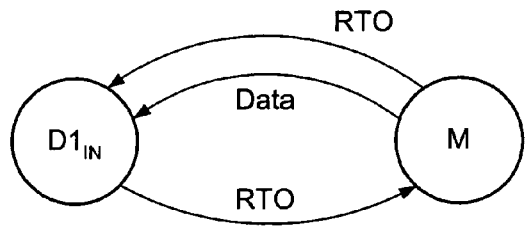

FIG. 13A is a diagram depicting coherency activity for an exemplary embodiment of computer system 140 as part of a read-to-own (RTO) transaction upon address network 150. A read-to-own transaction may be performed when a cache miss is detected for a particular coherency unit requested by a processing subsystem 142 and the processing subsystem 142 requests write permission to the coherency unit. For example, a store cache miss may initiate an RTO transaction. As another example, a prefetch for a write may initiate an RTO transaction.

In FIG. 13A, the requesting device D1 initiates a read-to-own transaction. D1 has the corresponding coherency unit in an invalid state (e.g., the coherency unit is not stored in the device) and is not the owner of the corresponding coherency unit, as indicated by the subscript "IN." The home memory subsystem M is the owner of the coherency unit. The read-to-own transaction generally causes transfer of the requested coherency unit to the requesting device D1.

Upon detecting a cache miss, the requesting device D1 sends a read-to-own coherence request (RTO) on the address network 150. Since the request is in PTP mode, address network 150 conveys the request to the home memory subsystem M of the coherency unit. In some embodiments, home memory subsystem M may block subsequent transactions to the requested coherency unit until the processing of the RTO transaction is completed at M. In one embodiment, home memory subsystem may include an address agent to process address packets and a data agent that processes data packets (e.g., the data agent may send a data packet in response to a request from the address agent). In such an embodiment, the home memory subsystem may unblock subsequent transactions to the requested coherency unit as soon as the address agent has finished processing the RTO packet.

Home memory subsystem M detects that no other devices have a shared access right to the coherency unit and that home memory subsystem M is the current owner of the coherency unit. The memory M updates the directory to indicate that the requesting device D1 is the new owner of the requested coherency unit and sends a response RTO to the requesting device D1 (e.g., on the Response Network). Since there are no sharing devices, home memory subsystem M may supply the requested data (DATA) directly to the requesting device D1. In response to receiving the RTO packet on address network 150, device D1 may gain ownership of the requested coherency unit. In response to receiving both the RTO and the DATA packet, device D1 may gain a write access right to the coherency unit. Write access is conditioned upon receipt of the RTO because receipt of the RTO indicates that shared copies of the requested coherency unit have been invalidated.

Figure 13B:
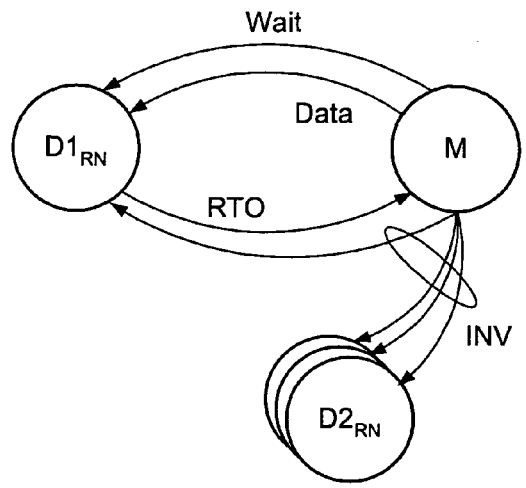

FIG. 13B shows an example of an RTO transaction where there are sharing devices D2 that have a read access right to the requested coherency unit. In this example, an active device D1 has a R access right but not ownership to a coherency unit and initiates an RTO transaction in order to gain a W access right to that coherency unit. The address network 150 conveys the RTO request to the home memory subsystem M. Based on information stored in a directory, home memory subsystem M detects that there are one or more devices D2 with a shared access right to the coherency unit. In order to invalidate the shared copies, home memory subsystem M conveys an invalidating request (INV) to the devices D2 that have a shared access right to the data (e.g., on the Multicast Network). In this example, memory subsystem M is the owner of the requested coherency unit so memory M also forwards a data packet (DATA) corresponding to the requested coherency unit to the requesting device D1.

Receipt of invalidating request INV causes devices D2 to lose the shared access right to the coherency unit (i.e., devices D2 transition their access rights to the I (invalid) access right). With respect to each of devices D2, the invalidating request INV is a "foreign" invalidating request since it is not part of a transaction initiated by that particular device. The home memory subsystem M also conveys the invalidating request INV to requesting device D1 (e.g., on the Multicast Network). Receipt of the INV by the requesting device indicates that shared copies have been invalidated and that write access is now allowed. Thus, upon receipt of the DATA from memory M and the INV, device D1 may gain write access to the coherency unit.

In addition to sending the invalidating request INV to requesting device D1, home memory subsystem M also sends requesting device D1 a data coherency response WAIT (e.g., on the Response Network). The WAIT response indicates that device D1 should not gain access to the requested coherency unit until D1 has received both the data and an invalidating request INV. D1 may regard the INV as a "local" invalidating request since it is part of the RTO transaction initiated by D1. Thus, the recipient of a local invalidating request (in conjunction with the receipt of a local DATA packet) may gain an access right to the coherency unit while the recipient of a foreign invalidating request loses an access right to the coherency unit. As mentioned briefly above, if the WAIT and INV packets are sent on different virtual networks, it may be possible for device D1 to receive the packets in any order if the virtual networks are unordered with respect to each other. Furthermore, since the DATA packet is conveyed on data network 140, the DATA packet may be received before either of the address packets in some embodiments. Accordingly, if device D1 receives the WAIT response, device D1 may not transition access rights to the coherency unit until both the DATA and the INV have been received. However, if device D1 receives the INV and the DATA before the WAIT, device D1 may gain an access right to the coherency unit, since the INV indicates that any shared copies have been invalidated. When device D1 receives the WAIT response, it may gain ownership responsibilities for the requested coherency unit, regardless of whether the DATA and INV have already been received.

Returning to FIG. 13A, if the requesting device D1 receives the DATA before the RTO response from home memory subsystem M, D1 may not gain an access right to the data until it also receives the RTO response (since D1 may otherwise be unaware of whether there are any shared copies that should be invalidated before D1 gains an access right to the requested data). Once D1 receives the RTO, it may transition its access rights to the coherency unit since receipt of the RTO (as opposed to a WAIT) response indicates that there is no need to wait for an INV. Note that in alternative embodiments, the home memory subsystem M may always send the requesting device an INV (or similar indication that shared copies, if any, have been invalidated) in response to a request (e.g., RTO or WS) that requires shared copies to be invalidated, even if there are no shared copies, so that a separate WAIT packet is unnecessary. In one such embodiment, the address network (as opposed to the home memory subsystem) may return the coherency reply (e.g., the RTO response) that causes an ownership transition to the requesting device.

As mentioned above, in some embodiments, computer system 140 may be configured to send some requests in both BC and PTP modes, and requesting devices such as D1 may be unaware of the mode in which a particular request is transmitted. In such embodiments, however, requesting devices may be configured to transition ownership responsibilities and access rights correctly regardless of the mode in which the request is transmitted. For example, in BC mode, the requester may receive its own RTO on the Broadcast Network (as opposed to on the Response Network from the home memory subsystem). In response to the RTO, the device may transition ownership responsibilities and be aware that it can transition access rights in response to receiving the DATA (since the RTO indicates that there is no need to wait for an INV to invalidate any shared copies). Thus, the data coherency transactions described above may be used in systems that support both BC and PTP modes where requesting devices are not necessarily aware of which mode their request is transmitted in.

Figure 13C:
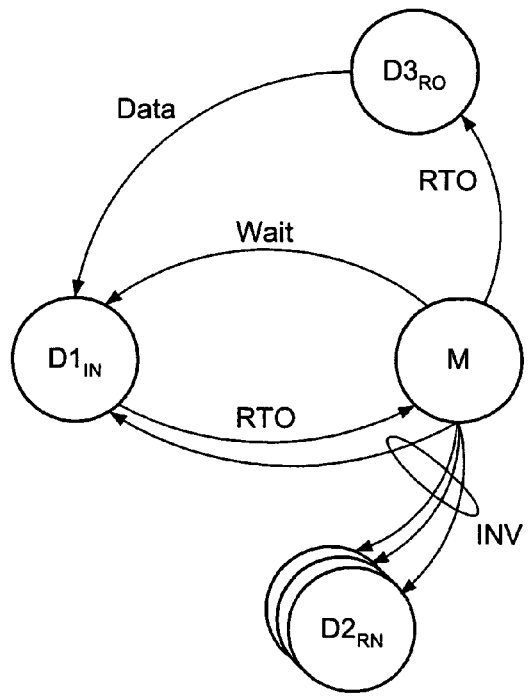

FIG. 13C is a diagram depicting coherency activity in response to a read-to-own request when a device D3 has read access to and is the current owner of the requested coherency unit (as indicated by the subscript "O") and other devices D2 have shared copies of the coherency unit. As in FIGS. 13A and 13B, a requesting device D1 initiates an RTO transaction by sending a read-to-own request on the address network 150. Since the RTO request is in PTP mode, the address network (e.g., the Request Network) conveys the RTO request to the home memory subsystem M. Home memory subsystem M marks the requesting device D1 as the new owner of the coherency unit and sends an RTO response (e.g., on the Response Network) to the prior owner, device D3, of the requested coherency unit. In response to the RTO response (which D3 may regard a "foreign" response since it is not part of a transaction initiated by device D3), device D3 supplies a copy of the coherency unit to device D1. Device D3 loses its ownership responsibilities for the coherency unit in response to receiving the RTO response and loses its access rights to the coherency unit in response to sending the DATA packet to D1. Note that D3 may receive other packets before sending the DATA packet to D1.

Since there are shared copies of the requested coherency unit, the home memory subsystem M sends an invalidating request INV to the sharing devices D2 and requesting device D1 (e.g., on the Multicast Network). Devices D2 invalidate shared copies of the coherency unit upon receipt of INV. Home memory subsystem M also sends a WAIT response (e.g., on the Response Network) to the requesting device D1. In response to receiving the WAIT response, D1 gains ownership of the requested coherency unit. In response to receiving the DATA containing the coherency unit from device D3 and the INV, device D1 gains write access to the coherency unit.

Figure 13D:
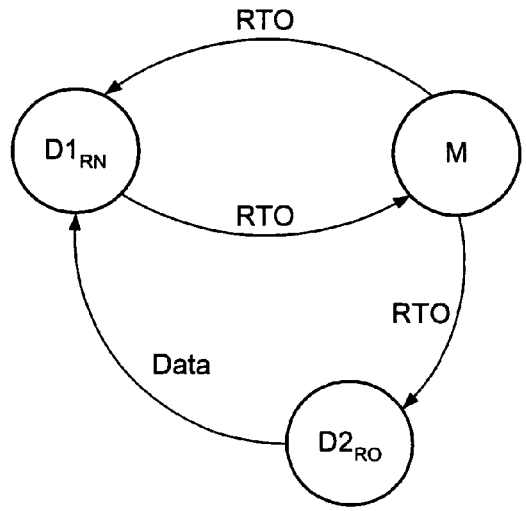

FIG. 13D shows another exemplary RTO transaction. In this example, a requesting device D1 has read access to a coherency unit. Another device D2 has ownership of and read access to the coherency unit. In order to gain write access, D1 initiates an RTO transaction for the coherency unit by sending an RTO request on the address network. The address network conveys the RTO request to the home memory subsystem for the coherency unit. The memory subsystem M sends an RTO response to the owning device D2. When there are non-owning active devices that have shared access to a requested coherency unit, the memory subsystem normally sends INV packets to the sharing devices. However, in this example, the only non-owning sharer D1 is also the requester. Since there is no need to invalidate D1's access right, the memory subsystem may not send an INV packet to D1, thus reducing traffic on the address network. Accordingly, the memory subsystem M may return an RTO response (as opposed to a WAIT) to the requesting device D1. Upon receipt of the RTO response, D1 gains ownership of the requested coherency unit. Likewise, D2 loses ownership upon receipt of the RTO response. D1 gains write access to the requested coherency unit upon receipt of both the RTO response and the DATA packet from D2.

FIG. 13E illustrates a read-to-share (RTS) transaction. In this example, a requesting device D1 has neither an access right to nor ownership of a particular coherency unit. One or more devices D2 have shared access to the coherency unit, and a device D3 has ownership of and read access to the coherency unit. Requesting device D1 initiates the RTS transaction by sending an RTS request upon the address network. Since the request is in PTP mode, the address network (e.g., the Request Network) conveys the RTS request to the home memory subsystem M for the requested coherency unit. In response to the RTS request, home memory subsystem M sends an RTS response (e.g., on the Response Network) on the address network to the owning device D3, which causes device D3 to provide the requesting device D1 with a copy of the requested coherency unit (DATA). Note that if home memory subsystem M had been the owning device, it would have sent the requested coherency unit to the requesting device. Upon receipt of the requested coherency unit, device D1 gains a shared access right to the coherency unit. The RTS transaction has no effect on the devices D2 that have a shared access right to the coherency unit. Additionally, since device D1's ownership rights do not transition during a RTS transaction, device D1 does not receive a response on the address network (and thus in embodiments supporting both BC and PTP modes, receiving a local RTS when in BC mode may have no effect on the initiating device). In a situation where there are no sharing devices D2 and a device D3 has write access to the coherency unit, D3's sending a copy of the requested coherency unit to device D1 causes device D3 to transition its write access right to a read access right.

FIG. 13F shows an exemplary write stream (WS) transaction. In this example, device D2 has invalid access and no ownership of a particular coherency unit. D1 has ownership of and write access to the coherency unit. D2 initiates a WS transaction by sending a WS request on the address network. The address network conveys the request (e.g., on the Request Network) to the home memory subsystem M. The home memory subsystem M forwards the WS request (e.g., on the Response Network) to the owning device D1 and marks itself as the owner of the coherency unit. In response to receiving the WS request, the owning device D1 loses its ownership of the coherency unit and sends an ACK packet representing the coherency unit on the data network to the initiating device D2. It is noted that D1 can receive additional address and/or data packets before sending the ACK packet to device D2. D1 loses its write access to the coherency unit upon sending the ACK packet.

The home memory subsystem M also sends a WS response (e.g., on the Response Network) to the requesting device. Note that the memory M may instead send an INV packet (e.g., on the Multicast Network) if any devices have a shared access right to the coherency unit involved in the WS transaction. In response to receiving the ACK and the WS (or the INV), the requesting device D2 gains an A (All Write) access right to the coherency unit. The home memory system also sends a PRN packet on the data network to the initiating device D2. In response to the PRN packet, the initiating device sends a data packet (DATA) containing the coherency unit to the memory M. The initiating device loses the A access right when it sends the data packet to memory M.

FIG. 13G illustrates a write-back (WB) transaction. In this example, the initiating device D1 initially has ownership of and write access to a coherency unit. The device D1 initiates the WB transaction by sending a WB request on the address network (e.g., on the Request Network). The address network conveys the request to the home memory subsystem M. In response to the WB request, memory M marks itself as the owner of the coherency unit and sends a WB response (e.g., on the Response Network) to the initiating device D1. Upon receipt of the WB response, initiating device D1 loses ownership of the coherency unit. Memory M also sends a PRN packet (e.g., upon the data network) to device D1. In response to the PRN, device D1 sends the coherency unit (DATA) to memory M on the data network. Device D1 loses its access right to the coherency unit when it sends the DATA packet.

The above scenarios are intended to be exemplary only. Numerous alternatives for implementing a directory-based coherency protocol are possible and are contemplated. For example, in the scenario of FIG. 13A, the data packet from memory M may serve to indicate no other valid copies remain within other devices D2. In alternative embodiments, where ordering within the network is not sufficiently strong, various forms of acknowledgments (ACK) and other replies may be utilized to provide confirmation that other copies have been invalidated. For example, each device D2 receiving an invalidate packet (e.g., on the Multicast Network) may respond to the memory M with an ACK. Upon receiving all expected ACKs, memory M may then convey an indication to initiating device D1 indicating that no other valid copies remain within devices D2. Alternatively, initiating device D1 may receive a reply count from memory M or a device D2 indicating a number of replies to expect. Devices D2 may then convey ACKs directly to initiating device D1. Upon receiving the expected number of replies, initiating device D1 may determine all other copies have been invalidated.

While the above examples assume that initiating devices are unaware of whether transactions are implemented in BC or PTP mode, initiating devices may control or be aware of whether transactions are implemented in PTP or BC mode in other embodiments. For example, each initiating device may indicate which virtual network (e.g., Broadcast or Request) or mode a request should be sent in using a virtual network or mode ID encoded in the prefix of the request packet. In other embodiments, a device may be aware of which mode a packet is transmitted in based on virtual network or mode ID encoded (e.g., by the address network) in a packet prefix and may be configured to process packets differently depending on the mode. In such embodiments, a given packet may have a different effect when received as part of a BC mode transaction than when received as part of a PTP mode transaction.

As with the BC mode transactions described above, it is contemplated that numerous variations of computer systems may be designed that employ the principle rules for changing access rights in active devices as described above while in PTP mode. For example, other specific transaction types may be supported, as desired, depending upon the implementation.

It is also noted that variations with respect to the specific packet transfers described above for a given transaction type may also be implemented. Additionally, while ownership transitions are performed in response to receipt of address packets in the embodiments described above, ownership transitions may be performed differently during certain coherence transactions in other embodiments.

In addition, in accordance with the description above, an owning device may not send a corresponding data packet immediately in response to receiving a packet (such as an RTO or RTS) corresponding to a transaction initiated by another device. Instead, the owning device may send and/or receive additional packets before sending the corresponding data packet. In one embodiment, a maximum time period (e.g., maximum number of clock cycles, etc.) may be used to limit the overall length of time an active device may expend before sending a responsive data packet.

Synchronized Networks Property

The Synchronized Networks Property identified above may be achieved using various mechanisms. For example, the Synchronized Networks Property may be achieved by creating a globally synchronous system running on a single clock, and tuning the paths in address network 150 to guarantee that all address packets received by multiple devices (e.g., all multicast and broadcast address packets) arrive at all recipient devices upon the same cycle. In such a system, address packets may be received without buffering them in queues. However, in some embodiments it may instead be desirable to allow for higher communication speeds using source-synchronous signaling in which a source's clock is sent along with a particular packet. In such implementations, the cycle at which the packet will be received may not be known in advance. In addition, it may further be desirable to provide queues for incoming address packets to allow devices to temporarily receive packets without flow controlling the address network 150.

In some embodiments, the Synchronized Networks Property may be satisfied by implementing a Synchronized Multicasts Property. The Synchronized Multicasts Property is based on the following definitions:

1) Logical Reception Time: Each client device receives exactly 0 or 1 multicast or broadcast packets at each logical reception time. Logical reception time progresses sequentially (0,1,2,3, . . . , n). Any multicast or broadcast arrives at the same logical reception time at each client device that receives the multicast or broadcast.

2) Reception Skew: Reception skew is the difference, in real time, from when a first client device C1 is at logical reception time X to when a second client device C2 is at logical reception time X (e.g., the difference, in real time, from when C1 receives a particular multicast or broadcast packet to when C2 receives the same multicast or broadcast packet). Note that the reception skew is a signed quantity. Accordingly, the reception skew from C1 to C2 for a given logical reception time X may be negative if C1 reaches logical reception time X after C2 reaches logical reception time X.

The Synchronized Multicasts Property states that if a point-to-point message M1 is sent from a device C1 to a device C2, and if C1 sends M1 after logical reception time X at C1, then M1 is received by C2 after logical reception time X at C2.

Figure 14:
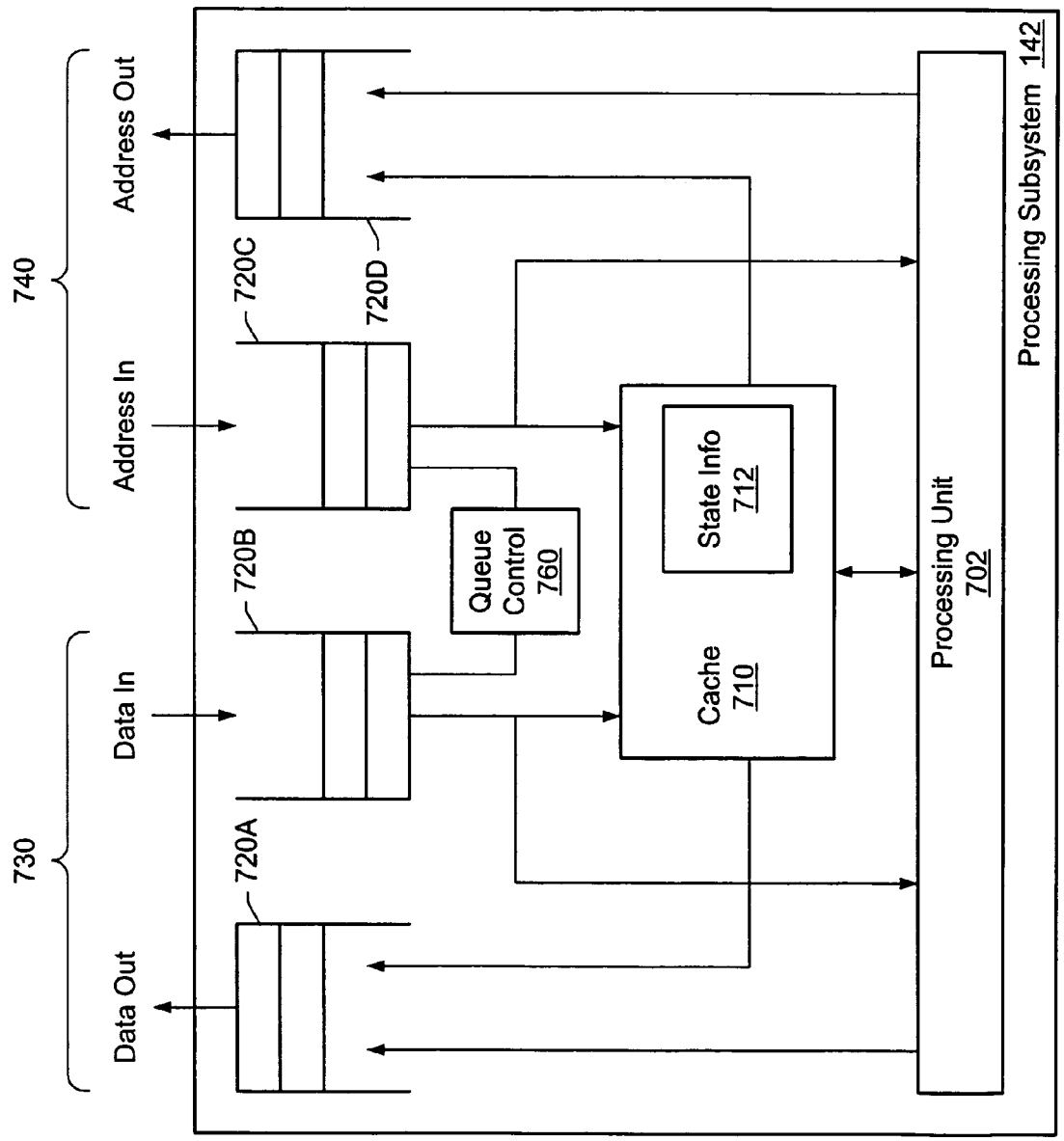
FIG. 14 is a block diagram illustrating details of one embodiment of each of the processing subsystems of FIG. 1.

Details regarding one implementation of computer system 140 which maintains the Synchronized Multicasts Property (and thus the Synchronized Networks Property) without requiring a globally synchronous system and which allows address packets to be buffered is described in conjunction with FIG. 14. FIG. 14 is a block diagram illustrating details of one embodiment of each of the processing subsystems 142 of computer system 140. Included in the embodiment of FIG. 14 are a processing unit 702, cache 710, and queues 720A-720D. Queues 720A-720B are coupled to data network 152 via data links 730, and queues 720C-720D are coupled to address network 150 via address links 740. Each of queues 720 includes a plurality of entries each configured to store an address or data packet. In this embodiment, a packet is "sent" by a subsystem when it is placed into the subsystem's address-out queue 720D or data-out queue 720A. Similarly, a packet may be "received" by a subsystem when it is popped from the subsystem's data-in 720B or address-in queue 720C. Processing unit 702 is shown coupled to cache 710. Cache 710 may be implemented using a hierarchical cache structure.

Processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular coherency unit within cache 710, as discussed above. In accordance with the foregoing, if processing unit 702 attempts to read or write to a particular coherency unit and cache state info 712 indicates processing unit 702 does not have adequate access rights to perform the desired operation, an address packet that includes a coherence request may be inserted in address out queue 720D for conveyance on address network 150. Subsequently, data corresponding to the coherency unit may be received via data-in queue 720B.

Processing subsystem 142 may receive coherency demands via address-in queue 720C, such as those received as part of a read-to-own or read-to-share transaction initiated by another active device (or initiated by itself). For example, if processing subsystem 142 receives a packet corresponding to a read-to-own transaction initiated by a foreign device for a coherency unit, the corresponding coherency unit may be returned via data-out queue 720A (e.g., if the coherency unit was owned by the processing subsystem 142) and/or the state information 712 for that coherency unit may be changed to invalid, as discussed above. Other packets corresponding to various coherence transactions and/or non-cacheable transactions may similarly be received through address-in queue 720C. Memory subsystems 144 and I/O subsystem 146 may be implemented using similar queuing mechanisms.

The Synchronized Multicasts Property may be maintained by implementing address network 150 and data network 152 in accordance with certain network conveyance properties and by controlling queues 720 according to certain queue control properties. In particular, in one implementation address network 150 and data network 152 are implemented such that the maximum arrival skew from when any multicast or broadcast packet (conveyed on address network 150) arrives at any first client device to when the same multicast or broadcast packet arrives at any second, different client device is less than the minimum latency for any message sent point-to-point (e.g., on the Response or Request virtual networks or on the data network 152) from the first client device to the second client device. Such an implementation results in a Network Conveyance Property (which is stated in terms of packet arrivals (i.e., when packets arrive at in queues 720B and 720C) rather than receptions (i.e., when a packet affects ownership status and/or access rights in the receiving device)). The Network Conveyance Property is based on the following definitions:

1) Logical Arrival Time: Exactly 0 or 1 multicast or broadcast packets arrive at each client device at each logical arrival time. Logical arrival time progresses sequentially (0,1,2,3, . . . , n). Any multicast or broadcast is received at the same logical arrival time by each client device that receives the multicast or broadcast.

2) Arrival Skew: Arrival skew is the difference, in real time, from when a first client device C1 is at logical arrival time X to when a second client device C2 is at logical arrival time X (e.g., the difference, in real time, from when a particular multicast or broadcast packet arrives at C1 to when the same multicast or broadcast packet arrives at C2). Note that the arrival skew is a signed quantity. Accordingly, the arrival skew from C1 to C2 for a given logical arrival time X may be negative if C1 reaches logical arrival time X after C2 reaches logical arrival time X.

The Network Conveyance Property states that if a point-to-point packet M1 is sent from a client device C1 to a client device C2, and if logical arrival time X occurs at C1 before C1 sends M1, then logical arrival time X occurs at C2 before M1 arrives at C2.

In addition to implementing address network 150 and data network 152 such that the Network Conveyance Property holds, address-in queue 720C and data-in queue 720B are controlled by a queue control circuit 760 such that packets from the address and data networks are placed in the respective queue upon arrival and are removed (and thus received) in the order they are placed in the queues (i.e., on a first-in, first-out basis per queue). Furthermore, no data packet is removed from the data-in queue 720B for processing until all address packets that arrived earlier than the data packet have been removed from the address-in queue 720C.

In one embodiment, queue control circuit 760 may be configured to store a pointer along with an address packet when it is stored in an entry at the head of the address-in queue 720C. The pointer indicates the next available entry in the data-in queue 720B (i.e., the entry that the data-in queue 720C will use to store the next data packet to arrive). In such an embodiment, address packets are received (i.e., they affect the access rights of corresponding coherency units in cache 710) after being popped from the head of address-in queue 720C. Queue control circuit 760 may be configured to prevent a particular data packet from being received (i.e., processed by cache 710 in such a way that access rights are affected) until the pointer corresponding to the address packet at the head of the address-in queue 720C points to an entry of data-in queue 720B that is subsequent to the entry including the particular data packet. In this manner, no data packet is removed from the data-in queue 720B for processing until all address packets that arrived earlier than the data packet have been removed from the address-in queue 720C.

In an alternative embodiment, queue control circuit 760 may be configured to place a token in the address-in queue 720C whenever a packet is placed in the data-in queue 720B. In such an embodiment, queue control 760 may prevent a packet from being removed from the data-in queue 720B until its matching token has been removed from the address-in queue 720C. It is noted that various other specific implementations of queue control circuit 760 to control the processing of packets associated with queues 720 are contemplated.

By controlling address-in queue 720C and data-in queue 720B in this manner and by implementing address network 150 and data network 152 in accordance with the Network Conveyance Property discussed above, computer system 140 may maintain the Synchronized Multicasts Property.

In alternative embodiments, the Synchronized Multicasts Property may be satisfied using timestamps. For example, timestamps may be conveyed with data and/or address packets. Each device may inhibit receipt of a particular packet based on that packet's timestamp such that the Synchronized Multicasts Property holds.

Figure 15:
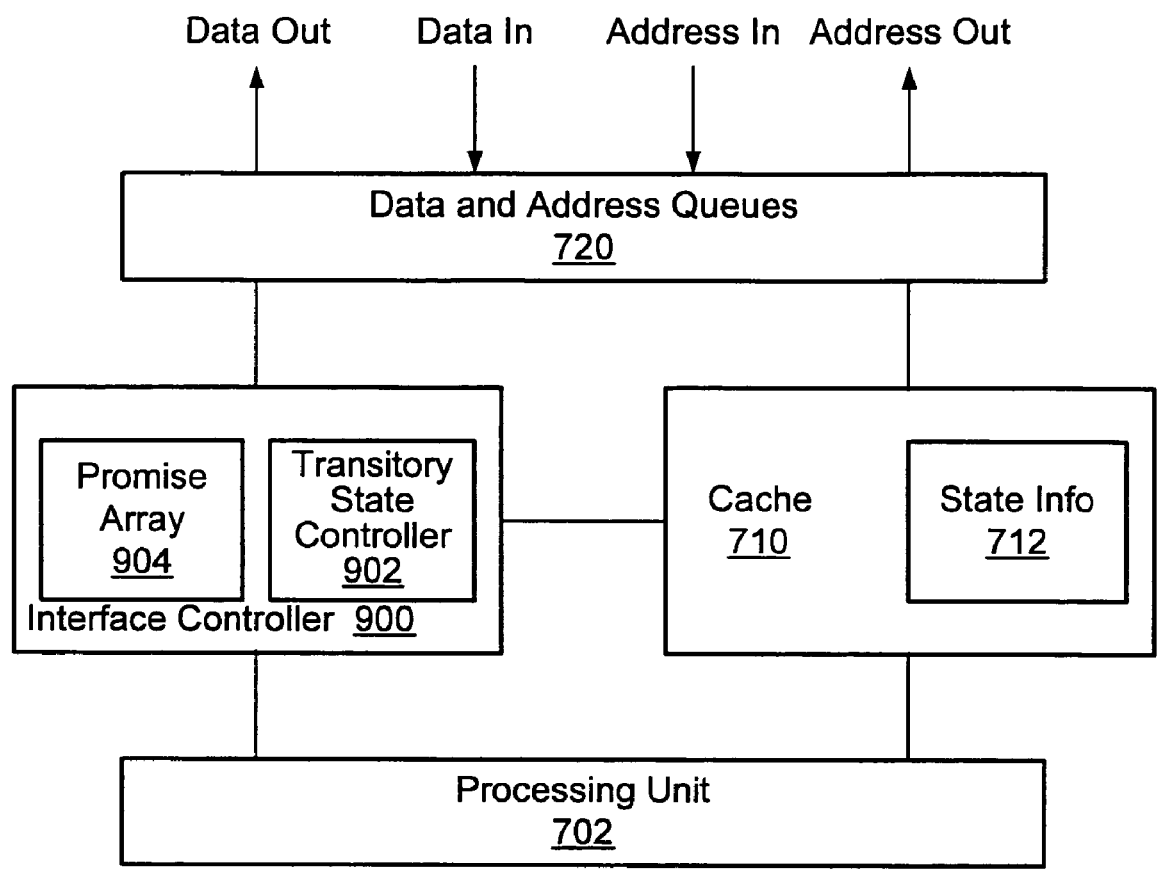
FIG. 15 is a block diagram illustrating further details regarding one embodiment of each of the processing subsystems of FIG. 1.

Turning next to FIG. 15, further details regarding an embodiment of each of the processing subsystems 142 of FIG. 1 are shown. Circuit portions that correspond to those of FIG. 14 are numbered identically.

FIG. 15 depicts an interface controller 900 coupled to processing unit 702, cache 710, and data and address queues 720. Interface controller 900 is provided to control functionality associated with the interfacing of processing subsystem 142 to other client devices through address network 150 and data network 152. More particularly, interface controller 900 is configured to process various requests initiated by processing unit 702 that require external communications (e.g., packet transmissions) to other client devices, such as load and store requests that initiate read-to-share and read-to-own transactions. Interface controller 900 is also configured to process communications corresponding to transactions initiated by other client devices. In one particular implementation, interface controller 900 includes functionality to process transactions in accordance with the foregoing description, including that associated with the processing of the coherence operations as illustrated in FIGS. 12A-12F and FIGS. 13A-13G. For this purpose, functionality depicted as transitory state controller 902 is provided within interface controller 900 for processing outstanding local transactions (that is, transactions initiated by processing subsystem 142 that have not reached a stable completed state). To support this operation, information relating to the processing of coherence operations (including state information) may be passed between interface controller 902 and cache 710. Transitory state controller 902 may include multiple independent state machines (not shown), each of which may be configured to process a single outstanding local transaction until completion.

The functionality depicted by transitory state controller 902 may be configured to maintain various transitory states associated with outstanding transactions, depending upon the implementation and the types of transactions that may be supported by the system. For example, from the exemplary transaction illustrated in FIG. 12B, device D2 enters a transitory state 10 (Invalid, Owned) after receiving its own RTO and prior to receiving a corresponding data packet from device D1. Similarly, device D1 enters transitory state WN (Write, Not Owned) in response to receiving the RTO from device D2. D1's transitory state is maintained until the corresponding data packet is sent to device D2. In one embodiment, transitory state controller 902 maintains such transitory states for pending local transactions to thereby control the processing of address and data packets according to the coherence protocol until such local transactions have completed to a stable state.

Referring back to FIG. 10C, it is noted that states WO, RO, RN, and IN are equivalent to corresponding states defined by the well-known MOSI coherence protocol. These four states, in addition to state WN, are stable states. The other states depicted in FIG. 10C are transient and only exist during the processing of a local transaction by interface controller 900. Local transactions are transactions that were initiated by the local active device. In addition, in one embodiment, the state WN may not be maintained for coherency units that do not have a local transaction pending since it may be possible to immediately downgrade from state WN to state RN for such coherency units. As a result, in one particular implementation, only two bits of state information are maintained for each coherency unit within state information storage 712 of cache 710. Encodings for the two bits are provided that correspond to states WO, RO, RN, and IN. In such an embodiment, transitory state information corresponding to pending local transactions may be separately maintained by transitory state controller 902.

Figure 16:
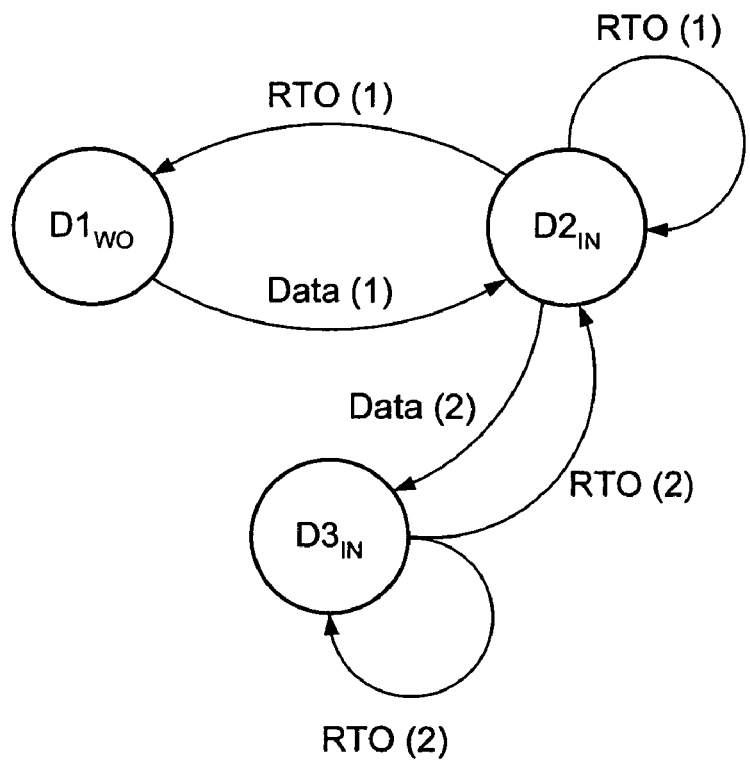
FIG. 16 is a diagram illustrating multiple coherence transactions initiated for the same coherency unit in one embodiment of a computer system.

Various additional transitory states may also result when a coherence transaction is initiated by an active device while a coherence transaction to the same coherency unit is pending within another active device. For example, FIG. 16 illustrates a situation in which an active device D1 has a W access right and ownership for a particular coherency unit, and an active device D2 initiates an RTO transaction in order to obtain a W access right to the coherency unit. When D1 receives the RTO packet through address network 150 (e.g., on the Broadcast Network in BC mode or on the Response Network in PTP mode), D1 changes its ownership status to N (Not Owned). D2 changes its ownership status to O (Owned) when it receives its own RTO through address network 150 (e.g., on the Broadcast Network in BC mode or on the Response Network in PTP mode). Another active device D3 may subsequently issue another RTO to the same coherency unit that is received by D2 through address network 150 before a corresponding data packet is received at D2 from D1. In this situation, D2 may change its ownership status to N (Not Owned) when the second RTO is received. In addition, when D3 receives its own RTO through address network 150, its ownership status changes to O (Owned). When a corresponding data packet is received by D2 from D1, D2's access right changes to a write access right. D2 may exercise this write access right repeatedly, as desired. At some later time, a corresponding data packet may be sent from D2 to D3. When the data is received by D3, it acquires a W access right. Such operations and transitory state transitions may be performed and maintained by the functionality depicted by transitory state controller 902, as needed, based upon the types of transactions that may be supported and the particular sequence of packet transmissions and receptions that may occur, as well as upon the particular coherence methodology that may be chosen for a given implementation.

FIGS. 15A-15D show various specific cache states that may be implemented in one embodiment of an active device. Note that other embodiments may be implemented differently than the one shown in FIGS. 15A-15D. FIG. 15A shows various cache states and their descriptions. Each cache state is identified by two capital letters (e.g., WO) identifying the current access right (e.g., "W"=write access) and ownership responsibility (e.g., "O"=ownership). Transitory states are further identified by one or more lowercase letters. In transitory states, an active device may be waiting for receipt of one or more address and/or data packets in order to complete a local transaction (i.e., a transaction initiated by that device). Note that transitory states may also occur during foreign transactions (i.e., transactions initiated by other devices) in some embodiments.

Figure 15C:
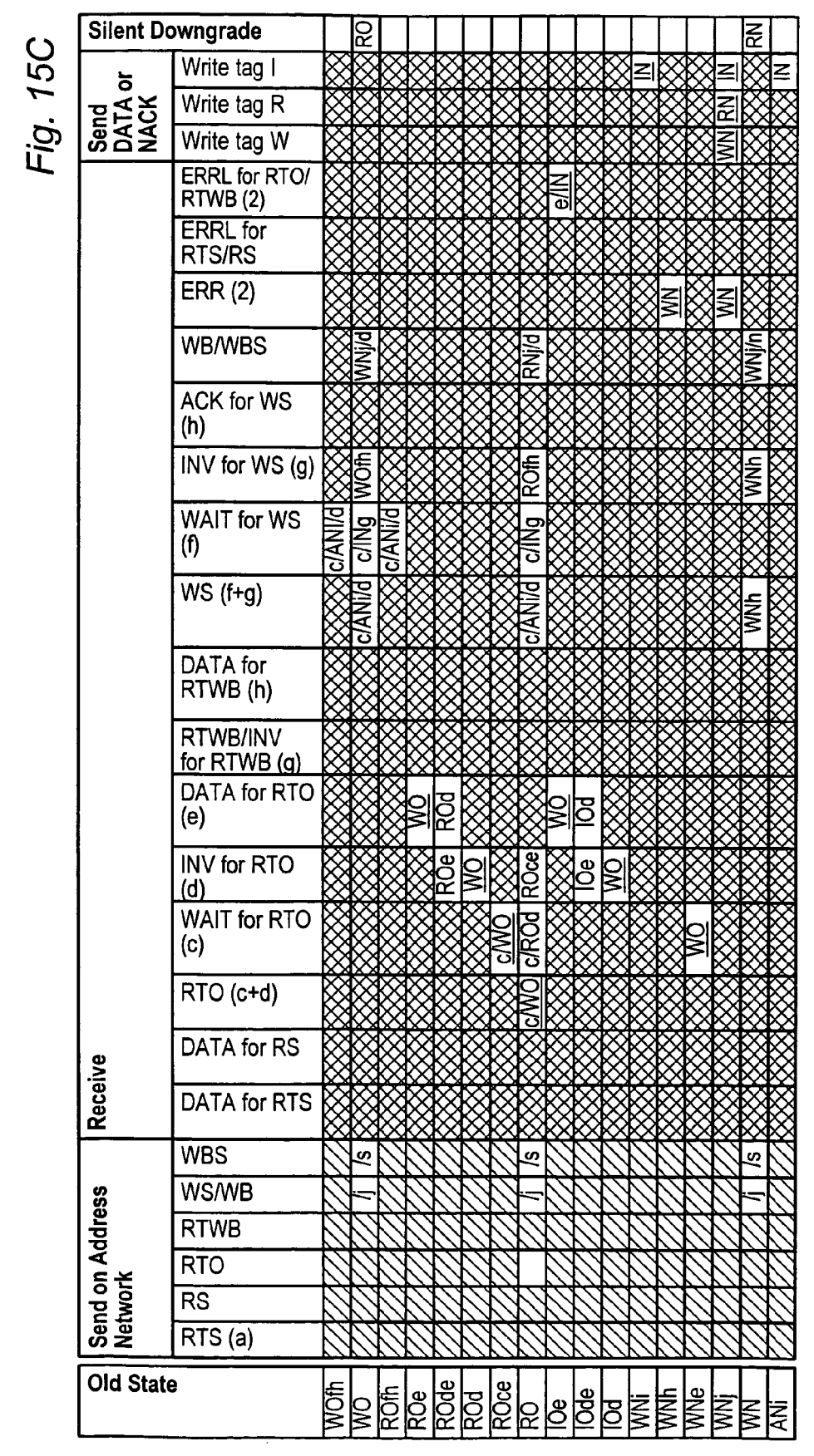
Figure 15C:
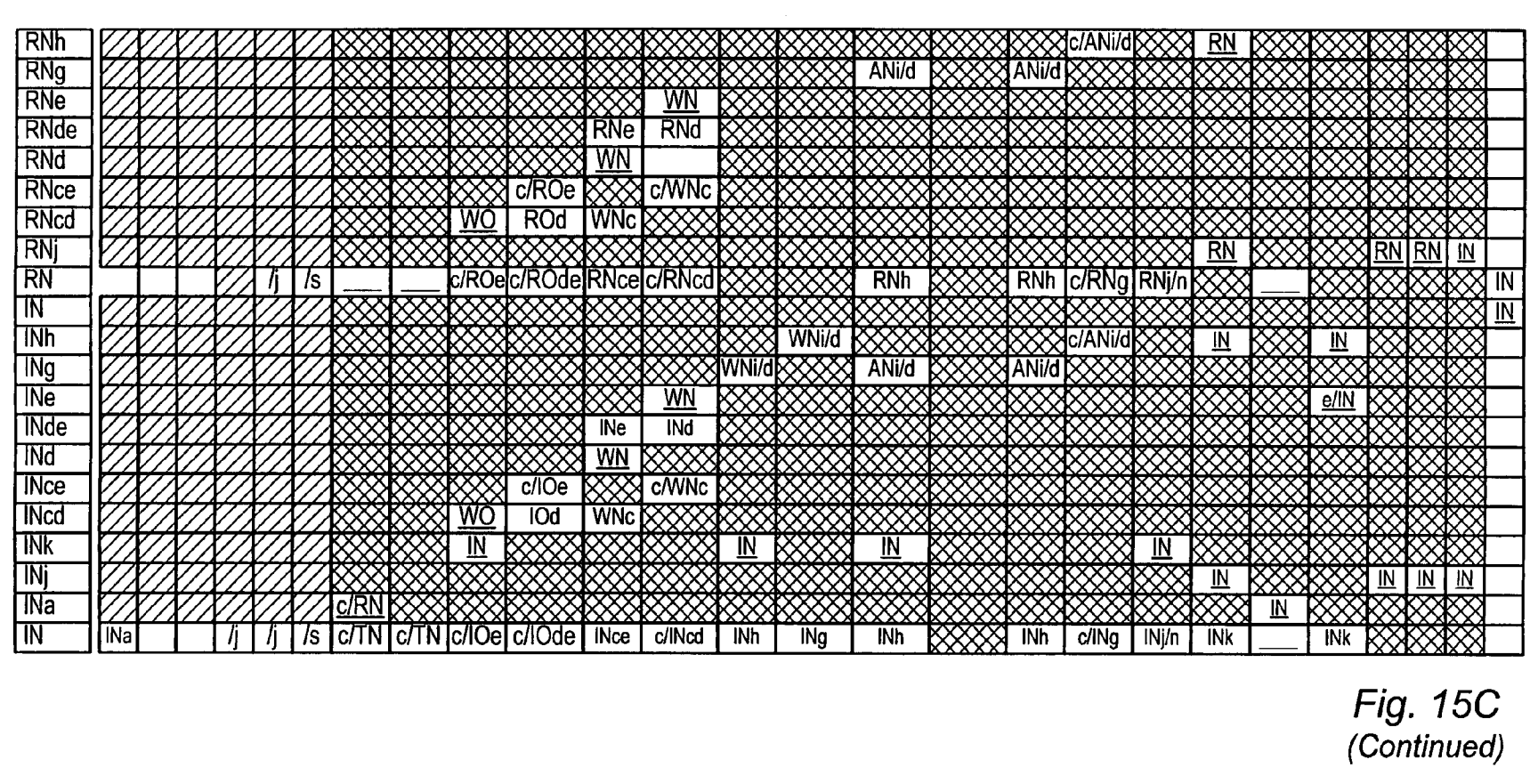

FIGS. 15B-15D also illustrate how the various cache states implemented in one embodiment may change in response to events such as sending and receiving packets and describe events that may take place in these cache states. Note that, with respect to FIGS. 15A-15D, when a particular packet is described as being sent or received, the description refers to the logical sending or receiving of such a packet, regardless of whether that packet is combined with another logical packet. For example, a DATA packet is considered to be sent or received if a DATA or DATAP packet is sent or received. Similarly, an ACK packet is considered to be sent or received if an ACK or PRACK packet is sent or received, and a PRN packet is considered to be sent or received if a PRN, DATAP, or PRACK packet is sent or received.

State transitions and actions that may take place in response to various events that occur during local transactions are illustrated in FIGS. 15C. FIG. 15D similarly illustrates state transitions and actions that may take place in response to various events that occur during foreign transactions. In the illustrated embodiment, certain events are not allowed in certain states. These events are referred to as illegal events and are shown as darkened entries in the tables of FIGS. 15C-15D. In response to certain states occurring for a particular cache line, an active device may perform one or more actions involving that cache line. Actions are abbreviated in FIGS. 15C-15D as one or more alphabetic action codes. FIG. 15B explains the actions represented by each of the action codes shown in FIGS. 15C-15D. In FIGS. 15C-15D, each value entry may include an action code (e or c) followed by a "/", a next state (if any), an additional "/", and one or more other action codes (a, d, i, j, n, r, s, w, y, or z) (note that one or more of the foregoing entry items may be omitted in any given entry).

As illustrated, the interface controller 900 depicted in FIG. 15 may further include a promise array 904. As described above, in response to a coherence request, a processing subsystem that owns a coherency unit may be required to forward data for the coherency unit to another device. However, the processing subsystem that owns the coherency unit may not have the corresponding data when the coherence request is received. Promise array 904 is configured to store information identifying data packets that must be conveyed to other devices on data network 152 in response to pending coherence transactions as dictated by the coherence protocol.

Promise array 904 may be implemented using various storage structures. For example, promise array 904 may be implemented using a fully sized array that is large enough to store information corresponding to all outstanding transactions for which data packets must be conveyed. In one particular implementation, each active device in the system can have at most one outstanding transaction per coherency unit. In this manner, the maximum number of data packets that may need to be forwarded to other devices may be bound, and the overall size of the promise array may be chosen to allow for the maximum number of data promises. In alternative configurations, address transactions may be flow-controlled in the event promise array 904 becomes full and is unable to store additional information corresponding to additional data promises. Promise array 904 may include a plurality of entries, each configured to store information that identifies a particular data packet that needs to be forwarded, as well as information identifying the destination to which the data packet must be forwarded. In one particular implementation, promise array 904 may be implemented using a linked list.

Figure 17:
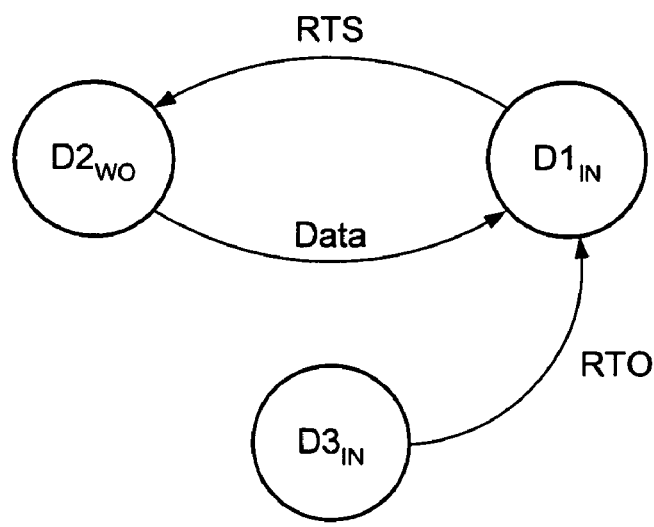
FIG. 17 is a diagram illustrating communications between active devices in accordance with one embodiment of a computer system.

Turning next to FIG. 17, it is noted that systems that employ general aspects of the coherence protocols described above could potentially experience a starvation problem. More particularly, as illustrated, an active device D1 may request a read-only copy of a coherency unit to perform a load operation by conveying a read-to-share (RTS) packet upon address network 150. However, as stated previously, a corresponding data packet may not be conveyed to D1 from D2 (i.e., the owning device) until some time later. Prior to receiving the corresponding data packet, device D1 has the coherency unit in an I (Invalid) state. Prior to receiving the corresponding data packet, a device D3 may initiate an RTO (or other invalidating transaction) that is received by D1 ahead of the corresponding data packet. This situation may prevent device D1 from gaining the read access right to the coherency unit since the previously received RTO may nullify the effect of the first request. Although device D1 may issue another RTS to again attempt to satisfy the load, additional read-to-own operations may again be initiated by other active devices that continue to prevent device D1 from gaining the necessary access right. Potentially, requests for shared access to a coherency unit could be nullified an unbounded number of times by requests for exclusive access to the coherency unit, thus causing starvation.

Such a starvation situation can be avoided by defining certain loads as critical loads. Generally speaking, a critical load refers to a load operation initiated by an active device that can be logically reordered in the global order without violating program order. In one embodiment that implements a TSO (Total Store Order) memory model, a load operation is a critical load if it is the oldest uncommitted load operation initiated by processing unit 702. To avoid starvation, in response to an indication that an outstanding RTS corresponds to a critical load and receipt of a packet that is part of an intervening foreign RTO transaction to the same coherency unit (before a corresponding data packet for the RTS is received) transitory state controller 902 may be configured to provide a T (Transient-Read) access right to the coherency unit upon receipt of the data packet. The T access right allows the load to be satisfied when the data packet is received. After the load is satisfied, the state of the coherency unit is downgraded to I (Invalid). This mechanism allows critical loads to be logically reordered in the global order without violating program order. The load can be viewed as having logically occurred at some point right after the owner (device D2) sends a first packet to D1 (or to device D3) but before the device performing the RTO (device D3) receives its corresponding data packet. In this manner, the value provided to satisfy the load in device D1 includes the values of all writes prior to this time and none of the values of writes following this time.

In one particular implementation, processing unit 702 may provide an indication that a load is the oldest uncommitted load when the load request is conveyed to interface controller 900. In another embodiment, a load may be indicated as being a critical load if it is the oldest uncommitted load at the time the local RTS is conveyed on address network 150. In still a further embodiment, a load may be indicated as being a critical load if it is the oldest uncommitted load at the time the foreign invalidating RTO is received.

It is noted that, in the scenario described in conjunction with FIG. 17, if the RTS is not indicated as being associated with a critical load, transitory state controller 902 may maintain the coherency unit in the I (Invalid) state (rather than assigning the T state) in response to receiving the corresponding data.

It is also noted that in systems that implement other memory models, a load operation may be a critical load. (i.e., a load operation that can be logically reordered in the global order) when other conditions exist. For example, in a system that implements sequential consistency, a load operation may be defined as a critical load if there are no older uncommitted load or store operations.

Figure 18:
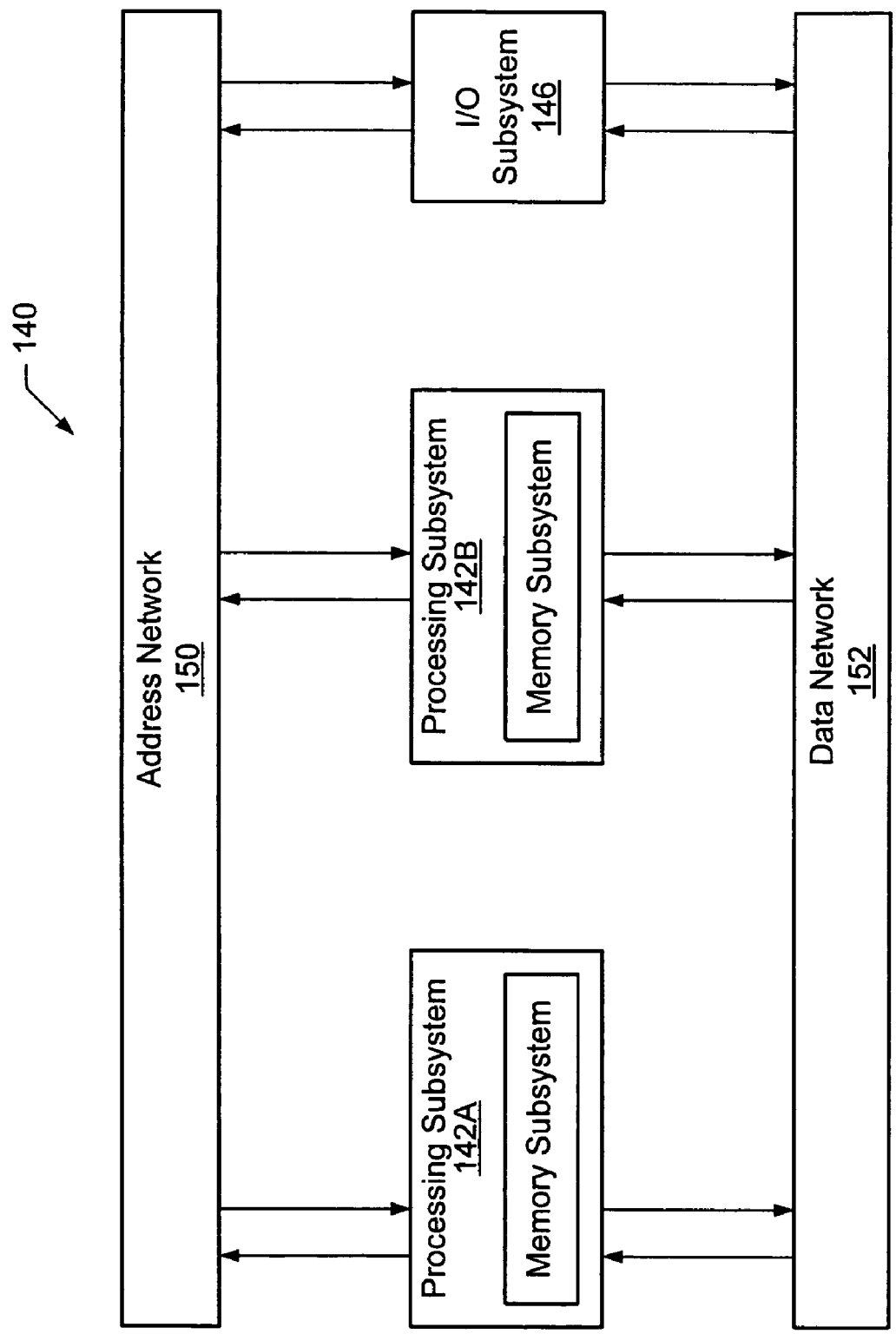
FIG. 18 is a block diagram of another embodiment of a multiprocessing computer system.

In addition, it is noted that in other embodiments all or part of memory subsystems 144 may be integrated (e.g., in the same integrated circuit) with the functionality of processing subsystems 142, as depicted in FIG. 18. For example, in one embodiment, a memory controller included in the memory subsystem 144 may be included in the same integrated circuit as the processing subsystem. The integrated memory controller/processing subsystem may be coupled to external memory storage 225 also included in the memory subsystem 144. In embodiments like these, the conveyance of certain packets on the address and/or data networks as discussed above for particular coherence transactions may not be necessary. Instead, information indicative of the desired transaction may be passed directly between the integrated memory and processing subsystems.

Multi-level Address Switches

Figure 19:
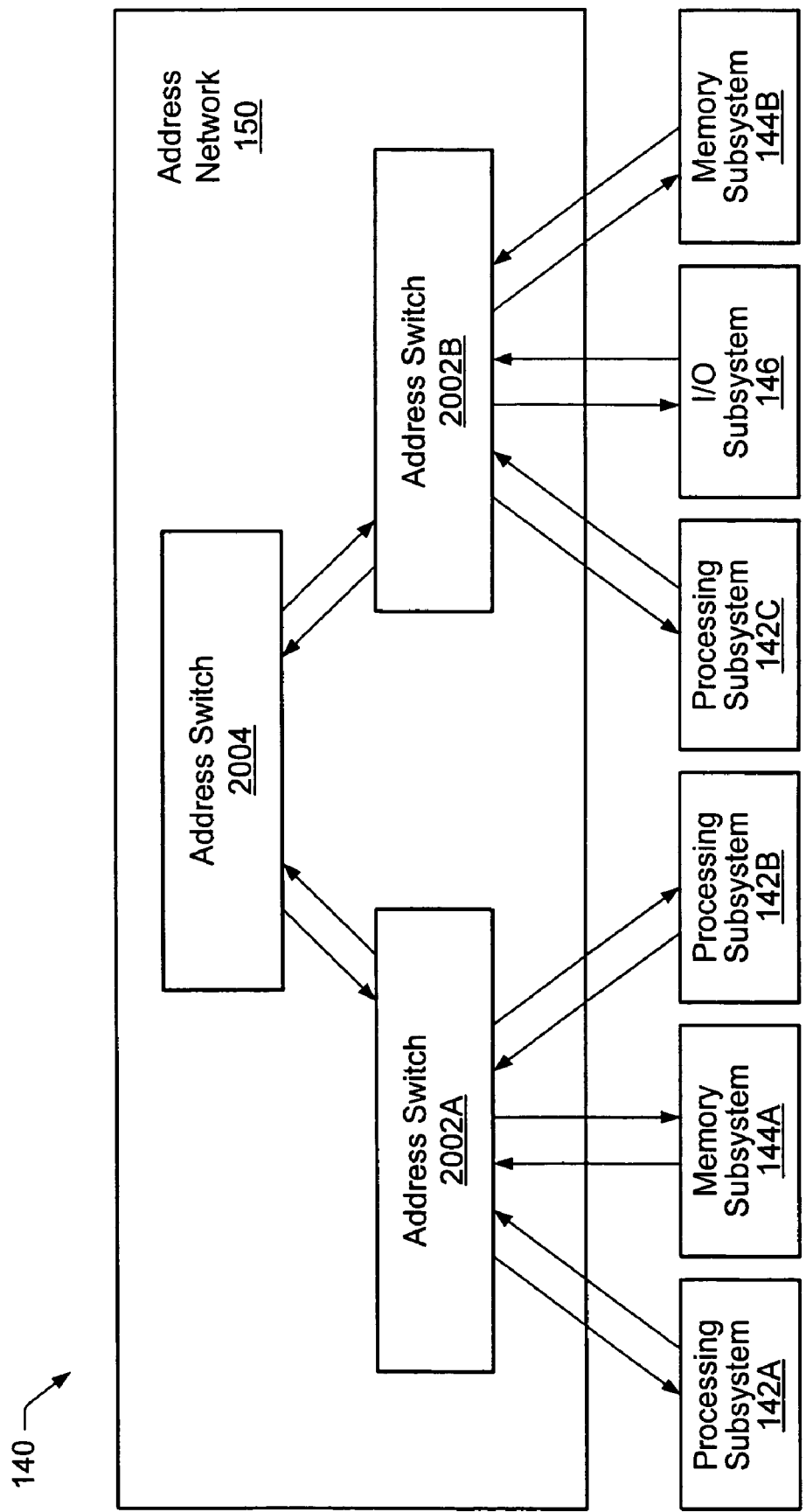
FIG. 19 shows a block diagram of one embodiment of an address network.

In some embodiments of computer system 140, multiple levels of address switches may be used to implement address network 150, as shown in FIG. 19. In this embodiment, there are two levels of address switches. First level address switch 2004 communicates packets between the second level address switches 2002A and 2002B. In the illustrated embodiment, the second level address switches (collectively referred to as address switches 2002) communicate packets directly with a unique set of client devices. However, in other embodiments, the sets of client devices that each second level address switch communicates with may not be unique. In some embodiments, a rootless address network (i.e., an address network in which there is not a common address switch through which all multicast and broadcast address packets are routed) may be implemented.

In one embodiment, the address network 150 may be configured to convey an address packet from processing subsystem 142A to memory subsystem 144B in PTP mode. The address packet may first be conveyed from processing system 142A to address switch 2002A. Address switch 2002A may determine that the destination of the address packet is not one of the client devices that it communicates with and communicate the packet to first stage address switch 2004. The first level address switch 2004 routes the packet to address switch 2002B, which then conveys the packet to memory subsystem 144B.

Address network 150 may also be configured to convey address packets in BC mode in some embodiments. An address packet being conveyed in BC mode from processing subsystem 142A may be received by address switch 2002A and conveyed to address switch 2004. In one embodiment, address switch 2002A may access a mode table to determine whether to transmit the packet in BC or PTP mode and encode a mode (or virtual network) indication in the packet's prefix to indicate which mode it should be transmitted in. Address switch 2004 may then broadcast the packet to both second level address switches 2002. Thus, address switches at the same level receive the multicast or broadcast packet at the same time. In turn, address switches 2002 broadcast the packet to all of the devices with which they communicate. In embodiments supporting different virtual networks, invalidating packets sent on the Multicast Network may be similarly broadcast to all of the higher-level address switches (e.g., broadcast by first-level address switch 2004 to second-level address switches 2002). The highest-level address switches (second-level address switches 2002 in the illustrated embodiment) may then multicast the multicast packet to the appropriate destination devices. In order to satisfy the various ordering properties, all of the highest-level switches may arbitrate between address packets in the same manner. For example, in one embodiment, address switches may prioritize broadcasts and/or multicasts ahead of other address packets. In some embodiments, address switches may prioritize broadcasts and multicasts ahead of other address packets during certain arbitration cycles and allow only non-broadcast and non-multicast address packets to progress during the remaining arbitration cycles in order to avoid deadlock. Note that other embodiments may implement multiple levels of address switches in a different manner.

Multi-Node Systems

Referring back to FIG. 1, computer system 140 may be described as a node 140. In general, a node is a group of client devices that share the same address and data networks. A computer system may include multiple nodes. For example, in some embodiments, there may be limitations on how many client devices can be present in each node. By linking multiple nodes, the number of client devices in the computer system may be adjusted independently of the size limitations of any individual node.

Figure 20:
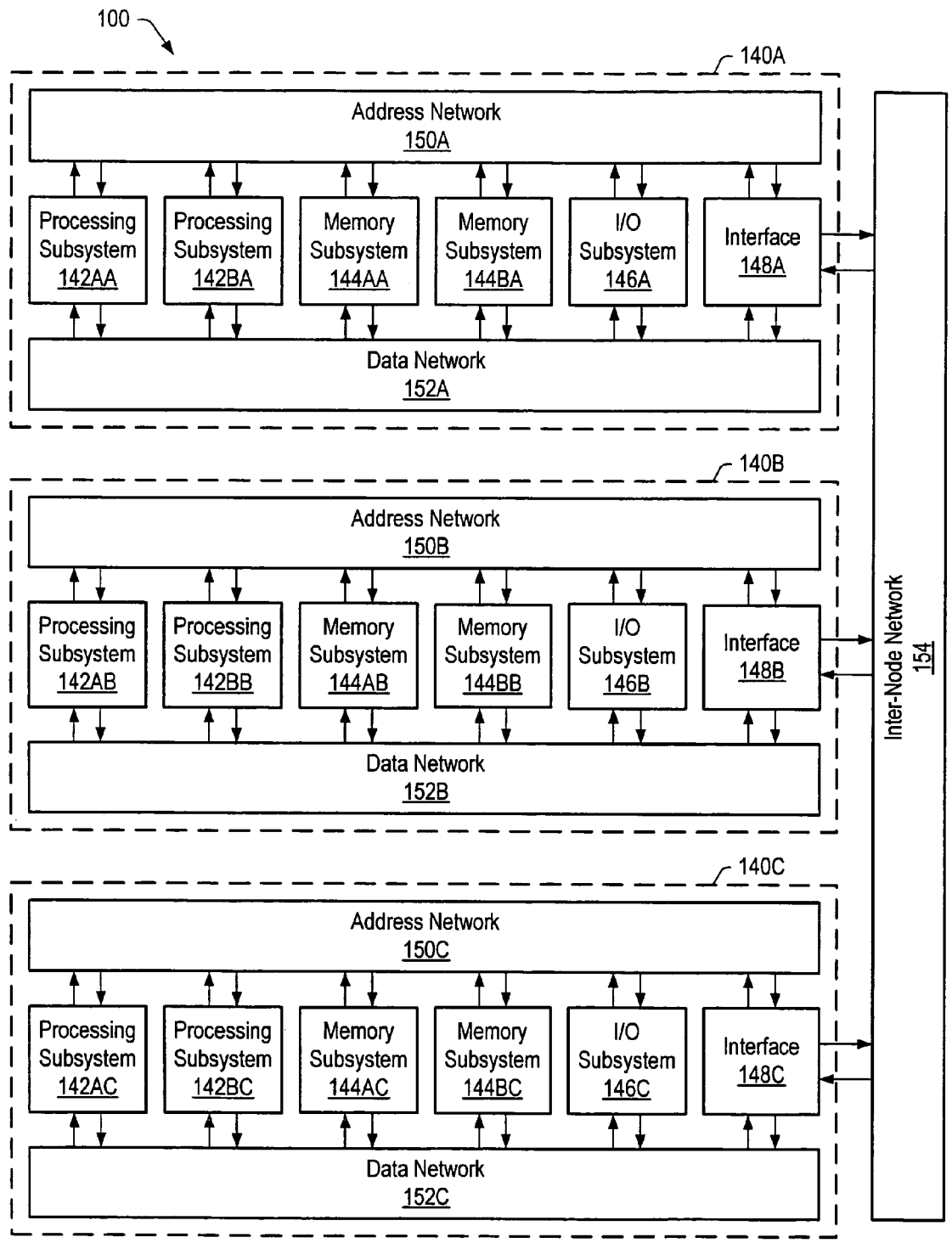
FIG. 20 shows one embodiment of a multi-node computer system.

FIG. 20 shows one embodiment of a multi-node computer system 100. In the illustrated embodiment, three nodes 140A-140C (collectively referred to as nodes 140) are coupled to form multi-node computer system 100. Each node includes several client devices. For example, node 140A includes processing subsystems 142AA and 142BA, memory subsystems 144AA and 144BA, I/O subsystem 146A, and interface 148A. The client devices in node 140A share address network 150A and data network 152A. In the illustrated embodiment, nodes 140B and 140C contain similar client devices (identified by reference identifiers ending in "B" and "C" respectively). Note that different nodes may include different numbers of and/or types of client devices, and that some types of client devices may not be included in some nodes.

Within each node 140, client devices share the same address and data networks. In some embodiments, the address networks within some of the nodes may be configured to operate in both BC mode and PTP mode (e.g., depending on the address of a requested coherency unit). For example, a node may include a mode table that indicates the transmission mode (BC or PTP) for each coherency unit or, alternatively, for each page or block of data. BC and PTP mode may be determined on a per-node (as opposed to a per-unit of data) basis in some nodes. hi some embodiments, address packets that are part of a transaction involving a particular coherency unit may be conveyed in PTP mode in one node and in BC mode in another node. In other embodiments, all of the address networks in all of the nodes may operate in the same mode for all coherency units. Whether address packets specifying a given coherency unit are conveyed in PTP or BC mode may be determined either statically or dynamically within each node, as discussed above.

Each node 140 communicates with other nodes in computer system 100 via an interface 148 (interfaces 148A-148C are collectively referred to as interfaces 148). Some nodes may include more than one interface. Interfaces 148 send coherency messages to each other over an inter-node network 154. In one embodiment, inter-node network 154 may operate in PTP mode. Interfaces 148 may communicate by sending packets of address and/or data information on inter-node network 154. In order to avoid confusion between inter-node and intra-node communications, interfaces 148 are described herein as "sending coherency messages to" other interfaces and "sending packets to" client devices within the same node as the sending interface.

Address network 150, data network 152, and inter-node network 154 may be configured to satisfy the Synchronized Networks Property described above. The orders defined above may be adapted to account for interfaces 148 and the inter-node network 154 as follows:

1) Local Order ($<_l$): Event X precedes event Y in local order, denoted $X<_l Y$, if X and Y are events (including the sending or reception of a packet or coherency message on the address, data, or inter-node network, a read or write of a coherency unit, or a local change of access rights) which occur at the same client device C and X occurs before Y.

2) Message Order ($<_m$): Event X precedes event Y in message order, denoted $X<_m Y$, if X is the sending of a packet or coherency message M on the address, data, or inter-node network and Y is the reception of the same packet or coherency message M.

3) Invalidation Order ($<_i$): Event X precedes event Y in invalidation order, denoted $X<_i Y$, if X is the reception of a broadcast or multicast packet or coherency message M at a client device C1 and Y is the reception of the same packet or coherency message M at a client C2, where C1 does not equal C2, and where either C2 is the initiator of the packet M and C1 is not an interface or C1 is the initiator of the coherency message M and C2 is an interface.

Using the orders defined above, the Synchronized Networks Property holds that:

1) The union of the local order $<_l$, the message order $<_m$, and the invalidation order $<_i$ is acyclic.

Each node 140 may occupy its own physical enclosure. In some embodiments, however, one or more nodes may share the same enclosure.

Client devices within multi-node computer system 100 may share a common physical address space. The cache coherence protocol described above may be used to maintain cache coherence in multi-node computer system 100. The interfaces 148 may communicate between nodes 140 in order to maintain cache coherency between nodes.

Within each node 140, each coherency unit may map to a unique memory subsystem 144 (or to no memory subsystem at all). As described above, a memory subsystem 144 within a node 140 that maps a given coherency unit is the home memory subsystem for that coherency unit within that node. If only one node 140 within the computer system 100 contains a memory subsystem 144 that maps a given coherency unit, that node is the home node for that coherency unit.

In some embodiments, more than one node 140 may contain a memory subsystem 144 that maps a given coherency unit. All of the nodes that map a particular coherency unit are described herein as LPA (Local Physical Address) nodes for that coherency unit. The home node for a given coherency unit will be an LPA node for that coherency unit. If there is more than one LPA node for a given coherency unit, a unique LPA node may be designated the home node for that coherency unit. Generally, a node 140 is an LPA node for a given coherency unit if a memory 144 or I/O device 146 within that node maps the coherency unit. Likewise, a coherency unit is an LPA coherency unit for a given node if a memory or I/O device in that node maps the coherency unit.

Active devices in a multi-node computer system 100 may be able to access all of the addresses in the common physical address space. For example, an active device in a node 140A may request a readable and/or writable copy of a non-LPA coherency unit (i.e., a coherency unit that is not mapped by a memory subsystem or an I/O device within the node containing the requesting device). In order to provide the active device with the requested data, an interface 148A in the active device's node sends a coherency message indicative of the request to the home node 140B for the requested coherency unit. In response, the home node 140B may initiate a subtransaction within the home node 140B and/or send additional coherency messages on the inter-node network 154 to other nodes 140C in order to satisfy the request. As described above, a transaction includes the data and address packets that implement data transfers and ownership and access transitions within each node. Additionally, a transaction performed in a multi-node system 100 may also include coherency messages sent between interfaces on inter-node network 154. Within a transaction that involves multiple nodes of a multi-node system 100, the data and address packets sent in a single node are referred to as subtransactions.

A global access state may be defined for each coherency unit within each node 140. The global access state defines the access rights associated with a particular coherency unit within a particular node. For example, in some embodiments, the global access states may be Shared (maximum access right=read access), Invalid (maximum access right=invalid access), and Modified (maximum access right=write access). If a coherency unit is in the Modified global access state in a particular node, one of the devices within that node may have a write access right to that coherency unit. If the coherency unit is in the Shared global access state in the node, a client device in that node may have, at most, a read access right to that coherency unit. Note that in such an embodiment, the global access state identifies the maximum access right currently allowed within a node (as opposed to the access right currently held by any particular device within the node). Thus, there may not necessarily be a device with write access to a coherency unit in a node that has that coherency unit in the Modified global access state. However, no device within a node can have an access right to a coherency unit that is greater than the global access state for that coherency unit within the node. For example, if a coherency unit is in the Invalid global access state in a given node, no client device in that node can have a valid copy of the coherency unit. The global access state is associated with all of the devices (as opposed to a single device) within a node. Access rights to a coherency unit may be traded between devices in the node without affecting the global access state. For example, a first active device 142AA in the node 140A may lose write access as part of an RTO transaction that provides a second active device 142BA in the node with write access, and the global access state of the coherency unit within the node 140A will remain Modified. The global access state may change in response to transactions that involve communicating with other node(s).

The global access states may be used to determine what actions need to be taken in each node to satisfy a coherency transaction for a given coherency unit. For example, if a RTO transaction is initiated, any valid shared copies of the coherency unit should be invalidated as part of the RTO transaction.

Nodes that may contain devices with shared access to the coherency unit will have the coherence unit in the Shared global access state, and thus those nodes should invalidate (e.g., by sending INV-type packets on the Multicast or Broadcast address network) copies of the coherency unit as part of the RTO. In contrast, nodes that have the coherency unit in the Invalid global access state do not need to invalidate any copies, since their global access state indicates that there are no devices with shared access rights to the coherency units in those nodes.

In addition to indicating the maximum access rights allowed for any device within a particular node for a particular coherency unit, the global access state indication may also indicate which node is responsible for providing data corresponding to the coherency unit. When a coherency unit is in a static state (also referred to as a static coherency unit), the node with the coherency unit in the Modified global access state (if any) is the node that is responsible for providing data corresponding to the coherency unit to satisfy certain transactions (e.g., RTS, RTO, WS, RTWB, etc.). The static state is defined as occurring when no packets have been sent but not received on the address or inter-node networks for the coherency unit, all pending transactions (if any) involving the coherency unit are waiting for interface action, and the coherency unit is not being processed by the interface in the coherency unit's home node (e.g., the coherency unit is not currently locked in the home node, as will be described in more detail below). If no node has the coherency unit in the Modified global access state, the home node may be responsible for providing data corresponding to the coherency unit in order to satisfy certain transactions.

In some embodiments, a coherency unit's home memory subsystem 144 within an LPA node 140 may track the global access state of that coherency unit within the node 140. In one embodiment, a home memory subsystem 144 may maintain an indication of the global access state (within that node) of each coherency unit that maps to that memory subsystem. For example, in one embodiment, a home memory subsystem may maintain gTags (Global Tags)(e.g., in a directory 220 or in a directory-like structure in memory 225) indicating the global access state of each coherency unit that maps to that memory subsystem. The home memory subsystem 144 or an interface 148 within the node 140 may also track which node (e.g., using a value that identifies a unique node within computer system 100) is the Modified node (if any) for a given coherency unit as part of that coherency unit's global information. FIG. 21 shows an exemplary set of values for a coherency unit's gTag: gS (Shared), gI (Invalid), and gM (Modified).

Note that each node may not maintain a gTag for each coherency unit. For example, nodes may not maintain gTags for non-home and/or non-LPA coherency units in some embodiments. However, a global access state is still defined for each coherency unit within each node, even if no device within that node actually maintains the global access state. Note that other global access states may also be maintained instead of and/or in addition to the gTag states defined above.

The gTag associated with a particular coherency unit within a node may transition at a different time than an individual device's access rights and/or ownership responsibility associated with that particular coherency unit transition. For example, the gTag associated with a coherency unit within a node 140 may transition in response to a memory subsystem 144's receipt of an address packet sent from an interface 148. In contrast, an active device's ownership responsibilities may transition upon receipt of address packets received from other client devices as well as upon receipt of address packets from an interface 148.

FIG. 22 shows an exemplary set of address packets that may be sent and/or received by one embodiment of an interface 148 in order to implement a subtransaction as part of a transaction initiated in another node. In the illustrated embodiment, packets sent by an interface 148 as part of a subtransaction are referred to as proxy packets. In some embodiments, receipt of certain proxy packets may have different effects than receipt of non-proxy packets that relate to the same type of transaction.

A PRTSM (Proxy Read-To-Share Modified) packet is a request from an interface in a gM node (i.e., a node that has the requested coherency unit in a Modified global access state) that is sent to initiate a subtransaction for an RTS transaction initiated in another node. Similarly, a PRTOM (Proxy Read-To-Own Modified) packet is a request from an interface in a gM node that initiates a subtransaction in response to an RTO request sent in another node. A PRTO (Proxy RTO) packet may be used to initiate a similar subtransaction in a non-gM node. While the embodiment illustrated in FIG. 22 uses different types of packets for gM and non-gM nodes, other embodiments may use the same type of packets in all nodes.

A PU (Proxy Upgrade) packet is a request sent by an interface requesting that a memory subsystem supply data for an outstanding RTO transaction. A PDU (Proxy Data Upgrade) packet is a request sent by an interface requesting that a memory subsystem update a gTag (e.g., from gI to gM). A PDU may be used to indicate that the sending interface will be supplying data for an outstanding RTO.

A PRSM (Proxy Read-Stream Modified) packet is a request from an interface in a gM node to initiate a subtransaction in response to an RS request in another node. A PIM (Proxy Invalidate Modified) is an invalidating request (e.g. sent in response to a remote WS) from an interface in a gM node to initiate a subtransaction that invalidates a coherency unit in caches and/or memory within the gM node. Upon receipt of a PIM, an owning device may respond with a data packet (e.g., an ACK) corresponding to the requested coherency unit. A PI (Proxy Invalidate) is a similar invalidating request used to invalidate data in caches and/or memory in a gI or gS node.

An interface 148 may use additional packets to update and/or read global access states maintained in a memory subsystem. A PMR (Proxy Memory Read) request is a request from an interface to read a gTag or other global information (e.g., the node ID of the gM node) for a particular coherency unit. A PMR request may also request a copy of the specified coherency unit from memory. A PMW (Proxy Memory Write) request is a request from an interface to write a gTag or other global information for a particular coherency unit. For example, an interface may send a PMW packet, the memory may respond with a PRN data packet, and the interface may send a DATAM packet (described below) containing a new gTag value or other global information.

FIG. 23 shows exemplary data packets that may be sent and/or received by an interface 148 in one embodiment of a multi-node computer system 100. In this example, a DATAM packet may contain global information (e.g., information identifying a node that contains an owning active device and/or a gTag value) and/or a copy of a coherency unit. A DATAN packet is sent from a memory subsystem to an interface to indicate that no PRN will be coming in response to a PRTSM. Interfaces 148 may also send and receive DATA packets like those described above.

In some embodiments, interfaces 148 may ignore address packets specifying LPA coherency units unless received in a special format. This may allow transactions that do not require coherency messages to other nodes to complete locally within a node without taking up resources within the interface and the inter-node network. However, in some cases (e.g., an RTO transaction initiated by an active device within a gS node for an LPA coherency unit), coherency messages to other nodes (e.g., to invalidate shared copies in other nodes) may be needed in order to complete a transaction for an LPA coherency unit. In those situations, a home memory subsystem may send a REP (Report) packet to an interface. The REP packet identifies the transaction involving the LPA coherency unit and indicates that the interface's intervention is needed to complete the transaction. Receipt of a REP packet may cause an interface to send coherency messages to interfaces in other nodes and/or to initiate one or more subtransactions.

FIG. 24 shows how the exemplary proxy address packets for a particular coherency unit may be used to update that coherency unit's global access state in memory. For example, if the current global access state of a particular coherency unit is gM (Modified) and the home memory subsystem for that coherency unit receives a PRTSM specifying that coherency unit, the memory subsystem may update the global access state of the coherency unit to gS (Shared). If instead a PRTOM is received, the new global access state of the coherency unit may become gI (Invalid). A PU packet may be received in a gS node and cause the specified coherency unit's gTag to become gM. A PDU packet may be received in a gI, gS, or gI node and cause the new gTag of the specified coherency unit to become gM. PRSM and PIM packets may be received in gM nodes. A PRSM packet has no effect on the specified coherency unit's gTag. A PIM packet causes the gTag to become gI. PMR packets have no effect on gTags. PMW packets may be used by an interface 148 to specify the new value of a coherency unit's gTag to a memory subsystem. PMW packets may be received in any global access state and may set the specified coherency unit's gTag to any valid global access state.

Note that the above packet types are merely exemplary. While some embodiments may use all or some of the data and address packets described above, other embodiments may use other packet types instead of or in addition to those described above.

Figure 25:
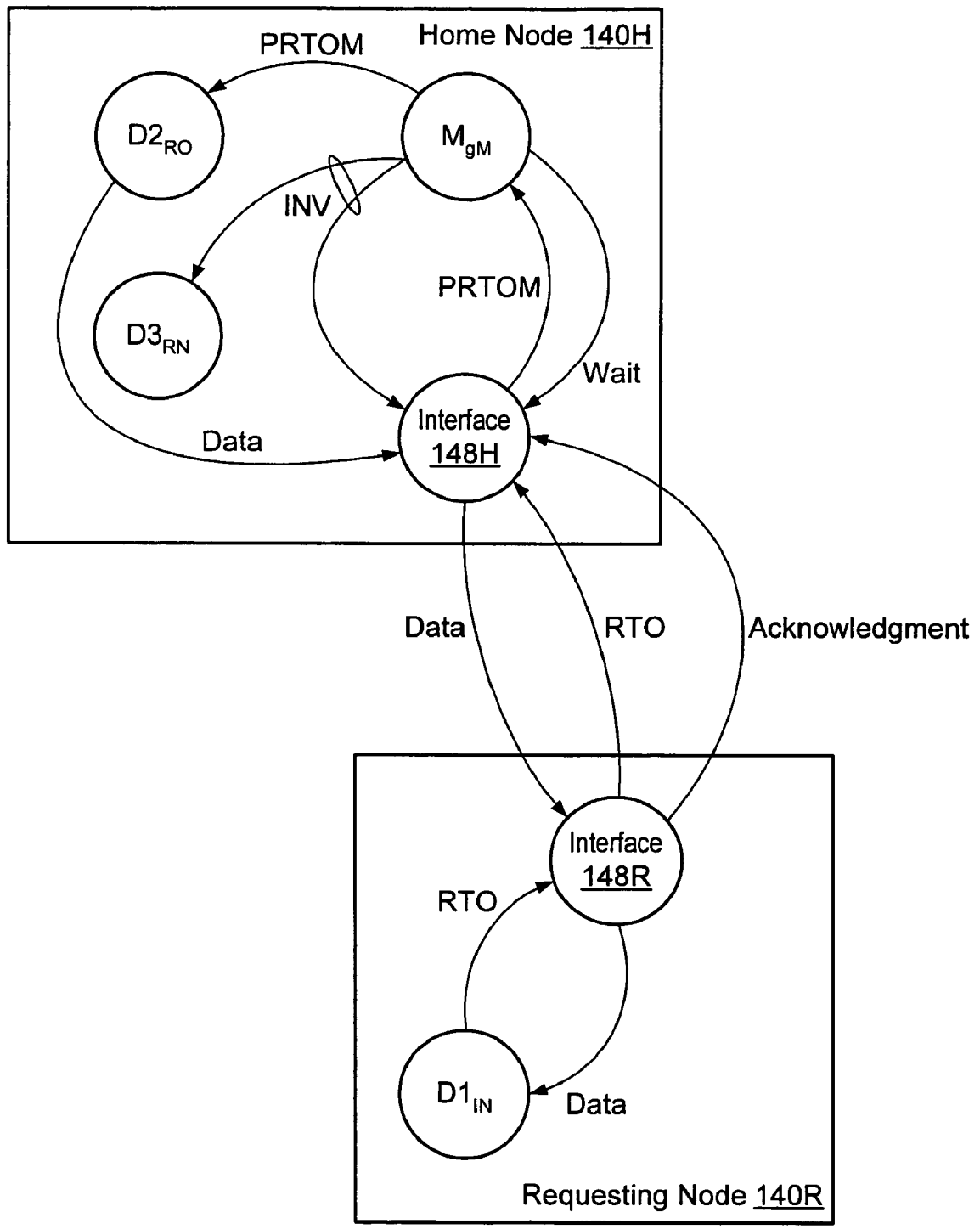
FIGS. 25-28 show exemplary RTO transactions in one embodiment of a multi-node computer system.

FIG. 25 shows an example of an RTO transaction in an embodiment of multi-node system 100. Two nodes are shown: a home node 140H and a requesting node 140R (note that other nodes may also be present in the system). Requesting node 140R contains an active device D1 that is. initiating an RTO transaction for a coherency unit (D1 currently has an invalid access right ("I") to and no ownership ("N") of the coherency unit, as indicated by the subscript "IN"). Home node 140H is the home node for the coherency unit requested by active device D1. In this example, address and data packets like those shown in FIGS. 7-9 and 23-24 may be used to implement coherence transactions and subtransactions within each node.

Active device D1's RTO request may be conveyed by the address network in requesting node 140R in either BC or PTP mode (e.g., as indicated by a mode table within that node) in some embodiments. In one embodiment of a multi-node system, if the requesting node 140R is not an LPA node for the requested coherency unit, the request may be conveyed in BC mode. The interface 148R within the requesting node 140R may receive the RTO request and send a coherency message indicative of the RTO request to the home node 140H for the requested coherency unit. In response to receiving the remote RTO request (here, "remote" is used to describe a coherency message or packet sent as part of a transaction that was initiated in another node), the interface 148H in the home node 140H may initiate one or more subtransactions and/or send coherency messages to other interfaces in order to provide the requesting node 140R with the requested coherency unit.

If requesting node 140R is an LPA node for the requested coherency unit, the RTO request may be conveyed in PTP mode. The address network may convey the RTO request to a memory subsystem that maps the requested coherency unit. In response to an indication that satisfying the request may involve sending coherency messages to the home node (e.g., if the coherency unit is gS or gI in requesting node 140R) the memory subsystem may send the request to the interface 148R (e.g., as a REP packet) on the data network. In response to the RTO request, interface 148R sends a Home RTO coherency message indicative of the request to interface 148H in home node 140H.

When the home interface 148H in home node 140H begins handling the RTO transaction initiated in the requesting node 140R in response to the Home RTO coherency message, the home interface 148H may acquire a lock on the requested coherency unit in order to prevent other transactions involving the coherency unit from being handled until the RTO has completed. In this example, the home node 140H has the requested coherency unit in the gM (Modified) state, indicating that one of the client devices in the home node may have write (or read) access to the coherency unit. Interface 148H may maintain the gTag for the coherency unit in one embodiment. In the illustrated embodiment, however, the home memory subsystem M maintains the gTag for the requested coherency unit. Thus, interface 148H may query the home memory subsystem M for the gTag of the coherency unit (e.g., using a PMR packet, not shown). The memory may send a response (e.g., a DATAM packet, not shown) indicating the gTag. Based on the gTag within the home node, interface 148H may initiate a subtransaction within the home node and/or send coherency messages to one or more other nodes. Here, gM implies (in static state) that a device within the home node has an ownership responsibility for the requested coherency unit. In this embodiment, gM also indicates that no other devices in any other node have access to the coherency unit (i.e., no other nodes are gM or gS for the coherency unit).

In the illustrated example, the home interface 148H sends a PRTOM (Proxy RTO Modified) request in response to the home node being a gM node for the requested coherency unit. Sending the PRTOM packet initiates a PRTOM subtransaction. The PRTOM subtransaction provides the home interface 148H with a copy of the requested coherency unit, ends D2's ownership of the coherency unit, and invalidates access to copies of the coherency unit within the home node 140H. In this example, the PRTOM request is conveyed to the home memory subsystem M by the address network in PTP mode. In response to receiving the PRTOM, the home memory subsystem M sends a PRTOM response to the owning device D2 (e.g., based on directory information identifying owning device D2 as the owner of the coherency unit identified in the PRTOM). The home memory subsystem M also sends an invalidating request (NV) to device(s) D3 that have shared access to the requested coherency unit and to the home interface 148H. Additionally, memory M sends interface 148H a WAIT packet indicating that shared copies should be invalidated before write access to the coherency unit is proper. Note that in other embodiments, the PRTOM may be conveyed in BC mode.

In response to receipt of the PRTOM from interface 148H, memory subsystem M may update its gTag for the requested coherency unit to gI, since completion of the remote RTO will result in home node 140H having the requested coherency unit in the Invalid global access state. Home memory subsystem M may also update its global information to identify the requesting node 140R as the new gM node for the coherency unit. The interface 148H may, in some embodiments, encode the node ID of the requesting node 140R in the PRTOM packet so the memory subsystem M can update the global information identifying the gM node for the requested coherency unit.

Similarly to an RTO transaction in a single-node system, receipt of the PRTOM response causes owning device D2 to lose ownership of the coherency unit. D2 also sends a copy of the coherency unit to interface 148H in response to receiving the PRTOM packet. Upon sending the coherency unit, D2 loses access to the coherency unit. Receipt of the invalidating packet INV causes the sharing devices D3 to invalidate their copies of the coherency unit.

Interface 148H's ability to send data corresponding to the coherency unit to the requesting node may be dependent on the ownership and/or access rights requested by the initiating device D1. In this example, interface 148H cannot send the coherency unit until both write access to and ownership of the coherency unit by the home interface 148H would be proper. The WAIT response sent to interface 148H indicates that, while ownership is now proper, write access is not proper until both the DATA packet containing the coherency unit and an INV packet have been received. Thus, upon receipt of the WAIT, INV, and DATA, interface 148H may send a Data coherency message containing a copy of the coherency unit to interface 148R in requesting node 140R. Note that an interface 148 that may have an access right and/or ownership responsibility for a coherency unit may be sent INV packets in order to maintain the coherency protocol for coherency units involved in multi-node transactions. For example, as part of a locally-initiated PTP RTO transaction, the home memory subsystem for the requested coherency unit may send an MNV packet to the interface in order to update the interface's access right to the coherency unit. Similarly, if a PRTO is initiated within a node, an interface in that node may be sent an INV packet in order to update the interface's access right to the coherency unit specified in the PRTO.

In response to the Data coherency message, interface 148R in requesting node 140R sends a DATA packet to the requesting device D1 to satisfy its RTO request. Note that if the address network in requesting node 140R transmitted the requesting device's RTO request in BC mode, the requesting device would already have ownership of the coherency unit and would be prepared to gain write access to the coherency unit upon receipt of the DATA packet (i.e., since receipt of an RTO packet may indicate that write access is not dependent on receipt of an INV packet). If the address network in the requesting node 140R transmitted the RTO in PTP mode, a device that maps the coherency unit (e.g., a memory subsystem if the node is an LPA node for the coherency unit) or the address network itself may be configured to send an RTO response to the requesting device D1 in order to effect the ownership transition. Thus, upon receipt of the DATA packet, D1 may gain write access to the coherency unit.

In some embodiments, interface 148R may send an Acknowledgment coherency message to interface 148H in home node 140H in response to receiving the Data coherency message. Receipt of the Acknowledgment coherency message may cause interface 148H to release a lock acquired for the requested coherency unit within the home node 140H so that other transactions involving that coherency unit may be handled. Additionally, if the requesting node is an LPA node, the interface 148R may send a PDU packet to the home memory subsystem (not shown) in the requesting node in order to update the gTag to gM in the requesting node 140R and to indicate that the interface supplied the data needed to complete the pending RTO.

Figure 26:
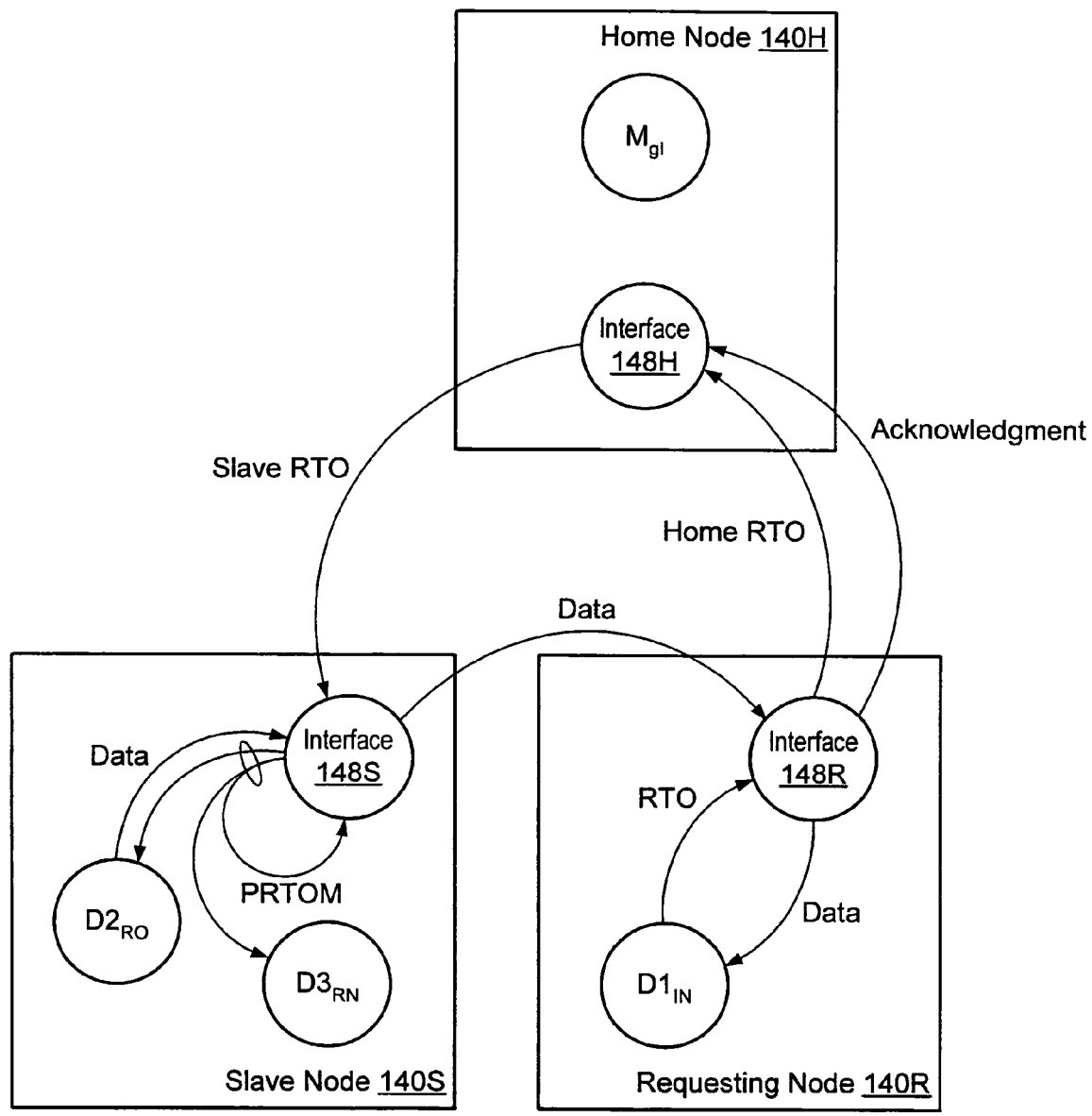

FIG. 26 shows an example of another RTO transaction in one embodiment of a multi-node computer system. In this example, the gM node is not the home node. Three nodes are illustrated: home node 140H, requesting node 140R, and slave node 140S. Requesting node 140R is gI for a particular coherency unit and contains a device D1 that is initiating an RTO transaction for the coherency unit. Home node 140H is the home node for the requested coherency unit. Slave node 140S is the current gM node and contains an active device D2 that is currently the owner of the requested coherency unit.

As in the example shown in FIG. 25, device D1 in requesting node 140R initiates an RTO transaction by sending an RTO request on the address network. The address network conveys the RTO request to interface 148R. As above, the address network may be configured to convey the request to the interface in either BC or PTP mode. If the request is conveyed in PTP mode, the request may be conveyed to a memory subsystem within requesting node 140R that subsequently sends the request to the interface (e.g., as a REP packet) in response to an indication that the RTO cannot be satisfied within the node (e.g., the coherency unit's gTag is gS or gI). In response to the RTO request, interface 148R sends a coherency message indicative of the request (Home RTO) to interface 148H in home node 140H.

Interface 148H receives the Home RTO coherency message and determines the gTag of the requested coherency unit. In one embodiment, home memory subsystem M may maintain a gTag and other global information for the coherency unit and may provide that gTag and information to interface 148H (e.g., in a DATAM packet sent in response to a PMR packet, not shown). In this example, the global access state within the home node is gI, indicating that the coherency unit is invalid within the home node. In some embodiments, the gI state in home node 140H may indicate that another node is the gM node for the coherency unit and that no nodes are gS nodes for the coherency unit (i.e., the home node may always be gS if any other node is gS). Note that the gI state in a node other than the home node may not indicate anything other than that the coherency unit is invalid in that node. The home memory subsystem M may also track which node is the current gM node for the coherency unit and communicate this information to interface 148H (e.g., in the DATAM packet). In an alternative embodiment, interface 148H may itself track the current gM node for the coherency unit. In some embodiments, interface 148H may query an interface in each of the other nodes in order to locate the current gM node if no device in the home node is aware of which node is the current gM node for the coherency unit.

In response to determining that slave node 140S is the current gM node of the requested coherency unit, interface 148H sends an RTO coherency message (Slave RTO) to interface 148S. In response to the Slave RTO message, interface 148S initiates a PRTOM subtransaction to invalidate shared copies within the node and to request a copy of the coherency unit from the owning device D2. Interface 148S initiates the PRTOM subtransaction by sending a PRTOM packet on the address network. In this example, the PRTOM packet is conveyed in BC mode to active devices D2 and D3 and interface 148S within slave node 140S. Note that even if no device in the slave node 140S tracks the global access state of the requested coherency unit, the Slave RTO coherency message may indicate the global access state (gM) of the requested coherency unit in the slave node 140S (i.e., the interface 148H in the home node may encode the slave node's gTag in the Slave RTO coherency message).

Upon receipt of the PRTOM, the owning device D2 loses ownership of the coherency unit. Device D2 subsequently responds to the PRTOM by sending a copy of the coherency unit to interface 148S. Owning device D2 loses access to the coherency unit upon sending the DATA packet to interface 148S. Sharing devices D3 that have shared access to the coherency unit lose access upon receipt of the PRTOM. In response to receiving the PRTOM and the DATA packet, interface 148S sends a coherency message containing the coherency unit to interface 148R in requesting node 140R. At that point, the coherency unit is in a gI state within slave node 140S (although no device within that node may actually maintain the coherence state information). If slave node 140S is an LPA node, interface 148S may also send an address and/or data packet to the home memory subsystem in that node 140S in order to update the gTag for the coherency unit (or the home memory subsystem may have updated the gTag in response to the PRTOM).

In response to receiving the Data coherency message containing the requested coherency unit, interface 148R sends a DATA packet to the requesting device D1. Interface 148R may also send an Acknowledgment coherency message to interface 148H in home node 140H in order to release a lock on the coherency unit in the home node. In response to receiving the Acknowledgment coherency message, the home interface 148H in the home node 140H may release the lock on the coherency unit and, in some embodiments, send an address and/or data packet to the home memory subsystem updating the global information to indicate that the requesting node 140R is now the gM node for the requested coherency unit.

One potential problem that may arise in a multi-node system occurs when shared copies of a coherency unit need to be invalidated before an active device gains write access to the coherency unit. In the coherence protocol described above, write access is dependent on the requesting device gaining a copy of the coherency unit. Thus, cache coherency may be maintained by not providing data corresponding to the coherency unit to the requesting device until shared copies have been invalidated. In a multi-node system, this may involve not providing data to the requesting node or to the requesting device in the requesting node until all shared copies (both within the requesting node and in other nodes) have been invalidated.

Figure 27:
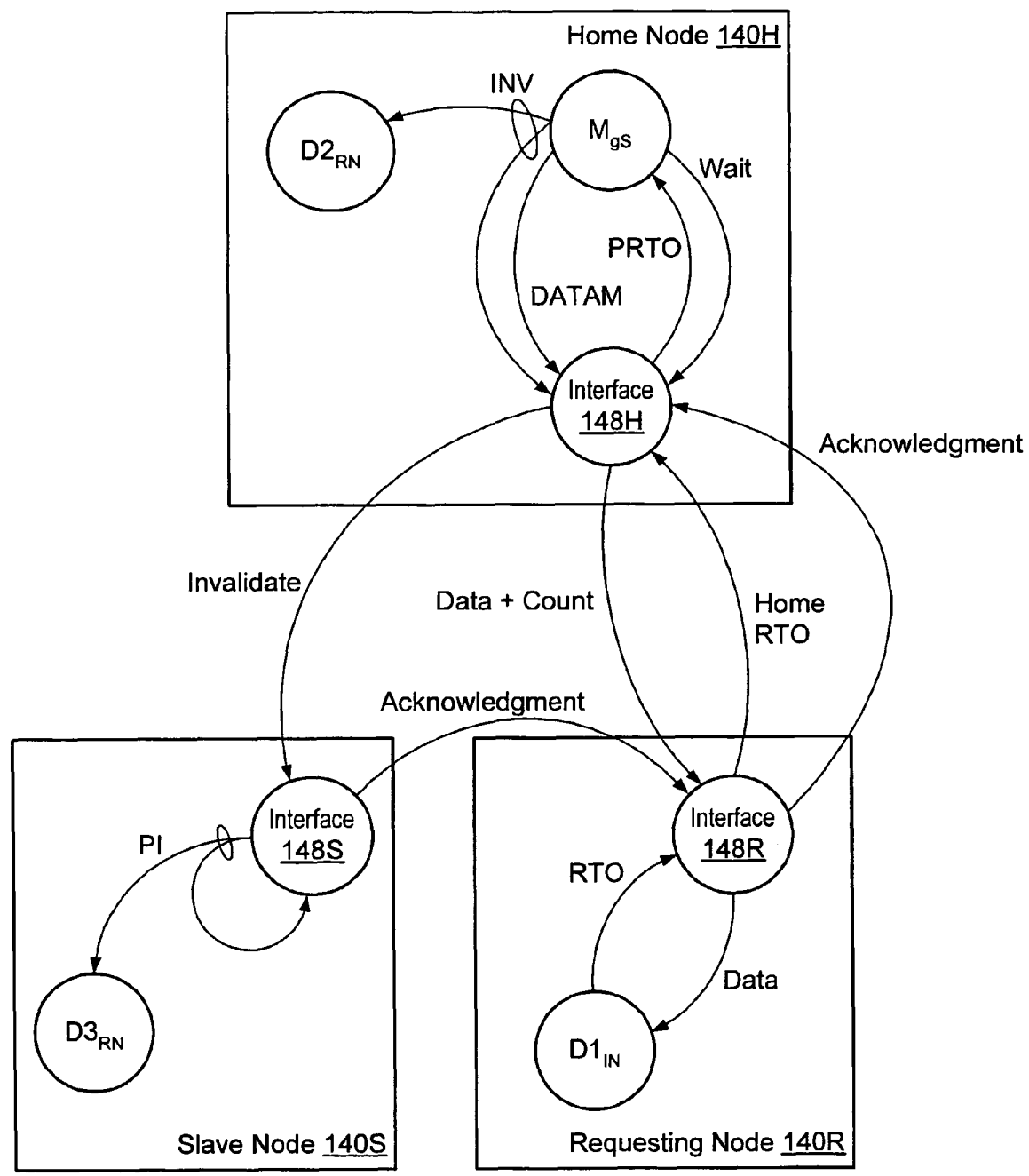

FIG. 27 illustrates an example of an RTO transaction in one embodiment of a multi-node computer system 100 where shared copies of a requested coherency unit are present in multiple nodes. As before, an active device in requesting node 1 40R requests a copy of a coherency unit by sending an RTO packet on the address network within that node. The RTO may be conveyed in BC mode, invalidating shared copies within the requesting node. If the requesting node is an LPA node for the requested coherency unit, the RTO may alternatively be conveyed in PTP mode to the memory subsystem (not shown) that maps the coherency unit, which may in turn convey the RTO to interface 148R (e.g., as part of a REP packet sent in response to an indication that the coherency unit is gS or gI in the requesting node), convey an RTO or WAIT response to the requesting device D1, and/or send invalidating packets that invalidate any shared copies within the node.

In response to the RTO, interface 148R sends a Home RTO coherency message to interface 148H in home node 140H. The requested coherency unit is gS in the home node (e.g., as indicated by a gTag maintained by the home memory subsystem M for the coherency unit). In one embodiment, global information maintained in home node 140H for the requested coherency unit may identify gS nodes (or groups of nodes that may include gS nodes) for the coherency unit. In alternative embodiments, the global information may simply indicate that other nodes may have a shared copy.

Since the global information for the coherency unit indicates that other nodes may have shared copies of the coherency unit, interface 148H sends Invalidate coherency messages to the gS nodes (interface 148H may also send Invalidate coherency messages to all or some of the other gI nodes in the computer system in some embodiments). Since the home node is a gS node (as is illustrated in FIG. 27), the home memory subsystem M may provide the data to interface 148H. Once shared copies within the node have been invalidated (e.g., as indicated by receipt of the DATA packet and the INV packet) and ownership of the coherency unit is proper (e.g., as indicated by receipt of the WAIT packet), interface 148H may provide the requested coherency unit to requesting node 140R. In addition, interface 148H may provide a count indicating how many other nodes were sent Invalidating coherency messages. Receipt of the Data+Count coherency message may indicate to interface 148R that a data packet corresponding to the coherency unit should not be provided to the requesting device D1 until each node that received an Invalidate coherency message from home node 140H has acknowledged invalidating any shared copies.

Slave interface 148S in slave node 140S may respond to the Invalidate coherency message received by sending a PI (Proxy Invalidate) packet on the address network. In one embodiment, the PI packet may be conveyed in BC mode. Each active device D3 loses its access rights to the coherency unit in response to receipt of the PI packet. In response to an indication that shared copies have been invalidated (e.g., in response to receipt of the PI packet conveyed in BC mode), interface 148S sends an Acknowledgment coherency message to the requesting interface 148R in requesting node 140R acknowledging that shared copies within slave node 140S have been invalidated.

Interface 148R in requesting node 140R may be configured to not provide the coherency unit to D1 until interface 148R has received a number of invalidation acknowledgments equal to the count indicated in the Data+Count coherency message received from the home node. Once the requisite number of invalidation acknowledgments has been received, interface 148R may send a DATA packet containing the requested coherency unit to the requesting device D1. In response to receiving the DATA packet and an indication that any shared copies within the node have been invalidated (e.g., an RTO conveyed in BC or PTP mode or a WAIT and INV conveyed in PTP mode), the requesting device gains write access to the requested coherency unit. Interface 148R may also send an Acknowledgment coherency message to the home node 140H so that a lock on the coherency unit may be released.

The above example shows the interface 148R in the requesting node waiting until it receives invalidation acknowledgments from all of the slave nodes that may have had shared copies before providing a data packet corresponding to the requested coherency unit to the requesting device. As a result, the requesting device does not gain write access to the coherency unit until all shared copies of the coherency unit have been invalidated. In other embodiments, other devices may delay providing the coherency unit to the requesting device. For example, in one embodiment, the interface 148H in the home node 140H may be configured to receive invalidation acknowledgments from the slave devices that were sent invalidating coherency messages. In response to receiving a number of acknowledgments equal to the number of nodes that were sent invalidating coherency messages, the home interface 148H may provide the interface in the requesting node 140R with the copy of the requested coherency unit. In general, any scheme that delays providing the requesting device with a data packet corresponding to the coherency unit until shared copies in other nodes have been invalidated may be used to maintain cache coherency within the multi-node computer system.

Figure 28:
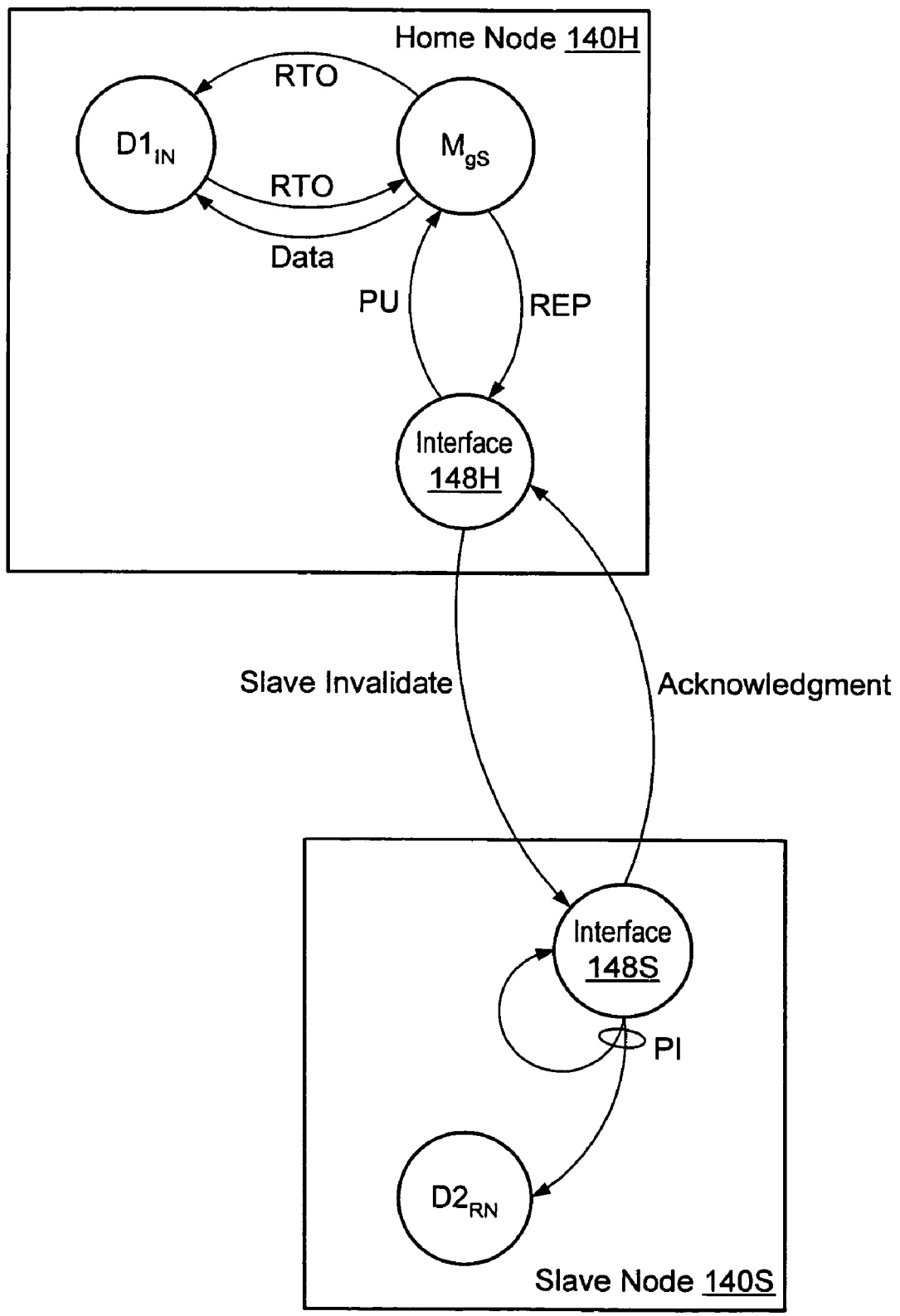

FIG. 28 shows another example of an RTO transaction in one embodiment of a computer system. In this embodiment, a computer system includes a slave node 140S and a home node 140H. Slave node 140S includes an interface 148S and an active device D2, and home node 140H includes interface 148H, memory subsystem M, and active device D1.

A device D1 initiates a RTO transaction for a coherency unit whose home node is home node 140H. In this embodiment, packets for the requested coherency unit are conveyed in PTP mode in home node 140H. Thus, the RTO request packet is conveyed to memory subsystem M. Memory subsystem M (or, in one embodiment, the address network in home node 140H) returns an RTO response to the requesting device D1, causing the requesting device to gain an ownership responsibility for the requested coherency unit. However, since the home node is gS for the requested coherency unit, the memory subsystem cannot complete the RTO transaction by providing D1 with data. Instead, the memory subsystem M sends a REP packet corresponding to the RTO request to interface 148H so that shared copies of the requested coherency unit in other nodes can be invalidated. The home interface 148H locks the coherency unit and sends out Slave Invalidate coherency message to slave nodes such as node 140S that may have shared copies of the requested coherency unit. Home interface 148H also tracks how many nodes it sends invalidation coherency messages so that it knows how many invalidation acknowledgments to receive before providing the requested coherency unit to device D1.

In slave node 140S, interface 148S receives the Slave Invalidate coherency message from the home node 140H and responds by sending PI (Proxy Invalidate) packets on the address network to any client devices, like device D2, that may have a shared access right associated with the requested coherency unit. Once any shared copies have been invalidated (e.g., as indicated by interface 148S receiving its own PI on the Broadcast network), interface 148S provides an Acknowledgment coherency message to the home node.

Once each slave node 140S that was sent a Slave Invalidate coherency message responds with an Invalidation Acknowledgment coherency message, the home interface 148H causes the requested coherency unit to be supplied to the requesting device D1 to complete the RTO transaction and releases the lock on the coherency unit. In one embodiment, the home interface 148H sends a PU (Proxy Upgrade) packet to the home memory subsystem 148H, causing home memory subsystem to provide a DATA packet containing the requested coherency unit to the requesting device D1. The home memory subsystem's receipt of the PU packet may also cause it to upgrade the global access state for the requested coherency unit to gM.

The above examples show how, in some embodiments, active devices may initiate transactions in the same way in multi-node as those active devices do in single node systems. Likewise, active devices may initiate transactions for both LPA and non-LPA coherency units in the same way. Accordingly, the active devices may not need to track whether they are in a multi-node or single node system and whether they are requesting an LPA or non-LPA coherency unit in order to operate properly (note that active devices may need to be configured to respond to all of the packets that may be received in both single and multi-node systems (e.g., proxy packets sent by interfaces 148) in order to operate correctly in a multi-node system, however). Thus, the memory subsystems 144 and the interfaces 148 may operate in such a way that an active device's presence in a multi-node or single node system and an LPA or non-LPA node is transparent to that active device. As a result, in some embodiments, active devices may not have different operating modes that are used dependent upon the system (LPA/non-LPA, single/multi-node) within which they are included.

The above examples show exemplary RTO transactions in one embodiment of a multi-node system. Other transactions that require shared copies to be invalidated before providing an access right to an initiating device may also be implemented in a multi-node system. For example, the requesting device in a WS transaction should not gain an access right to the requested coherency unit until shared copies in other nodes have been invalidated. In a WS transaction, the requesting device may gain write access to the requested coherency unit upon receipt of an ACK packet corresponding to the coherency unit on the data network. Accordingly, the interface in the requesting node (or, in some embodiments, the home node) may be configured to delay providing the ACK packet to the requesting device until shared copies of the coherency unit in other nodes have been invalidated and/or the acknowledgment from the owning device has been received.

Interface

Figure 29:
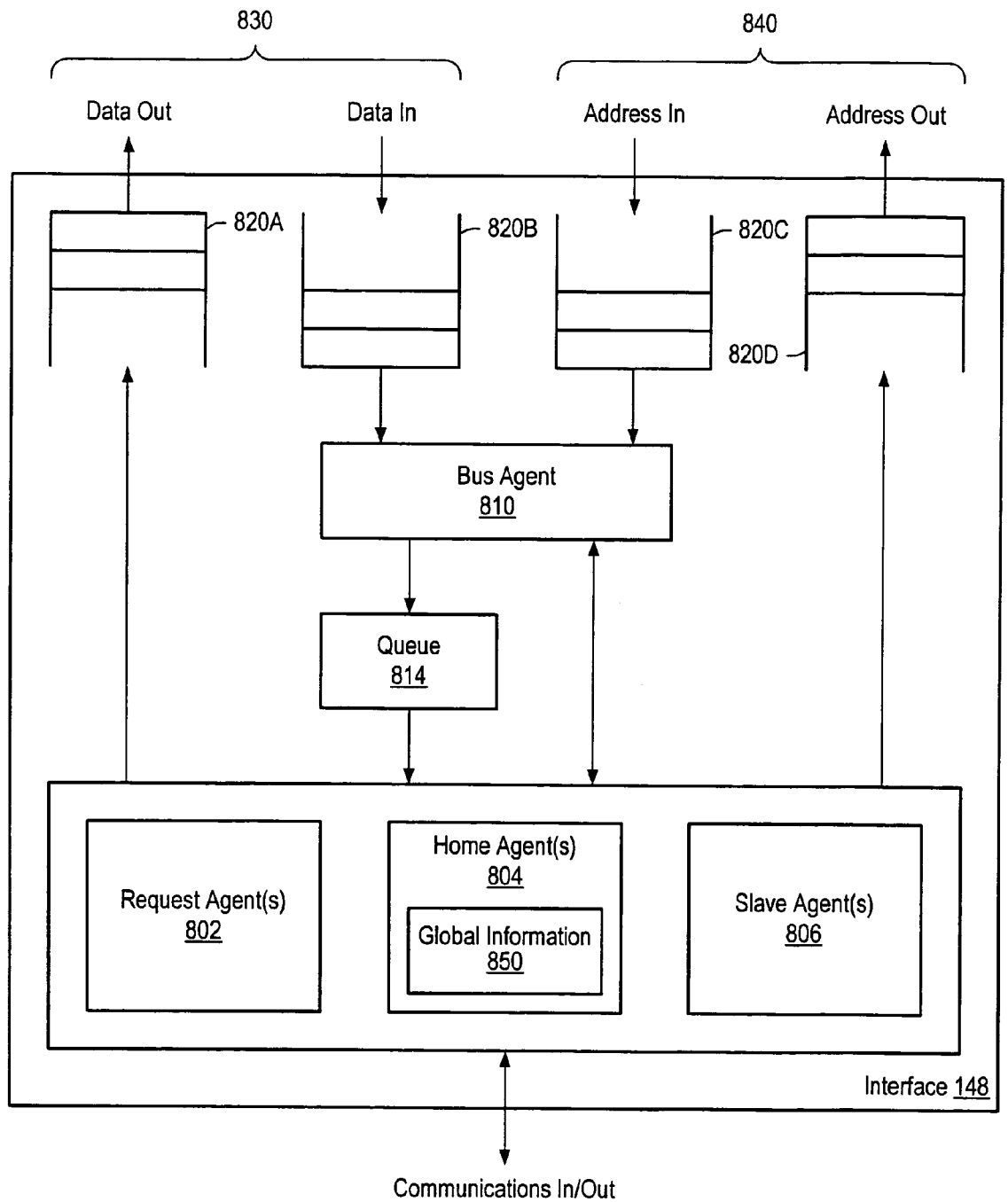
FIG. 29 shows one embodiment of an interface that may be included in a multi-node computer system.

FIG. 29 shows one embodiment of an interface 148. In this embodiment, interface 148 includes several data queues 830 and address queues 840. Data queues 830 and address queues 840 may be respectively coupled to the data and address networks within the node 140 containing interface 148. Data queues 830 include data-in queue 820B and data-out queue 820A. Address queues 840 include address-in queue 820C and address-out queue 820D. In one embodiment, a packet may be defined as being sent by interface 148 when it is placed in address-out queue 820D or data-out queue 820A. Similarly, a packet may be defined as being received by interface 148 when it is popped from address-in queue 820C or data-in queue 820B. In one embodiment, data queues 830 and address queues 840 may be FIFO queues.

Interface 148 includes one or more bus agents 810 that monitor address-in queues 820C and data-in queues 820B. In addition to bus agent 810, interface 148 may include one or more request agents 802, one or more home agents 804, and/or one or more slave agents 806. In response to determining that an address packet is part of a transaction that may involve interface 148, bus agent 810 may add a record corresponding to the packet to an outstanding transaction queue 814. For example, in response to RTS, RTO, RS, WB, WBS, RTWB, WS, RI0, WI0 and/or INT packets that specify a coherency unit that is not LPA in the node, bus agent 810 may add a record corresponding to the packet to the outstanding transaction queue 814. In response to PRTOM, PRTO, PIM, PI, WAIT, PRTSM, PRSM, PRN, and certain DATA, DATAM, DATAN, NACK, ERR, and INV packets, the bus agent 810 may forward that packet to the request, slave, or home agent that initiated the subtransaction in which that packet is involved (e.g., based on a transaction ID in the received packet).

In LPA nodes, certain requests may be conveyed by the address network to a device within the node that maps the requested coherency unit (e.g., a home memory subsystem). For example, the memory subsystem may maintain gTags for coherency units that map to the memory subsystem. If a coherency unit's gTag indicates that interface 148 should be involved in the transaction (e.g., because the node is gS or gI for the coherency unit), the memory subsystem may send a REP (Report) packet identifying the coherence unit and the type of transaction to the interface 148 responsible for communicating with the home node (e.g., in systems with more than one interface per node, each interface may handle transactions involving coherency units within a designated range of addresses). Thus, bus agent 810 may also add records corresponding to REP packets to the outstanding transaction queue 814.

The outstanding transaction queue 814 may not be a FIFO queue in some embodiments. However, agents 802, 804, and 806 may be configured to access outstanding transaction queue 814 so that only the first record identifying a given coherency unit may be selected, and so that no more than one record identifying a given coherency unit may be selected at a given time. In some embodiments, the agents may also be configured to access the outstanding transaction queue 814 so that all records that correspond to non-cacheable transactions initiated by the same active device are selected in the order in which the corresponding records were received.

Request agents 802, home agents 804, and slave agents 806 may each be configured to send and/or receive packets on the address and data networks in response to records in the outstanding transaction queue 814. Each agent 802, 804, and 806 may also be coupled to one or more queues (not shown) that are coupled to send and receive communications on the inter-node network 154. In some embodiments, there may be more than one agent of any given type. However, in order to maintain ordering, some agent actions may be limited in some embodiments. For example, if there are multiple bus agents, only one bus agent 810 may be able to handle packets for a given address. Similarly, if there are multiple request agents 802, only one request agent may be able to handle a request involving a given address at any one time.

A request agent 802 may handle records in the outstanding transaction queue 814 for transactions that originated within the node (e.g., an RTO transaction initiated by an active device within the node, as discussed above). In one embodiment, a request agent 802 may handle RTS, RTO, RS, WB, WBS, RTWB, WS, RI0, WI0, and INT records corresponding to requests that cannot be fully handled within the node. A request agent 802 may be responsible for sending coherency messages to the home agent in the home node for a given coherency unit if the transaction cannot be satisfied within the node. Note that if the node containing request agent 802 is the home node for a specified coherency unit and the transaction cannot be satisfied in the node, request agent 802 may send a coherency message to the home agent 804 in the same interface 148 (this coherency message may be sent internally without appearing on the inter-node network 154). A request agent 802 may also handle subsequent coherency messages received from the home agent in the home node and/or slave agents in slave nodes as part of a transaction. The request agent 802 may send a coherency message to the home agent in the home node in order to release a lock on a coherency unit at the end of the transaction involving that coherency unit. If the node containing interface 148 is an LPA node, the request agent 802 may send packets on the node's address and/or data networks (e.g., PMW and/or DATAM packets) in order to update a gTag maintained by a home memory subsystem within the node. The request agent 802 may also remove records that correspond to the transaction from the outstanding transaction queue 814 once the transaction is completed.

A home agent 804 receives coherency messages from a request agent 802. These coherency messages specify transactions involving coherency units whose home node is the node containing home agent 804. Thus, a home agent 804 may receive coherency messages from the inter-node network 154 requesting initiation of subtransactions that read and/or invalidate a coherency unit. The home agent may include a global information cache 850 that stores information identifying the gTag and/or node ID of the gM node for coherency units for which the interface's node is the home node. The home agent 804 may use information in global information cache 850 to determine which types of proxy packets to send to implement subtransactions in some embodiments. The home agent 804 may also receive coherency messages that cause the home agent to perform a write subtransaction (e.g., to write a coherency unit and/or to update a gTag for a particular coherency unit in a home memory subsystem).

Slave agent 806 receives coherency messages from home agents. In response to these coherency messages, slave agent 806 may send address and/or data packets within the node. For example, a slave agent 806 may initiate subtransactions to read and/or invalidate a coherency unit.

In order to maintain ordering, two types of locks may be used to coordinate access to coherency units (or to larger units of data in some embodiments). A "home lock" is a lock acquired by the home agent 804 (i.e., the home agent in the interface in a coherency unit's home node) for a given unit of data. When the home agent 804 acquires a home lock for a given coherency unit, no other agent 802 or 806 may perform actions involving that coherency unit until the home agent releases the home lock. Thus, the home lock assures that an interface is performing at most one transaction or subtransaction for a given coherency unit at a time. In one embodiment, the home agent 804 may release the home lock in response to receiving an acknowledgment from the request agent in the requesting node.

Another type of lock that may be used is a "consumer lock." The consumer lock may be acquired and released by request agents 802, home agents 804, and slave agents 806 in order to coordinate the removal of records from outstanding transaction queue 814. When the consumer lock has been acquired, no other agent 802, 804, or 806 may access records involving the locked unit of data. However, acquisition of the consumer lock for a given coherency unit or other unit of data may not affect a bus agent 810's ability to add new records involving that coherency unit to the outstanding transaction queue 814.

Each record in outstanding transaction queue 814 may include a "requested" flag in some embodiments. The requested flag may initially be set to "false" when the record is created by bus agent 810. A request agent 802 may set the flag to "true" when the request agent sends a coherency message corresponding to the record to the home agent 804 in the coherency unit's home node. The value of the requested flag indicates which transactions are already being handled by the interface. A consumer lock acquired by a request agent 802 may be released after the request agent sets the value of the requested flag to true.

The consumer and home locks and the requested flag may be used to ensure that transactions involving the same coherency unit (or other unit of data, depending on the resolution of the home and consumer locks) are handled in the proper order. For example, the request agent 802 may be configured to select the first request in the outstanding transaction queue 814 that specifies unlocked data and whose requested flag equals false.

Invalidations in a Multi-Node System

In some embodiments, a multi-node system 100 may be configured so that if a static coherency unit is gM in one node, no other node in the multi-node system is a gS or gM node for that coherency unit. Conversely, if any node is gS for the coherency unit, no node is gM for the coherency unit.

By specifying that if there are any gS nodes, no active device has write access to a coherency unit and that if an active device has write access to a static coherency unit, there are no gS nodes, some transactions may be simplified. For example, RTO and WS transactions require that shared copies of a requested coherency unit be invalidated. If an active device's write access to a coherency unit implies that no other device in another node has an access right to the coherency unit, RTO transactions within a non-LPA node containing an owning device may proceed as they would in a single node system. For example, if there is an active device with write access in one node, it implies that there are no sharing devices in any other node. Therefore, if an owning device receives a request for write access (e.g., a RTO or WS) from another device in the same node, the owning device can provide data corresponding to the coherency unit to the requesting device without having to wait for an indication that shared copies of the requested coherency unit have been invalidated in other nodes (although the requesting device's write access is still dependent on shared copies within the requesting device's node being invalidated). In one embodiment, such a configuration may reduce transaction time and/or reduce inter-node network traffic for certain transactions.

In order to ensure that there are no gS or other gM nodes if there is a gM node and that there are no gM nodes if there are any gS nodes, certain transactions may have different effects depending on whether they are initiated in the same node as an active device that currently has write access to the requested coherency unit. For example, any transaction that provides a device in another node with shared access to a coherency unit will remove ownership from the owning device. In contrast, if a device within the same node as the owning device requests shared access, the owning device may retain ownership (although in some embodiments, the owning device may not retain ownership in either situation).

In one embodiment, transactions requesting shared access that are initiated within the same node as the owning device may be performed as described above with respect to a single-node system. In order to differentiate transactions that are initiated in another node, subtransactions initiated by an interface within the owning node may involve different packet types. In one embodiment, the packets used for remote subtransactions (i.e., subtransactions within a node that are part of transactions initiated outside of that node) may be classified as "proxy" packets, as shown in FIG. 22. Thus, an RTS packet may be used in the node in which an RTS transaction is initiated, while a PRTSM (Proxy RTS Modified) packet may be used in other nodes that participate in the RTS transaction. Upon receipt of an RTS packet, an owning device may retain ownership of the requested data. In contrast, upon receipt of a PRTSM packet, an owning device will lose ownership, since the proxy packet indicates that the RTS transaction was initiated in another node.

Figure 30:
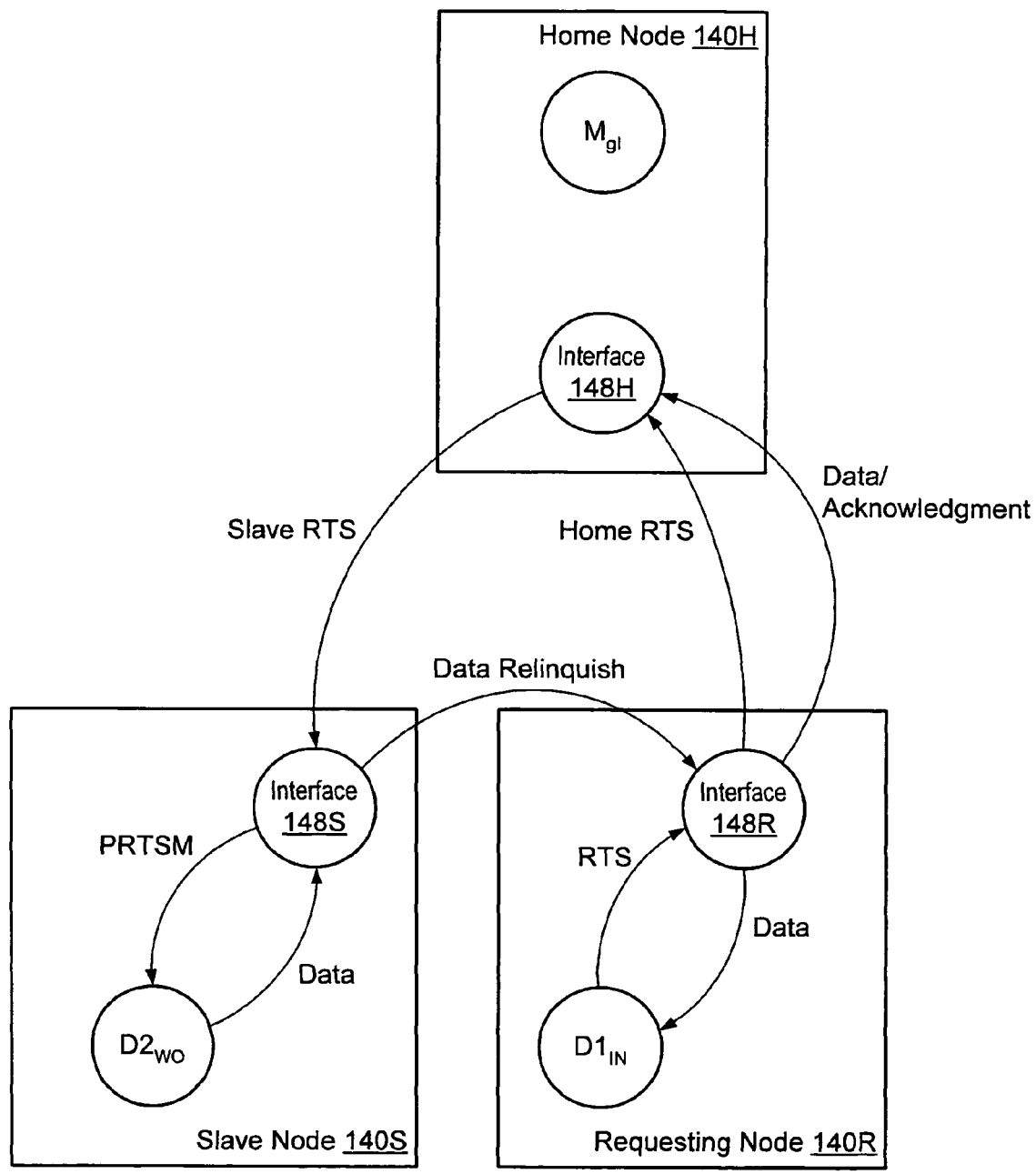
FIG. 30-32 show exemplary RTS transactions in one embodiment of a multi-node computer system.

FIG. 30 shows an example of an RTS transaction in one embodiment of a multi-node computer system 100. In this embodiment, the multi-node computer system includes at least three nodes. A requesting node 140R includes an active device that initiates an RTS transaction for shared access to a coherency unit. Home node 140H is the home node for the requested coherency unit. Slave node 140S contains an active device that is currently the owner of the requested coherency unit.

Active device D1 initiates an RTS transaction by sending an RTS packet on the address network in requesting node 140R. In this example, requesting node 140R is a gI node for the requested coherency unit (and thus the transaction cannot be completed within the node 140R), so interface 148R sends a Home RTS communication to interface 148H in home node 140H.

In response to the Home RTS communication, the interface 148H acquires a lock on the specified coherency unit. Since the home node 140H being gI for the requested coherency unit (e.g., as indicated by home memory subsystem M), interface 148H sends a Slave RTS communication to the gM node for the requested coherency unit. Information identifying the gM node for the coherency unit may be maintained by interface 148H and/or home memory subsystem M.

The Slave RTS coherency message causes interface 148S in slave node 140S to send a PRTSM (Proxy RTS Modified) packet to the owning active device D2. Receipt of the PRTSM packet causes active device D2 to lose ownership of the coherency unit. When D2 subsequently sends a data packet containing a copy of the requested coherency unit, D2 loses write access. However, D2 may retain read access to the coherency unit. Receipt of the DATA packet from device D2 allows interface 148S to send a communication to the requesting node containing the requested coherency unit. In this example, a Data Relinquish coherency message is sent to the requesting node 140R, indicating that the node has relinquished its ownership of the coherency unit (i.e., it is no longer a gM node for that coherency unit). The Data Relinquish coherency message causes interface 148R to send a Data/Acknowledgment coherency message to the home node acknowledging satisfaction of the transaction, indicating that slave node 140S and requesting node 140R are now gS nodes, providing a new gTag value (gS) for home node 140H, and/or providing an updated copy of the coherency unit to home node 140. Additionally, interface 148R provides requesting active device D1 with a copy of the requested coherency unit on the data network to satisfy the transaction. Note that as used herein, a transaction is "satisfied" when the requesting device gains the requested access right or when the transaction completes, whichever comes first. A transaction "completes" when no more coherency messages or data or address packets are sent in response to the initial request.

In response to the Data/Acknowledgment coherency message from requesting node 140R, interface 148H in home node 140H may send PMW and DATAM packets (not shown) on the address and data networks respectively to home memory subsystem M in order to update the memory subsystem's copy of the coherency unit and/or global information such as the gTag for the coherency unit in the home node. The interface 148H may also release a lock on the coherency unit, allowing other inter-node network transactions involving that coherency unit to be handled.

Figure 31:
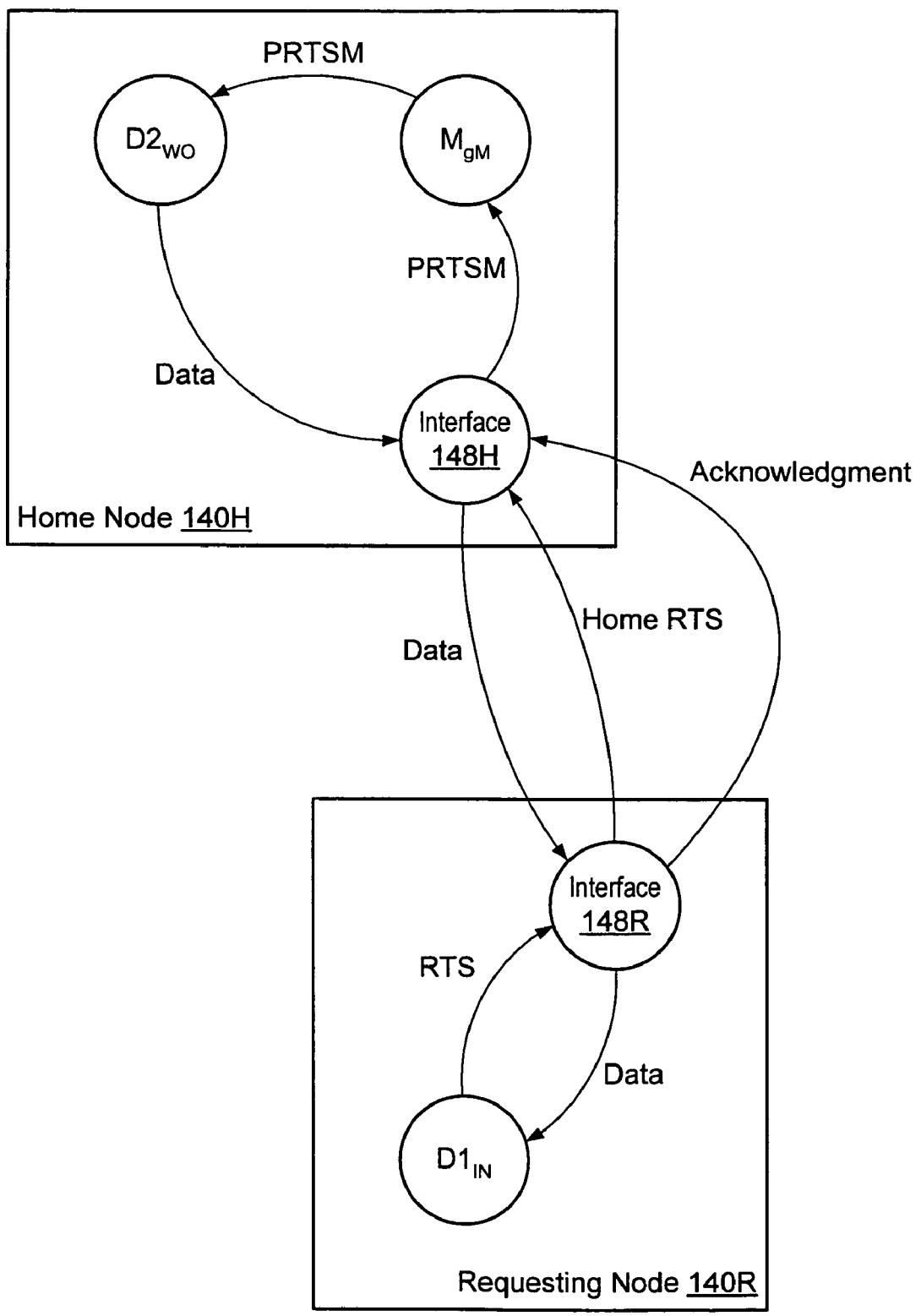

FIG. 31 shows another example of an RTS transaction in one embodiment of a multi-node computer system. In this example, an active device D1 in a requesting node 140R initiates an RTS transaction. No device in the requesting node owns the requested coherency unit, so interface 148R forwards the request to the home node 140H for the coherency unit. Interface 148H receives the Home RTS coherency message and locks the coherency unit. Since the home node 140H is gM, interface 148H initiates a PRTSM subtransaction by sending a PRTSM packet on the address network. In this example, the address network conveys the PRTSM in PTP mode to the home memory subsystem M for the coherency unit. Receipt of the PRTSM may cause the home memory subsystem M to update the gTag for the requested coherency unit to gS. The home memory subsystem sends a PRTSM response to the owning device D2 (e.g., as identified in a directory). In response to receipt of the PRTSM, the owning device D2 loses ownership of the requested coherency unit and, at a subsequent time, forwards a copy of the requested coherency unit (DATA) to interface 148H on the data network. Sending the data packet causes active device D2 to lose write access to the coherency unit. Active device D2 may retain read access to the requested coherency unit. In response to receiving the DATA packet, interface 148H communicates the coherency unit to interface 148R in the requesting node. Interface 148H may also send a PMW and a DATAM packet to the home memory subsystem M in order to update the home memory subsystem's copy of the coherency unit.

Interface 148R receives the Data coherency message from the interface in home node 140H. Interface 148R then sends a DATA packet containing the coherency unit to the requesting device. Interface 148R also sends an Acknowledgment coherency message to the interface in the home node 140H indicating that the transaction is satisfied, allowing the interface 148H to release the lock on the coherency unit at the home node 140H.

Different Types of Address Packets for Nodes with Different gTags

A transaction initiated within a node may cause certain ownership and/or access right changes within that node during the transaction, but the gTag of the requested coherency unit may not be updated until later in the transaction. For example, a device D1 in a first node (which is not the home node) may initiate an RTS transaction for a coherency unit. The requested coherency unit may be gS within its home node. Before the interface within the home node initiates a subtransaction to provide the requesting device D1 with a copy of the requested coherency unit, another device D2 within the home node may initiate an RTO for that coherency unit. Since the home node is gS, the home memory subsystem forwards the RTO to the interface (e.g., as a REP packet) so that the interface can send communications invalidating shared copies in other gS nodes. However, the memory may also send an RTO or WAIT response to the requesting device D2, causing it to become the owner of the requested coherency unit. Assuming the interface in the home node receives the RTS before it receives the RTO, the RTO will not complete until the RTS has completed (e.g., since handling the RTS transaction will lock the coherency unit in the home node). However, the device D2 that initiated the RTO is the owning device within the home node and will be unable to provide a copy of the coherency unit in response to a proxy RTS until the RTO completes. In order to avoid deadlock and to ensure that transactions complete in the order in which they are handled by the home agent in the home node, the interface may read the copy of the coherency unit from memory instead of requesting it from the new owning device D2. However, memory may be configured to not respond to requests unless it is the owner of the requested coherency unit. Furthermore, since the RTO should complete after the RTS, satisfying the RTS should not remove ownership from the active device D2 that initiated the pending RTO.

In order to cause memory to respond to the RTS while not removing ownership from the device D2 that initiated the subsequent RTO, the interface may use a special type of proxy read-to-share (PRTS) address packet. In one embodiment, there may be two types of proxy request packets. One type may be used in non-gM nodes and the other may be used in gM nodes. In this description, gM-type packets are identified by an "M" at the end of the packet identifier (e.g., PRTOM, PRTSM, and PIM) and non-gM-type packets lack the "M" identifier (e.g., PRTO, PRTS, and PI). The non-gm type of request packets may cause memory to respond, even if it is not the current owner, and not affect the ownership of owning caches within a node. In contrast, the gM type of packets cause owning active device to give up ownership and are not responded to by non-owning memory subsystems. Both classes of address packets may invalidate shared copies if they correspond to a transaction that invalidates shared copies (e.g., RTO, WS). Note that in some embodiments, PRTS packets may be implemented as PMR packets, as described below.

An interface 148 may be configured to cache gTags and other global information (e.g., node IDs of gM nodes and/or indications of whether any nodes may have shared copies) for recently accessed coherency units for which the node that includes that interface is the home node. For example, looking back at FIG. 29, each home agent 804 may include a global information cache 850. In order to determine what type of proxy request packet (e.g., PRTS or PRTSM) to send on the address network for a given coherency unit, the interface 148 may lookup that coherency unit in its global information cache. If the coherency unit's gTag is stored in the global information cache, the interface 148 may use the cached gTag to select the appropriate type of proxy request packet to send. If not, the interface 148 may send a PMR packet to the coherency unit's home memory subsystem to obtain the coherency unit's gTag. Upon receiving the coherency unit's gTag, the interface 148 may send the appropriate type of proxy request packet and cache the gTag (and/or other global information associated with the coherency unit) in the interface's global information cache.

Figure 32:
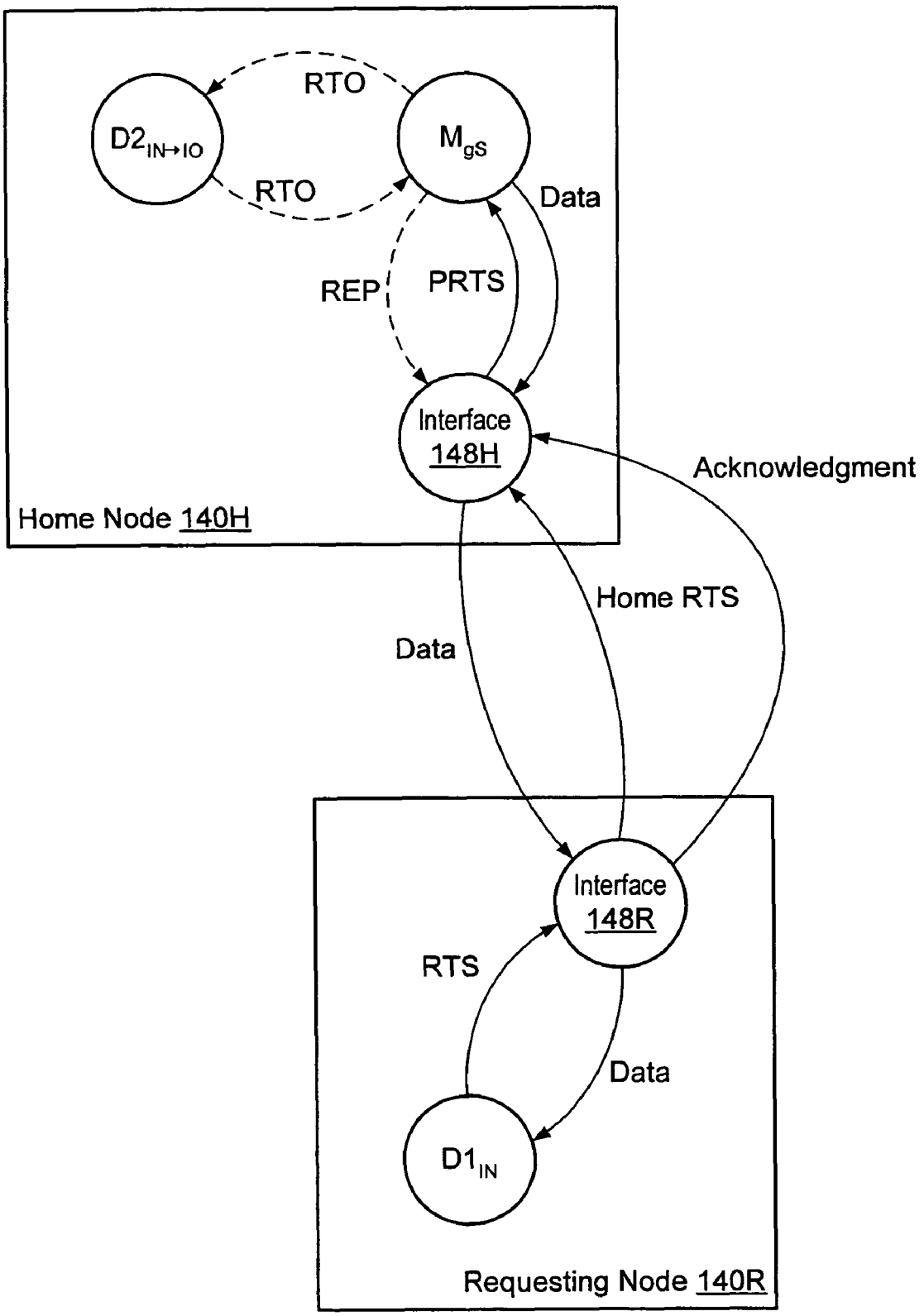

FIG. 32 shows one embodiment of a computer system that includes a requesting node 140R and a home node 140H. In this example, an active device D1 initiates an RTS transaction for a first coherency unit (e.g., in response to a read prefetch or a read miss in one or more caches associated with D1). D1 initiates the RTS transaction by sending an RTS address packet on the requesting node's address network. In this example, the requested coherency unit does not map to a memory subsystem within the requesting node. Accordingly, the address network conveys the request to the interface 148R. In order to satisfy the RTS, interface 148R sends the Home RTS coherency message on the inter-node network to the interface 148H in the home node 140H.

At some time before the home interface 148H begins handling the RTS transaction that was initiated in the requesting node 140R, a device D2 in the home node 140H initiates an RTO transaction for the same coherency unit. In this example, D2 initiates the RTO by sending an RTO request on the home node's address network (packets transfers that are part of the RTO transaction are represented by dashed lines in FIG. 32). The address network conveys the RTO request to the home memory subsystem in PTP mode, and the home memory subsystem sends an RTO response back to the requesting device D2. Receipt of the RTO response causes device D2 to gain an ownership responsibility (indicated by subscript "O") for the first coherency unit. Additionally, the memory subsystem may recognize that satisfying the RTO involves invalidating shared copies in other nodes since the gTag for the requested coherency unit is gS. In order to complete the transaction, the memory subsystem sends a REP data packet corresponding to the RTO to interface 138H. Interface 148H adds a record corresponding to the REP packet to its outstanding transaction queue.

In this example, the remote RTS is handled (e.g., by a home agent) before the REP corresponding to the RTO is handled (e.g., by a request agent). Additionally, the coherency unit may be locked by the home agent in response to the Home RTS coherency message, preventing handling of the REP until completion of the RTS. Accordingly, even though D2 has an ownership responsibility associated with the first coherency unit, the home node is gS for that coherency unit when the RTS is handled by interface 148H. Based on the first coherency unit's current global access state (gS) within the home node, interface 148H may use an address packet from the non-gm class of packets (e.g., PRTS) to request a copy of the coherency unit from memory. The PRTS does not affect D2's ownership responsibility and causes the memory to send the interface 148H a data packet containing a copy of the requested coherency unit, even though the memory is not the owner of the coherency unit. Accordingly, the home interface receives the data necessary to complete the RTS transaction without affecting the ownership state of the active device that is waiting for the subsequent RTO to complete. Once interface 148H receives the coherency unit, it may send a coherency message to the interface 148R in requesting node 140R, which in turn conveys the coherency unit on the data network to requesting device D1. Interface 148R may then send an acknowledgment coherency message to the interface in the home node, allowing the home node to release the lock acquired for the first coherency unit. Once the lock is released, subsequent transactions involving that coherency unit, such as the RTO, may be handled by the home interface 140H.

If the local RTO is handled by the home interface before the remote RTS (e.g., a REP packet corresponding to the RTO is selected from the interface's outstanding transaction queue by a request agent and passed to the home agent before the RTS is handled by the home agent), the gTag in the home node for the requested coherency unit is gM (because device D2 has write access to the coherency unit) when the home interface begins handling the RTS. Since the current global access state indicates that the home node is gM for the requested coherency unit, the interface 148H sends a PRTSM packet instead of a PRTS. The PRTSM will not be ignored by the owning active device, nor will it be responded to by the non-owning memory subsystem. Accordingly, the active device D2 that owns the requested coherency unit (the device that initiated the earlier RTO and received ownership as part of the RTO) will lose ownership upon receipt of the PRTSM. The device D2 will also lose write access upon sending a copy of the coherency unit to the interface 148J. Additionally, the gTag of the home node will become gS in response to the memory subsystem's receipt of the PRTSM.

Speculative Subtransactions

Having two types of subtransactions, one for gM nodes and one for non-gM nodes, may allow an interface to speculatively initiate a subtransaction without knowing the current gTag of the requested coherency unit within the node. For example, each memory subsystem 144 may be configured to respond to certain types (e.g., non-gI types) of address packets sent from an interface 148 by sending a data packet containing a copy of the requested coherency unit and its gTag. Furthermore, these types of address packets may not affect the ownership responsibilities of owning active devices. Based on the gTag returned by the memory, an interface may determine if the type of address packet that was speculatively sent is correct. If, given the gTag, the speculative address packet is not the correct type of address packet, the interface may initiate another subtransaction using the correct type of address packet.

Figure 33:
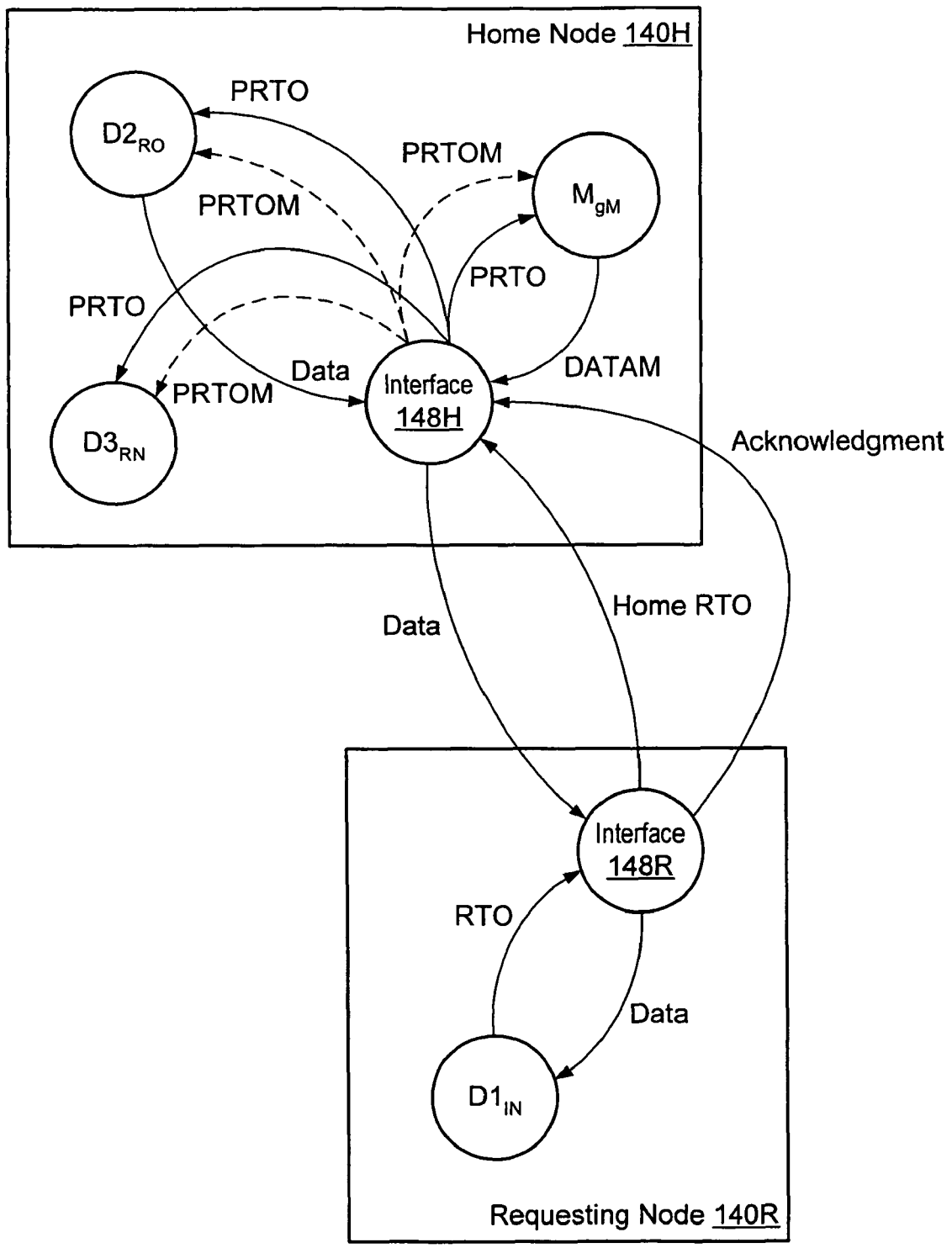
FIGS. 33-34 show additional exemplary RTO transactions in one embodiment of a multi-node computer system.

FIG. 33 shows one example of how an interface in a home node may initiate a speculative subtransaction. In FIG. 33, an embodiment of a computer system includes a requesting node 140R and a home node 140H. The requesting node includes an active device D1 and an interface 148R. The home node includes two active devices D2 and D3 and a memory subsystem M. Before D1 initiates an RTO transaction for a first coherency unit, D1 has the first coherency unit in state IN (Invalid, No Ownership), D2 has the first coherency unit in state RO (Read Access, Ownership), D3 has the first coherency unit in state RN (Read Access, No Ownership), and the global access state of the first coherency unit within the home node is gM.

D1 initiates an RTO transaction (e.g., in response to a write miss in D1's cache) by sending an RTO request on the requesting node's address network. The RTO request is conveyed to interface 148R. Interface 148R sends a coherency message indicative of the request to the interface 148H in the home node 140H for the first coherency unit.

When interface 148H begins handling the remote RTO, interface 148H may not be aware of the current gTag of the requested coherency unit within the home node. For example, in embodiments where interface 148H caches gTags for coherency units for which node 140H is the home node, interface 148H may experience a gTag cache miss. While interface 148H could query the home memory subsystem for the gTag for the first coherency unit (e.g., using a PMR packet), interface 148H may instead speculatively initiate a PRTO subtransaction by sending an address packet from the non-gM type of proxy RTO packets (e.g., PRTO) on the address network. Speculatively initiating PRTO subtransactions may improve performance in situations where the speculation is correct. As used herein, a speculative subtransaction is one in which, at the time the subtransaction is initiated, it is not determinative whether the packet used to initiate the subtransaction is of the correct type for the global access state of the requested coherency unit.

In this example, the speculative PRTO is conveyed in broadcast mode to devices D2 and D3 and the home memory subsystem M. The speculative PRTO may invalidate non-owned shared copies of the first coherency unit but have no effect on ownership responsibilities of owning active devices. Thus, upon receipt of the PRTO, D3 may lose its access right to the first coherency unit but D2 may retain its ownership responsibility for and access right to the coherency unit. The memory subsystem may respond to the speculative PRTO by conveying the current gTag for the first coherency unit and/or the memory's copy of the coherency unit (e.g., as part of a DATAM packet) to the interface 140H.

In response to the data packet sent by the memory subsystem, the interface recognizes that the speculation was incorrect given the current gTag (gM) of the first coherency unit within the home node. In response, the interface may resend a non-speculative address packet (e.g., PRTOM) of the gM type of PRTO subtransaction packets. In response to this address packet, the owning device D2 may lose ownership and commit to send a copy of the requested coherency unit to the interface. When D2 sends the DATA packet containing the first coherency unit, it loses write access to the coherency unit. The home memory subsystem updates the gTag for the coherency unit to be gI in response to the PRTOM. Note that in some embodiments, the home memory subsystem may not update the gTag in response to a misspeculated PRTO (i.e., if the PRTO is received in a gM node).

Once the interface 148H receives the DATA packet from D2, it may communicate the coherency unit to the requesting node 140R. In response, the interface 148R may send a DATA packet to the requesting device D1, completing the RTO transaction, and send an acknowledgment coherency message to the home node so that the home node can release a lock acquired for the first coherency unit.

Note that an interface may also be configured to initiate other speculative subtransactions (e.g., speculative read-to-share subtransactions) in addition to speculative read-to-own subtransactions in some embodiments.

In some embodiments, a memory subsystem may be configured to "correct" a speculative subtransaction by determining if the address packet sent by the interface is the correct type of address packet, given the gTag of the specified coherency unit within the node. If the speculation is incorrect, the memory subsystem may resend the correct type of address packet to an owning device and/or to any sharing devices.

Figure 34:
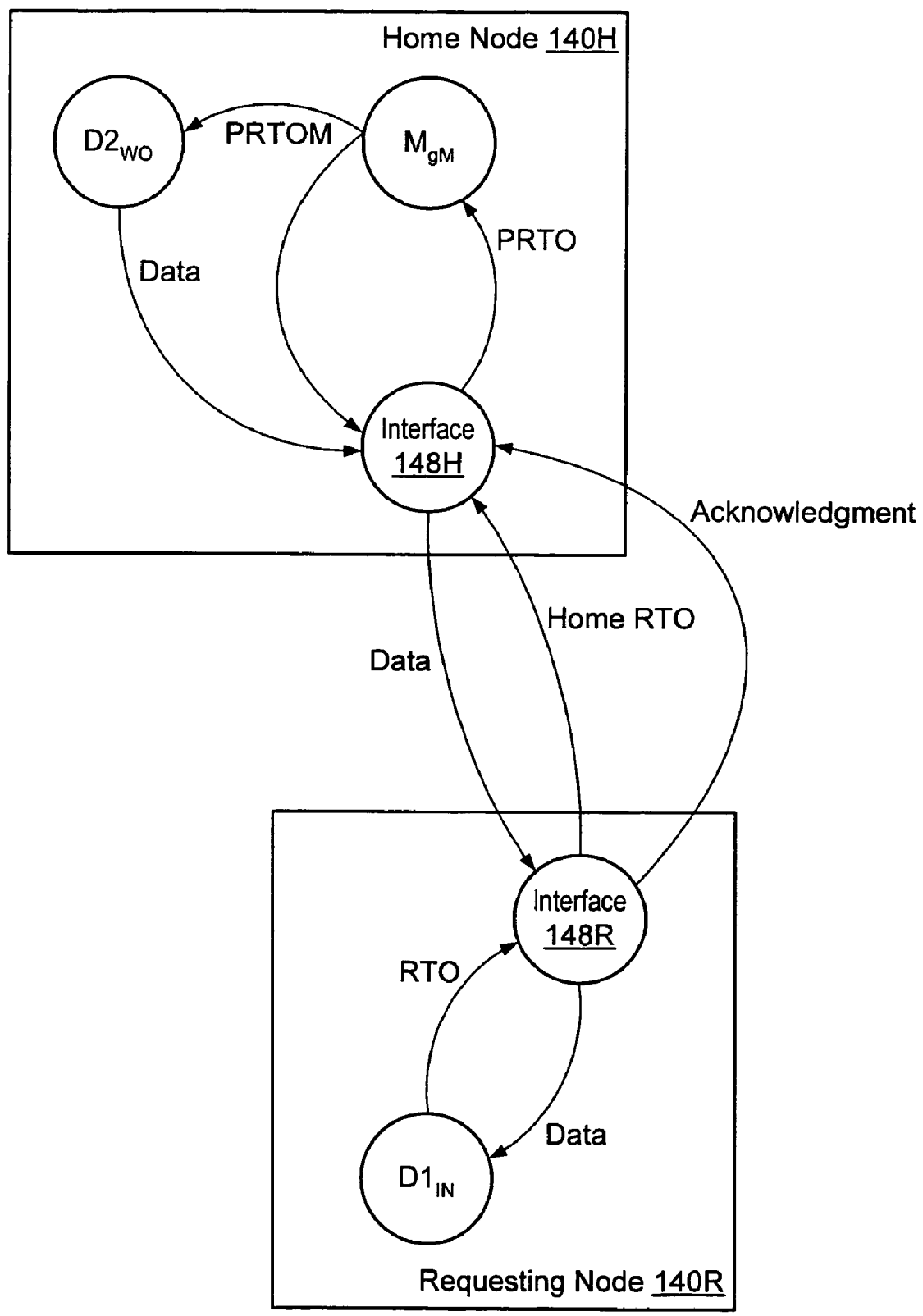

FIG. 34 shows one example of an embodiment of a computer system where a memory subsystem is configured to correct an incorrectly speculated subtransaction. In this example, the computer system includes a requesting node 140R and a home node 140H. Home node 140H is the home node for a coherency unit being requested by an active device D1 in requesting node 140R. Home node 140H is the gM node for the coherency unit and includes an active device D2 that has ownership of and write access to the requested coherency unit, an interface 148H, and a memory subsystem M. Requesting node 140R includes active device D1 and interface 148R.

Device D1 initiates an RTO transaction for a first coherency unit by sending an RTO request on the address network of requesting node 140R. The RTO request is conveyed to an interface 148R. Interface 148R sends a coherency message, Home RTO, indicative of the request to interface 148H in home node 140H.

In response to the Home RTO coherency message, interface 148H locks the coherency unit and sends a speculative PRTO on the address network of the home node 140H (e.g., in response to a miss in a gTag cache). In this embodiment, packets specifying the requested coherency unit are transmitted in PTP mode in the home node, so the home node's address network conveys the PRTO to the home memory subsystem M. In response to receiving the PRTO, the memory subsystem M determines that the PRTO is incorrect given the current gTag (gM) of the requested coherency unit within home node 140H. Instead of (or, in some embodiments, in addition to) returning data and the current gTag to the interface 148H, memory subsystem M sends a corrected PRTOM packet to the owning device D2 as well as to the interface 148H and updates the gTag to indicate that the new gTag is gI. Memory subsystem M may also send INV requests to any sharing devices (not shown) and to interface 148H. Note that if any RNY packets are sent, interface 148H may be sent a WAIT packet instead of a PRTOM. In response to receipt of the PRTOM, the owning device D2 loses ownership of the requested coherency unit and (at a subsequent time) sends a copy of the requested coherency unit to interface 148H. D2 loses access to the requested coherency unit upon sending the DATA packet containing the requested coherency unit.

In response to receiving the PRTOM and the DATA packet, the interface 148H may send a Data coherency message containing the requested coherency unit to the requesting node. In response, interface 148R in the requesting node 140R may send a DATA packet containing the coherency unit to D1, allowing D1 to gain write access to the coherency unit. Interface 148R may send an Acknowledgment coherency message to the home interface 148H, allowing the home interface 148H to release a lock on the coherency unit.

Some embodiments of a memory subsystem may only correct speculative subtransactions involving PTP mode coherency units. For example, if a memory subsystem is configured to resend a correct type of address packet for a BC mode coherency unit, the memory subsystem will be required to respond to a packet received on a Broadcast Network by sending a second address packet on the Broadcast Network. Such a situation may lead to deadlock. Thus in some embodiments, memory subsystems may be configured to correct speculative transactions when doing so involves sending a packet on a different virtual network (e.g., the Response Network) than the one on which the initial packet is received (e.g., the Request Network).

Transaction to Allow an Interface to Read Shared Data from Memory

As the above discussion shows, certain situations may arise where an interface needs to read data from memory but the memory is not the current owner of the data. In one embodiment, a special packet encoding may be used to access shared data in memory. Memory subsystems may be configured to respond to this type of packet encoding with a copy of the specified coherency unit, regardless of the memory's current ownership and/or access rights for that coherency unit. In some embodiments, memory subsystems may also be configured to respond to that type of packet with global information (e.g., the global access state, the node ID of gM node, and an indication of whether any nodes may have shared copies) for the coherency unit. In one embodiment, the packet encoding may be a PMR (Proxy Memory Read) encoding described above with respect to FIG. 23. In many embodiments, a packet used to read shared data from memory may have no effect on any active device's access rights and ownership responsibilities for the specified coherency unit. The packet used to read shared data from memory may also have no effect on the current gTag for the specified coherency unit within the node.

In one embodiment, packet headers may be simplified by using the same packet encoding used to read shared data from memory (PMR) as a proxy read-to-share (PRTS) packet in nodes that do not have an ownership responsibility associated with the requested coherency unit (e.g., non-gm nodes). However, in such embodiments, it may not be possible for a memory subsystem to correct a speculative PRTS (e.g., when the gTag of the node is actually gM) if the same packet encoding is used for both PRTS and PMR, since the memory subsystem may be unable to determine which function a given packet is serving.

Transactions Allowing Interface to Access Coherence State Information

An interface may use special transactions (e.g., PMR and PMW in one embodiment) to access (i.e., read and/or write) global information such as the gTag and the node ID of the current gM node for a given coherency unit within an LPA memory subsystem. These transactions may be ignored by other client devices (i.e., non-home memory subsystem and non-interface devices). In other words, the special transactions used to access global information may not affect any client device's ownership responsibilities for and/or access rights to any coherency unit. Furthermore, a memory subsystem may be configured to always respond (e.g., by modifying a specified coherency unit's gTag and/or providing an interface with a copy of a specified coherency unit's gTag) to address packets requesting to read or write global information, regardless of whether that memory subsystem is currently the owner of the specified coherency unit. Note that while the exemplary PMR and PMW packets described above may be used to read and write both global information and coherency units, other embodiments may use different packet encodings to allow interfaces to read and write global information than are used to read and write coherency units.

Address Packets Specifying Node ID of Initiating Node

In order to keep the memory's global information from becoming stale, an interface within a home node may encode the node ID of a requesting node in invalidating address packets (e.g., PI, PIM, PRTO, PRTOM packets) that invalidate all shared copies within the home node. Upon receipt of such an address packet, the home memory subsystem may update the gTag for the specified coherency unit to equal gI and update the node ID of the gM node to equal the node ID of the requesting node.

For example, returning to FIG. 25, when interface 148H in home node 140H receives the RTO communication from requesting node 140R, interface 148H may encode the node ID of requesting node 140R into a PRTOM packet and send that packet upon the home node's address network. Upon receipt of the PRTOM, the home memory subsystem may update the global information for the requested coherency unit to indicate that the home node is now gI and that the node ID of the gM node is the node ID indicated in the PRTOM packet (i.e., requesting node 140R's node ID). Note that the interface 148H may also update global information cached by the interface (e.g., in global information cache 850) in response to sending an invalidating packet (or in response to receiving a coherency message that causes the interface to send such an invalidating packet). For example, the interface 148H may update a gTag and the node ID of the gM node for a coherency unit upon sending an invalidating packet specifying that coherency unit.

Tracking Ownership Responsibility within a Multi-Node System

Various devices may maintain state information indicating which devices and/or nodes have ownership responsibilities associated with certain coherency units. By maintaining this information, certain aspects of a multi-node computer system may be simplified. For example, it may be unnecessary to have an owned line (a signal indicating whether not here exists an active device with an ownership responsibility for the requested coherency unit) for performing BC mode transactions. Owned lines are typically used in BC mode systems to indicate whether a memory subsystem should provide data in response to a coherence request. For example, in response to an address packet requesting an access right to a coherency unit, an owning active device may assert an owned line, indicating that a memory subsystem should not respond with data corresponding to the requested coherency unit. If the memory subsystem maintains certain state information and response bits, owned lines may not be necessary to determine when the memory subsystem should provide data in response to a coherence request.

In some embodiments, a memory subsystem 144 may maintain response information (e.g., in a directory 220 or similar structure or in storage 225) for each coherency unit that maps to the memory subsystem. The response information may indicate whether the memory subsystem is responsible for providing data in response to address packets requesting access rights to each coherency unit that maps to the memory subsystem. For example, if the memory subsystem is currently the owner of a particular coherency unit, the memory's response information for that coherency unit may indicate that the memory should respond to address packets requesting access rights to that coherency unit. If an active device requests write access to and ownership responsibility for the coherency unit by initiating an RTO, the memory's response information may be updated to indicate that the memory is not responsible for providing data to requesting devices (since the device requesting write access will become the owner of the coherency unit). Note that with respect to response information, a response is a response that provides data corresponding to a requested coherency unit (e.g., a REP, DATA, and/or an ACK packet). A memory subsystem may perform other actions (e.g., updating response and/or directory information) in response to an address packet requesting an access right to a coherency unit even if the response information for the requested coherency unit indicates that the memory should not respond to requests for that coherency unit.

In one embodiment, a single bit of response information may be maintained. For example, if a memory subsystem maintains a single bit of response information in addition to the gTag for each coherency unit, the memory subsystem may use the current response information and the gTag to determine whether to respond to an address packet by sending a copy of the coherency unit and whether to send a REP data packet corresponding to the request to an interface.

FIG. 35 shows an example of the response information and gTag that may be maintained for each coherence unit by one embodiment of a memory subsystem. In this embodiment, the memory subsystem maintains two response states: Yes (indicating that the memory subsystem should respond with data corresponding to the requested coherency unit) and No (indicating that the memory subsystem should not respond with data corresponding to the requested coherency unit). This embodiment of a memory subsystem also maintains gTags. The memory subsystem may use the response information and the gTags when determining how to respond.

As shown in FIG. 35, if an address packet is received requesting an access right to a coherency unit for which the memory subsystem's current response is No and the current gTag is gM, the memory subsystem is configured to allow the owning device within the node to respond. If the address packet requesting the access right is being conveyed in BC mode, the memory subsystem does not need to do anything. If the address packet requesting the access right is being conveyed in PTP mode, the memory subsystem may forward a response packet to the owning device.

If an address packet is received requesting an access right to a coherency unit for which the response information is No and the current gTag is gI, the memory subsystem may be configured to forward the request to an interface (e.g., in the form of a REP packet in some embodiments). When the current gTag is gS, the response information is No, and an address packet requesting write access is requested, the memory subsystem may forward the request to an interface (e.g., as a REP packet). If the current gTag is gS, the response information is No, and an address packet requesting read access is requested, the memory subsystem may allow the transaction to complete internally to the node.

If the requested coherency unit's response information is Yes, the memory subsystem is the owner of the requested coherency unit (and thus the gTag for that coherency unit is gM), and the memory subsystem is configured to respond to the address packet by providing data corresponding to the requested coherency unit to the requesting device. In response to each request, the memory may be configured to update the response information accordingly (e.g., if the response information is Yes and a local RTO request is received, the memory subsystem may update the response information to No). Note that in order to guarantee that the memory subsystem's response information is correct, an active device with ownership of and shared access to a coherency unit may not be allowed to silently upgrade to write access to that coherency unit.

The home node for each coherency unit may also track which node, if any is currently the gM node for that coherency unit. In some embodiments, the home memory subsystem 144 in the home node may track the gM node. This information may also be cached by an interface 148 in the home node. For example, the home agent 804 in each interface 148 may operate to track the identity of the gM node for home coherency units in a global information cache 850. Whenever a transaction causes the identity of the gM node for a particular coherency unit to change, the home agent 804 in the coherency unit's home node may update the node ID of the gM node to identify the new gM node. The home agent may also send an address packet (e.g., PMW) to the home memory subsystem 144 to update the memory's identifier of the gM node.

Looking at FIG. 20, assume processing subsystem 142AC has write access to a coherency unit whose home node is node 140A. The coherency unit is not LPA in node 140C (i.e., the coherency unit is not mapped by either memory subsystem 144CA and 144CB in node 140C). The interface 148A in the home node 140A may store global information for the coherency unit indicating that node 140C is the gm node in its global information cache 850. If processing subsystem 142BC in node 140C requests write access to the coherency unit by sending an RTO packet on the address network 150C, the RTO request may be forwarded by interface 148C to the interface 148A in the home node 140A. The home agent 804 in the interface 148A may access the global information cache 850 and determine that the requesting node 140C is the gM node for the coherency unit. Since the requesting node 140C is the gM node, the home agent 804 may not initiate any subtransactions for the coherency unit within the home node 140C or send any communication messages to other nodes. The home agent 804 in interface 148A may return a NACK coherency message to the interface 148C in the requesting node 140C, indicating that an owning device (processing subsystem 142AC) within the requesting node will satisfy the coherency transaction. The interface 1148C may responsively remove a record corresponding to the transaction from its outstanding transaction queue 814, ending its participation in the RTO transaction. The processing subsystem 142AC may supply requesting processing subsystem 142BC with a DATA packet in response to the RTO packet, satisfying the RTO transaction.

In other situations, the requesting node 140C may not be the gM node. For example, when processing subsystem 142BC sends the RTO packet on the address network 150C, processing subsystem 142AB may have ownership and write access to the coherency unit, and thus node 140B may be the gM node. When the RTO is forwarded to the interface 148A in the coherency unit's home node, the interface 148A may access its global information cache 850 to determine that the gM node is node 140B and responsively send a coherency message indicating the RTO request to the slave agent in interface 148B. When the RTO is satisfied in node 140C, interface 148A may also update its global information cache to indicate that node 140C is the new gm node for the coherency unit and send a PMW packet to the home memory subsystem for the coherency unit to update the node ID of the gM node in the home memory subsystem. In response to the coherency message indicating the RTO request from interface 148A, interface 148B may send a PRTOM on the address network 150B to remove ownership of the coherency unit from processing subsystem 142AB and to cause processing subsystem 142AB to forward a DATA packet containing the coherency unit to interface 148B. Interface 148B may then send the coherency unit to interface 148C for conveyance to processing subsystem 142BC to satisfy the RTO transaction.

In yet other situations, there may not be a gM node when an RTO transaction is initiated. In situations where the global information cache indicates that there is no gM node, the interface 148A may send appropriate packets and/or coherency message to cause a non-owning device (e.g., a home memory subsystem for the specified coherency unit) to provide data in response to the RTO. For example, nodes 140A and 140B may both be gS nodes when processing subsystem 142AC sends an RTO packet on address network 150C. Node 140C may be a gI node for the coherency unit when the RTO packet is sent. As in the above examples, interface 148C may forward a coherency message indicating the RTO to the interface 148A in the home node. In response to the coherency message, the interface 148A may access its global information cache and determine that there is no gM node for the specified coherency unit. Thus, even if the coherency message indicating the RTO was broadcast to all of the nodes 140 in the system 100, and even if each node's interface 148 sent an address packet indicating the RTO on that node's address network 150, no device would respond to the RTO. However, the interface 148A may ensure that a home memory subsystem in the home node 140A (or in the requesting node 140C if the requesting node is an LPA and gS node) provides a copy of the coherency unit in response to the RTO by sending an appropriate packet on the address network 150A and/or coherency message on the inter-node network 154. In this example, the interface 148A may send a PRTO packet on the address network 150A to cause the home memory subsystem in node 140A to respond with a DATA packet. If the requesting node 140C had been an LPA gS node, the interface 148A may send a coherency message to interface 148C indicating that interface 148C should send an address packet (e.g., a PU packet) to cause the home memory subsystem in node 140C to supply the data for the RTO.

As the above examples show, owned lines between nodes in a multi-node system may not be needed if the home node for each coherency unit tracks the identity of the gM node (if any). For example, if the requesting node is the gM node, the home node uses the gM node ID to notify the requesting node that another node will not supply the data for an outstanding transaction (i.e., indicating that the transaction can complete internally to the requesting node). When the requesting node is not the gM node, the interface in the home node may use the cached node ID of the gM node to determine which node contains a device that will respond to the RTO and forward the RTO request to that node. Additionally, since transactions that involve multiple nodes are routed through the coherency unit's home node, the interface 148 in the home node is able to identify transactions that the identity of the gM node to change and to responsively update the node ID of the gM node in the global information cache 850.

Deriving Global Access State from Memory Response Information

Instead of maintaining both memory response information and global access state information, some embodiments of a multi-node computer system 100 may include memory subsystems 144 that do not maintain global access state information. Interfaces 148 may use the values of the memory subsystem's response information before and after receipt of a particular address packet to derive the global access state of the node with respect to a coherency unit specified in the address packet. By having each interface 148 derive global access state information from a memory subsystem's response information, the number of status bits maintained for each coherency unit in memory subsystems 144 may be reduced.

In one embodiment, a memory subsystem may maintain two bits of response information per coherency unit. FIG. 36 shows four exemplary response states that may be defined: mR, mN, mS, and mI. The response states may be defined so that the memory subsystem may determine how to respond based solely on the response information in one embodiment. Note that other embodiments may also use the gTags when deciding how to respond, however. These states may take pending transactions into account, so that if a currently pending transaction will perform inter-node coherency activity needed for a later transaction, the later transaction is not forwarded to an interface.

In this embodiment, the memory does not respond to requests for coherency units whose response information is niN (No Response) because this state indicates that an active device within the node is the current owner of the requested coherency unit. If the request is conveyed in PTP mode, the memory subsystem may forward the request to the owning active device. A memory subsystem may update its response information for a coherency unit to mN each time an RTO request for that coherency unit is received from an active device within a node, even if satisfying the RTO involves communicating with another node. If a later transaction for an access right to that coherency unit is initiated within the node before the RTO is completed (i.e., before the gTag of the node is Modified), the memory subsystem may, based on the response information being mN, allow the device that initiated the RTO to respond to the later transaction (e.g., the device that initiated the RTO may subsequently provide the device that initiated the later transaction with a data packet corresponding to the coherency unit) instead of forwarding the later transaction to an interface. Thus, when the gTag for a coherency unit has a value other than Modified, response state mN indicates that any inter-node coherency activity needed to satisfy a transaction for an access right to the coherency unit will be performed by a currently pending transaction.

If the requested coherency unit's response information is mR (Response), it indicates that the memory is the owner and that the memory should respond with data corresponding to the requested coherency unit. A memory subsystem may update its response information for a coherency unit to mR in response to transactions that transfer ownership of the coherency unit from an active device to the memory subsystem (e.g., WS, RTWB, and WB).

In response to requests specifying coherency units whose response information is mS (Shared), the memory subsystem may respond to requests for shared access (e.g., RTS, RS). However, since devices in other nodes may have shared copies, the memory subsystem cannot respond to requests for write access (e.g., RTO, WS, and RTWB) since shared copies in other nodes may need to be invalidated before write access is appropriate within the node. A memory subsystem may update its response information to mS in response to remote transactions that demote the gTag for a coherency unit from gM to gS (e.g., PRTSM) or in response to transactions initiated within the node that upgrade the gTag from gI to gS (e.g., an RTS that cannot be completed within the node).

If the response information for a coherency unit is mI (Invalid), the memory subsystem forwards all coherence requests for that coherency unit to an appropriate interface. The memory subsystem may set its response information for a coherency unit to mI in response to proxy packets identifying remote invalidating requests (e.g., PRTO, PRTOM, PI, PIM) for that coherency unit.

Generally, assuming no outstanding transactions for a coherency unit, if the response information for that coherency unit in a particular node is niN or mR, the node is the gM node for that coherency unit. Similarly, if the coherency unit's response information is mS, the node is a gS node, and if the coherency unit's response information is mI, the node is a gI node for that coherency unit. Whenever a coherency unit is involved in an outstanding transaction, however, the coherency unit's response information may not provide a correct indication of its current gTag. For example, if an RTO initiated within a gS LPA node is still outstanding, the response information for the requested coherency unit in the home memory subsystem in that node may be mN, even though the gTag of that coherency unit is still gS.

Whenever a memory subsystem 144 forwards a REP packet corresponding to an RTO to an interface 148, the memory subsystem may include the mTag of the coherency unit in the REP packet. For example, if the memory subsystem's current mTag for a coherency unit is mI when an RTO is received, the memory subsystem may update its mTag to inN. The memory subsystem may forward a REP packet to the interface indicating the RTO and that the prior mTag was mI and the subsequent mTag is mN. The interface may be configured to determine the current gTag of the coherency unit from the mTags and the records contained in the interface's outstanding transaction queue 814. The interface may use the current gTag when determining what type of proxy packet to send on the address network when initiating sub-transactions (if the home node has not provided such an indication in the coherency message requesting the subtransaction) and/or when determining whether a locally-initiated transaction can be satisfied locally or whether the interface needs to send a coherency message to the home node as part of the transaction. If the memory subsystem has forwarded a REP packet for an RTO for a particular coherency unit and the memory subsystem updates the mTag for that coherency unit (e.g., in response to a WB or other address packet that causes a change in mTag value), the memory subsystem may forward a new REP packet indicating that the "new" mTag value stored with the record corresponding to the RTO should be updated to reflect the update at the memory subsystem. The interface may responsively update its record corresponding to the RTO in the outstanding transaction queue.

Write Back Transactions within a Multi-Node System

An active device may perform a WB (Write Back) transaction for a coherency unit that is not LPA in the active device's node (i.e., no memory in that node maps that coherency unit). In order for an active device to be able to initiate a WB transaction, that active device has to have ownership of the specified coherency unit. In order for that active device to have gained ownership of the coherency unit, the node containing the active device must be the gM node for that coherency unit. However, the owning device within the node loses ownership of the coherency unit upon receipt of its own WB address packet, which is transmitted in broadcast mode by the address network in a non-LPA node. Additionally, in a non-LPA node, there is no memory subsystem to gain ownership of the coherency unit during the WB transaction. Thus, during a WB transaction, a gM node that is not an LPA node for the specified coherency unit will not contain an owning device, even though the node will still be the gM node for that coherency unit until the WB transaction completes. This may cause problems if, for example, a slave agent 806 in an interface 148 within the gM node initiates a PRTOM, PRTS, PRSM, or PIM subtransaction for that coherency unit. When the active device receives the PRTOM, PRTS, PRSM, or PIM, the active device may no longer have an ownership responsibility (e.g., if it has already received its own WB address packet from the address network). As a result, the active device may not respond to the subtransaction and there may not be an active device within the node that will provide the slave agent 806 in the interface 148 with a data packet in response to the PRTOM, PRTS, PRSM, or PIM.

In order to avoid situations where there is no active device to respond to a gM-type proxy request from an interface 148, a slave agent 806 in an interface 148 in a non-LPA gM node may be configured to respond to requests for a given coherency unit when there is currently no owning active device within that node 140. For example, as part of each subtransaction that requires a response, a slave agent 806 in an interface 148 may search through the outstanding transaction queue 814 in order to determine whether an owning device within the node will respond to the interface's proxy request. If there is no owning device, the slave agent 806 in the interface 148 may behave as if the interface 148 is the owner of the requested coherency unit by responding to the proxy request with data. For example, in some embodiments, an interface 148 within a node that is gM and non-LPA for a particular coherency unit may behave like an owning active device if there is a pending WB transaction in order to satisfy outstanding requests for access to the coherency unit identified in the WB transaction.

Some embodiments of an interface 148 may use the outstanding transaction queue 814 as a promise array-type structure in order to track outstanding requests for particular coherency units for which the interface may have an ownership-like responsibility. As described above, the outstanding transaction queue may store records corresponding to requests for coherency units that are not LPA within the node and records corresponding to requests for LPA coherency units that a memory has identified as needing the intervention of interface 148 in order to be satisfied (e.g., based on global access state and/or response information maintained by a home memory subsystem within that node). Each time slave agent 806 sends certain types of proxy request packets, the slave agent 806 may search the outstanding transaction queue 814 for outstanding transactions that the interface 148 may be responsible for responding to and, if any such outstanding transactions are found, send appropriate data packets on the data network. Thus, the interface 148 may send data packets in response to records in the outstanding transaction queue 814 similarly to an active device sending data packets in response to promises in promise array 904.

Figure 37:
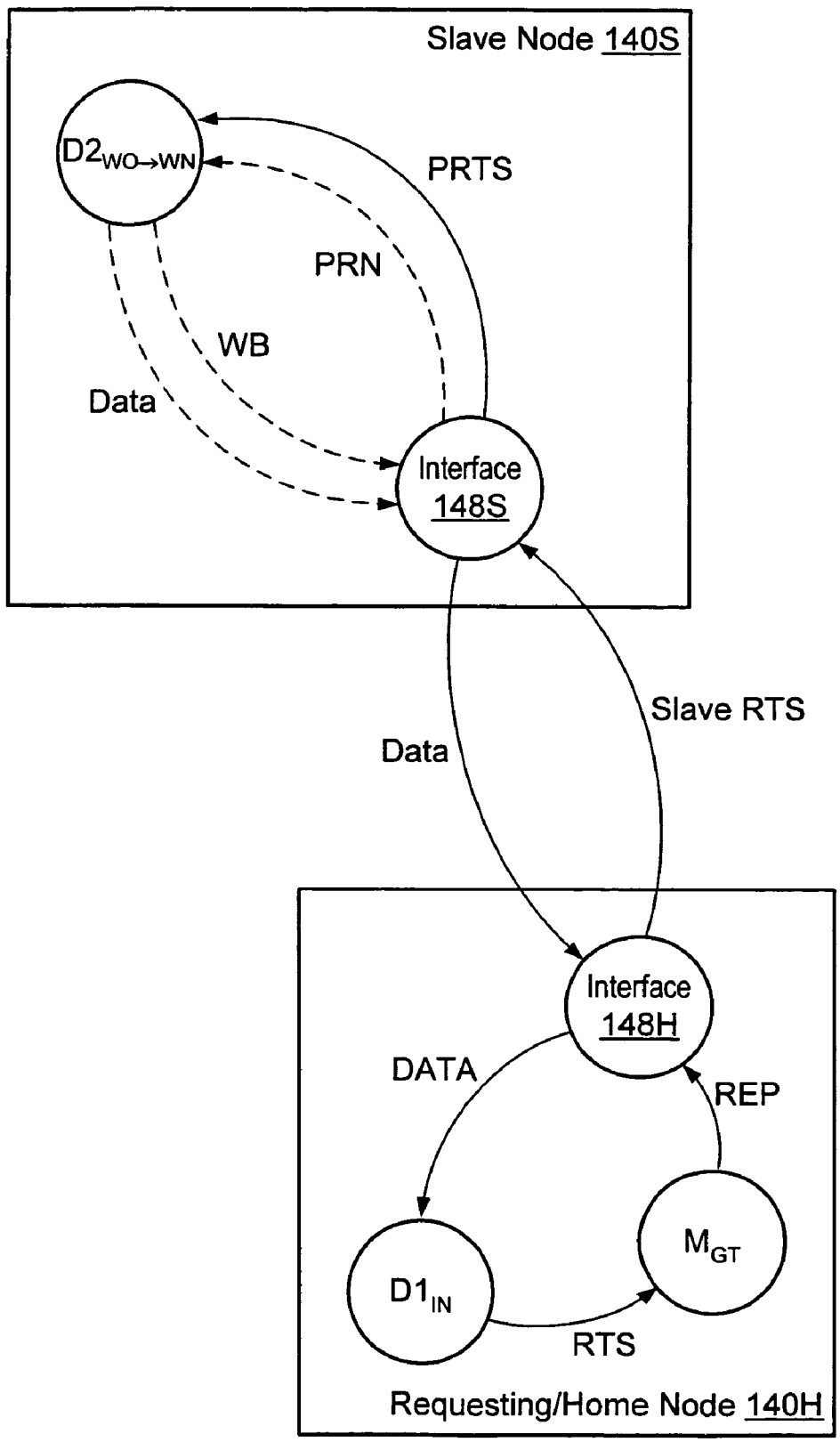
FIG. 37 illustrates an exemplary RTS transaction in a multi-node system in which a WB transaction for the same coherency unit is pending in the gM node, according to one embodiment.

FIG. 37 shows how a WB transaction may be handled in one embodiment of a multi-node computer system. In this embodiment, a multi-node computer system includes a requesting node 140H in which a device D1 is requesting read access to a coherency unit. In this example, the requesting node 140H is also the home node for the requested coherency unit (note that requests for a given coherency unit may also be initiated in non-home nodes, as shown above). The requesting device D1 initiates a RTS transaction by sending a RTS address packet on the address network. The address network conveys the RTS (in BC or PTP mode) to the home memory subsystem M for the requested coherency unit. In response to determining that another node is the gM node for the requested coherency unit (e.g., as indicated by the response information and/or gTag associated with the coherency unit), the home memory subsystem M forwards the request (e.g., in the form of a REP packet) to the interface 148H that communicates with the node 140S that has the ownership responsibility. The interface 148H may add a record corresponding to the REP packet to its outstanding transaction queue.

When the interface 148H in the home node handles the record corresponding to the RTS, the request agent in interface 148H sends a Home RTS coherency message (not shown) to the home agent in interface 148H. The home agent may lock the coherency unit, access its global information cache to determine the node ID of the gM node 140S for the coherency unit, and responsively send a Slave RTS to the gM node 140S.

Slave node 140S is not an LPA node for the specified coherency unit. At some time prior to interface 148S's receipt of the Slave RTS coherency message, a device D2 may have initiated a WB transaction for the same coherency unit (address and data packet transfers that are part of the WB transaction are shown in dashed lines). Since the WB involves a non-LPA coherency unit, a record corresponding to the WB transaction may be stored in interface 148S's outstanding transaction queue. Interface 140S has not begun handling the WB transaction when interface 140S begins handling the Slave RTS coherency message. However, the address network may have already returned the WB address packet to the device D2 that initiated the WB, causing D2 to lose ownership of the specified coherency unit.

In response to receipt of the Slave RTS coherency message from node 140H, interface 148S may send a PRTSM on the address network in slave node 140S. While handling the Slave RTS subtransaction, interface 148S may examine the records in its outstanding transaction queue (or in a similar promise-array type structure) to see if any of the records specify the coherency unit being requested in the outstanding transaction queue. In response to seeing the record corresponding to the WB transaction, the interface 148S determines that no active device within node 140S may respond to the PRTSM and that the interface may need to handle the WB in order to satisfy the PRTSM. The interface sends a PRN data packet to device D2 in order to complete the WB. In some situations, D2's response to the PRN may be a NACK packet (indicating that D2 no longer has ownership of the specified coherency unit), and the interface may assume that D2 lost ownership as part of an transaction for write access initiated by another device in the node before D2 received its own WB packet (i.e., assuming there are no more WB's in the outstanding transaction queue, a NACK response indicates that another device within the node owns the coherency unit and will respond to the PRTSM). However, in this example, device D2 responds to the PRN by sending a DATA packet containing D2's copy of the specified coherency unit and giving up its access right to the coherency unit.

In response to receiving the DATA packet, interface 148S may behave like an owning active device with respect to the specified coherency unit. Interface 148S may continue examining records specifying the coherency unit in its outstanding transaction queue until it sees the record corresponding to the PRTSM. If any records in the outstanding transaction queue specify the requested coherency unit, interface 148S may respond to those records by sending data packets in the same manner that an active device would. For example, if the interface sees a record corresponding to a RTS transaction initiated within node 140S for that coherency unit, interface 148S may send a DATA packet to the requesting device. If the interface sees a record corresponding to a RTO transaction, the interface may respond with a DATA packet. Additionally, if the interface sees a record corresponding to an RTO transaction before it sees the record corresponding to the PRTSM, the interface may determine that the device that initiated the RTO will respond to the PRTSM (e.g., because the device that initiated the RTO stored information corresponding to the PRTSM in its promise array), assuming no other non-NACKed WBs are found in the outstanding transaction queue.

Once the interface has searched its outstanding transaction queue for records identifying the coherency unit requested in the RTS transaction initiated by D1, the interface may determine how to respond to D1's RTS. If, as in the example of FIG. 37, the interface discovers a non-NACKed WB and no intervening RTOs, the interface may respond to the Slave RTS coherency message by sending a Data coherency message containing the data received from device D2. In response to receiving the Data coherency message, the interface 148H in the home node may supply a DATA packet to the initiating device D1. Upon sending the DATA packet, the request agent in the interface 148H may send an Acknowledgment coherency message (not shown) to the home agent in interface 148H so that the home agent releases the lock on the coherency unit.

Figure 37A:
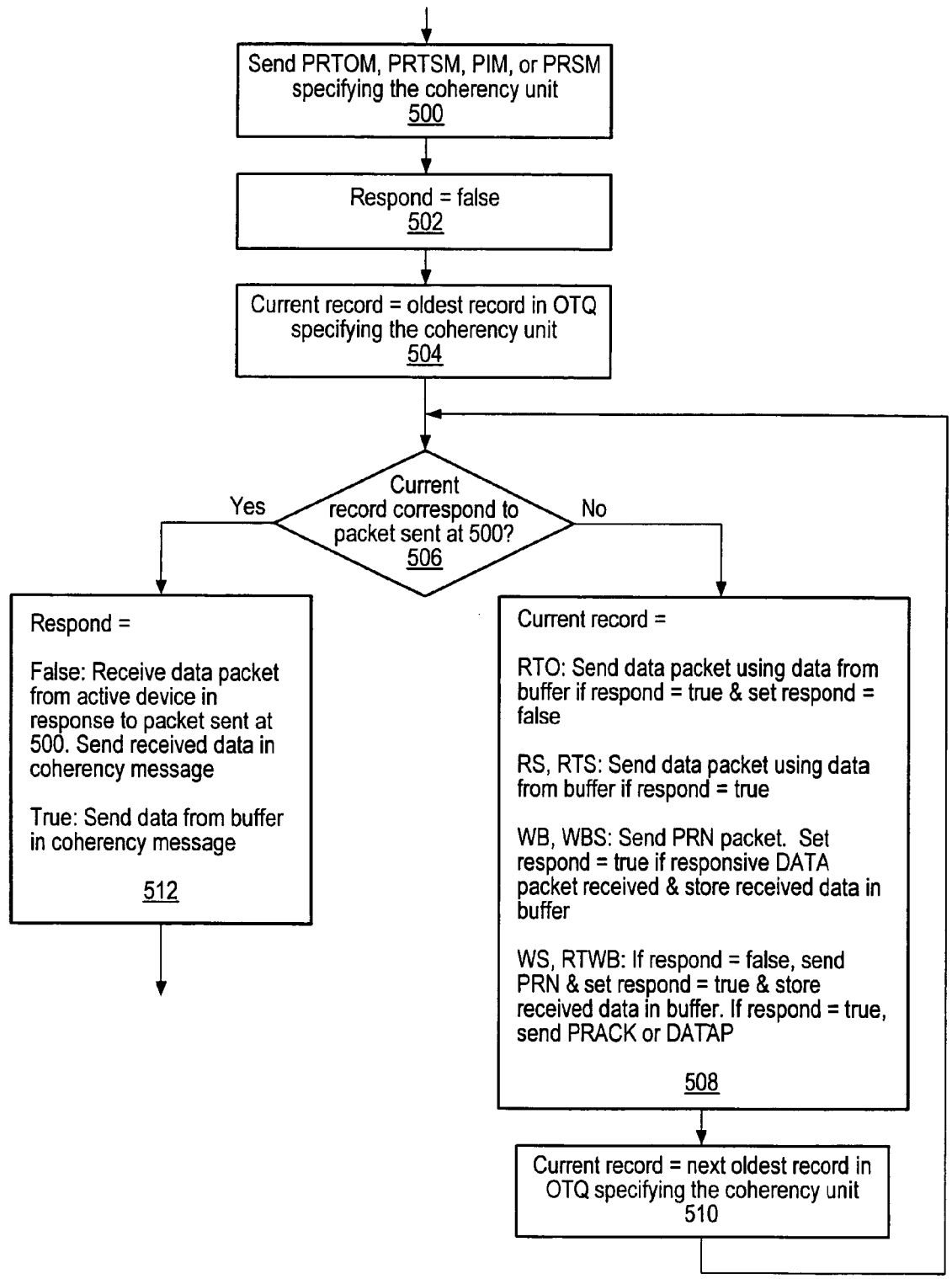
FIG. 37A shows a method an interface in a gM node may implement to respond to requests for a coherency unit when there is no owning device in the node, according to one embodiment.

FIG. 37A shows one embodiment of a method an interface may use to handle situations where there is no owning device in a gM non-LPA node. In this embodiment, the interface maintains an outstanding transaction queue that may be used as a promise array when there is no owning device and the interface's node is gM. The interface adds records to the outstanding transaction queue in response to determining that interface intervention may be needed for certain transactions. As described above, records may be added for each address packet that specifies a non-LPA coherency unit and for each REP address packet received from a memory subsystem.

As part of handling certain transactions, the slave agent in the interface goes through its outstanding transaction queue. For example, as shown at 500, the interface may send a PRTOM, PRTSM, PIM, or PRSM to initiate a subtransaction when the node that includes the interface is the gM node for the specified coherency unit. Each of these packets causes an active device with an ownership responsibility for the coherency unit, if any, to respond with a data packet on the data network.

The interface may maintain a response state (true or false) for each subtransaction indicating whether the interface is responsible for responding to requests for the coherency unit with a data packet on the data network. Initially, this response state ("respond") may be set to false, as indicated at 502, indicating that an owning device exists within the node. If a record is encountered that indicates that there is no longer an owning device within the gM node, the response state information may be updated to true, indicating that the interface should respond to outstanding requests for the coherency unit.

The interface may begin going through its outstanding transaction queue (OTQ), searching for records that specify the same coherency unit as the proxy packet sent at 500, beginning with the oldest record (e.g., the first record in a FIFO outstanding transaction queue) and continuing until the record corresponding to the proxy packet sent at 500, as indicated at 504 and 506. As shown at 508, the interface may handle the current record differently depending on the current value of its response state information and the type of transaction to which the current record corresponds. If the current record specifies an RTO and the interface has a duty to respond as an owning device to transactions specifying the coherency unit (as indicated by respond being set to true), the interface may send a data packet corresponding to the coherency unit on the data network and transition respond to false, since the active device initiating the RTO will gain ownership of the coherency unit upon receiving its own RTO packet. The interface may then remove the record from the outstanding transaction queue since no inter-node activity is needed to complete the RTO transaction. If the record specifies an RTO and respond is set to false, the interface may leave the record in the outstanding transaction queue and send a coherency message indicating the RTO to the coherency unit's home node when that record is subsequently handled by the interface's request agent.

If the current record corresponds to an RS or RTS request for shared access to the coherency unit, the interface may send a data packet corresponding to the coherency unit if the current response state information is set to true. The interface may then remove the record from the outstanding transaction queue. If the interface's response state information is false, the interface may leave the record in the outstanding transaction queue for subsequent handling by the request agent.

If the current record corresponds to a WB or WBS, the interface may send a PRN packet on the address network. If the interface receives a DATA packet in response to the PRN, the interface may buffer the coherency unit received in the DATA packet for use in responding to other requests and set the value of its response state information to true. If the PRN is NACKed, the interface may not buffer any data or set its response information to true, since the received NACK data packet may indicate that another device within the node gained ownership of the coherency unit before completion of the WB or WBS. Once the DATA or NACK packet is received, the interface may remove the current record from the outstanding transaction queue.

If the current record corresponds to a WS or RTWB and the interface's response state information is currently set to false, the interface may transition its response state information to true and send a PRN data packet. The interface may responsively receive a DATA packet containing an updated copy of the coherency unit from the device performing the WS or RTWB. The interface may store the coherency unit in a buffer for use in responding to other requests. The interface may then remove the current record from the outstanding transaction queue.

If the current record corresponds to a WS or RTWB and the response state information is currently set to true, the interface may send a PRACK data packet if the record corresponds to a WS or a DATAP data packet if the record corresponds to a RTWB. The DATAP data packet may contain a copy of the coherency unit retrieved from a buffer in the interface (e.g., the coherency unit may be stored in the buffer in response to receiving a DATA packet as part of a WB, WBS, WS, or RTWB, as described above). The interface may then remove the current record from the outstanding transaction queue.

If the current record does not correspond to one of the types of transactions listed above, the interface may not perform any actions or update its response state information. Once the current record is examined and, if necessary, responded to, the interface may search for the next oldest record in the outstanding transaction queue specifying the coherency unit, as indicated at 510.

Once all of the records specifying the coherency unit between the oldest record and the record corresponding to the packet sent at 500 have been examined, the interface may, at 512, determine whether any active device will respond to the proxy packet sent at 500 and send a coherency message to the home or requesting. If the interface's response state information is false, the interface expects an active device to return a data packet in response to the proxy packet. Upon receipt of that data packet, the interface may send a coherency message containing the data on the inter-node network to the requesting node that initiated the transaction of which the subtransaction initiated at 500 is a part. If the interface's response state information is true, the interface may determine that no active device will send a data packet in response to the proxy packet sent at 500. Accordingly, the interface may include the buffered data (e.g., buffered in response to a WB, WBS, WS, or RTWB as described above) in a coherency message sent to the requesting node.

Write Stream Transactions within a Multi-Node System

In a single node system, the home memory subsystem takes ownership of the coherency unit during a WS transaction involving that coherency unit (e.g., in response to receiving the WS address packet). As part of a WS transaction in a single node system, the home memory subsystem typically sends a PRN and, if the memory is the prior owner of the coherency unit, an ACK representing the coherency unit to the initiating device. However, in a multi-node system, performance of WS transactions in an LPA node may be complicated because the node may be gI or gS, which may prevent the home memory subsystem from sending the ACK data packet that represents the coherency unit to the active device that initiates the WS until the node becomes the gM node. Additionally, the memory subsystem may lack a promise array type structure to track its duty to send such an ACK once the node becomes the gM node.

In some embodiments, a memory subsystem 144 in a node that is gS or gI and LPA for the specified coherency unit may handle a WS transaction by forwarding a WS request (e.g., in the form of a REP packet) to an interface 148 and updating the memory subsystem's response information to indicate that the memory should not respond to requests for that coherency unit. The interface 148 may then initiate the inter-node activity needed to invalidate shared copies in other nodes, get an ACK from the owner in another node (or from the home node if there is no gM node) and, once other shared/owned copies of the coherency unit are invalidated, send an ACK and a PRN (e.g., as a combined PRACK data packet) to the initiating device within the node. The interface may use its outstanding transaction queue 814 to track the interface's responsibility to send the ACK and PRN to the initiating device.

Figure 38:
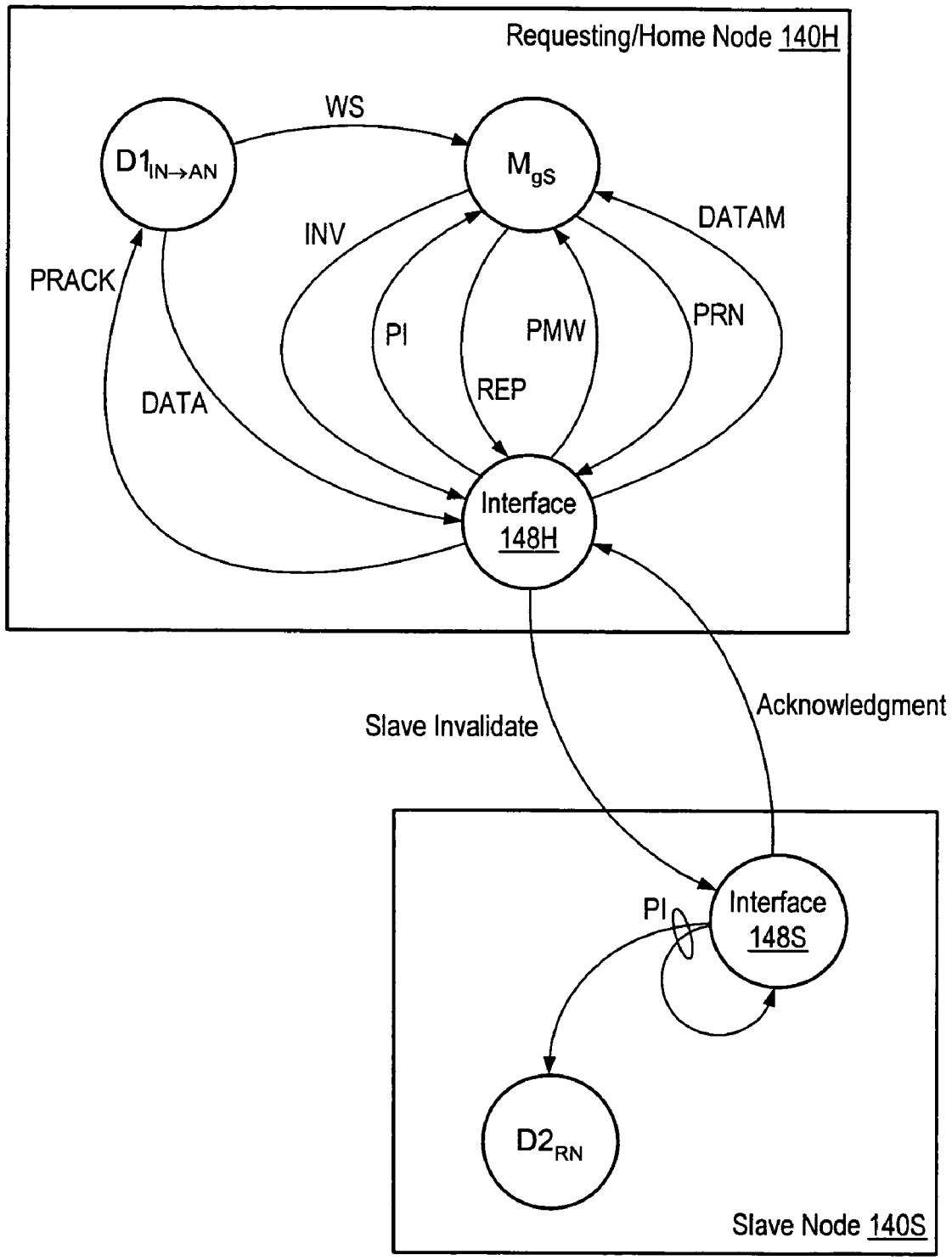
FIG. 38 illustrates an exemplary WS transaction, according to one embodiment.

FIG. 38 shows how a WS transaction for a coherency unit may be implemented in one embodiment. In the illustrated example, a multi-node system includes requesting node 140H, which is also the home node for the coherency unit involved in the WS transaction, and a slave node 140S, which is a gS node for the coherency unit when the WS transaction is initiated. Home node 140H includes an active device D1, a home memory subsystem M, and an interface 148H. Slave node 140S includes an active device D2, which initially has read access to and no ownership responsibility for the coherency unit, and an interface 148S.

Device D1 in the home node 140H initially has neither access to nor ownership of the coherency unit. D1 initiates a WS transaction to gain A, All Write, access to the coherency unit by sending a WS address packet on the address network. In this embodiment, D1 uses the same type of address packet to initiate the WS as D1 would use in a single node system. In this example, the address network in the home node 140H conveys the WS packet in point-to-point mode to the home memory subsystem M for the coherency unit. In response to node 140H being a gS node for the coherency unit, the memory subsystem forwards a REP packet corresponding to the WS to the interface 148H and updates the its response information to a no response state (e.g., to No if two response states are maintained or, if four response states are maintained, to mI). By updating the response information, the memory subsystem M will cause itself to forward a REP packet corresponding to certain types of subsequently received non-proxy address packet specifying that coherency unit to the interface 148H.

In response to the REP packet, interface 148H adds a record corresponding to the WS to its outstanding transaction queue. When interface 148H handles the record, a request agent in interface 148H may forward a Home WS coherency message (not shown, since no coherency message may be sent on the inter-node network) to the home agent in interface 148H. The home agent may lock the coherency unit and begin handling the Home WS request. The home agent may identify that the home node is gS for the requested coherency unit and responsively send a PI packet to the memory subsystem M. If the PI is conveyed in point-to-point mode, as shown in the illustrated example, the memory subsystem M may receive the PI packet and responsively send an INV packet to interface 148H and to any active devices within the home node that may have read access to the coherency unit. The memory subsystem may also send an ACK data packet representing the coherency unit to the interface 148H. The memory subsystem may also update the gTag for the coherency unit to gI.

When the interface 148H receives the INV address packet and the ACK data packet, the home agent in the interface 148H may send a Prack coherency message (not shown) to the request agent in interface 148H and a Slave Invalidate message to each slave node 140S that may have a valid shared copy of the coherency unit. The home agent may include a count in the Prack coherency message indicating how many nodes received Slave Invalidate messages. Note that if the requesting node is not the same node as the home node and the requesting node is gS, the slave agent in the requesting node may also be sent a Slave Invalidate message.

Note that if the home agent instead identifies the home node as gM for the requested coherency unit, the home agent may send a PIM packet on the address network and, in response to receiving the ACK, PIM (in BC mode), or the ACK, WAIT, and INV (in PTP mode), send a Prack coherency message to the request agent in interface 148H. If the home node is gI, the home agent may send a Slave WS to the gm node for the coherency unit and a Prn coherency message to the request agent.

The interface 148S in slave node 140S receives the Slave Invalidate message from the home node 140H and responsively sends a PI message on the address network in slave node 140S. In this example, the PI is conveyed in BC mode in node 140S. In response to the PI, active device D2 transitions its read access right to invalid. In response to receiving the PI, the interface 148S sends to the requesting node 140H an Ack coherency message indicating that shared copies of the coherency unit in slave node 140S have been invalidated.

In this example, the request agent in the home node waits to send a PRACK data packet to the initiating device D1 until receiving a number of Ack coherency messages equal to the number indicated in the Prack coherency message received from the home agent. Upon receiving the requisite number of Acks, the interface 148H sends a PRACK data packet to the initiating device, granting the initiating device the A (All Write) access right to the coherency unit. The initiating device responsively sends a DATA packet containing an updated copy of the coherency unit to the interface 148H. In response to the DATA packet, the request agent in the interface 148H sends a Data/Acknowledgment coherency message (not shown) to the home agent in interface 148H. In turn, the home agent may send a PMW to home memory M to update the gTag of the home node to gM and to update the memory subsystem's copy of the coherency unit. In response to the PMW, the memory subsystem M sends a PRN, causing the interface 148H to send a DATAM packet containing the updated copy of the coherency unit received from D1 and the new global information for the coherency unit. The home agent in interface 148H may release the lock on the coherency unit upon completion of the WS transaction.

Remote-Type Address Packets

Although the above description notes that in some embodiments, active devices may not be aware of whether they are included in multi-node systems and/or aware of which coherency units are LPA, embodiments are contemplated in which active devices are aware of both of these conditions. In some such embodiments, active devices may be configured to initiate different types of transactions dependent on whether the active devices are included in multi-node systems and/or whether the coherency unit being requested is an LPA coherency unit. For example, an active device may initiate WS, WB, and WBS transactions using different types of packets depending on whether the active device is included in a multi-node system. If the active device is included in a single node system, the active device may initiate WS, WB, and WBS transactions by sending packets having command encodings of WS, WB, and WBS as described above. If the active device is instead included in a multi-node system, the active device may initiate the same transactions using an appropriate one of the "remote" command encodings shown in FIG. 39.

In FIG. 39, three remote packet types are shown: RWB, RWBS, and RWS. Remote packet types are used by active devices in multi-node systems in some embodiments. A RWB, or Remote WB, packet includes a RWB command encoding. The RWB command encoding differs from the WB command encoding that an active device may be configured to use when included in a single node system. In some embodiments, an active device in a multi-node system may only use the RWB type of packet when the active device is initiating a WB for a non-LPA coherency unit. If the active device is initiating a WB for an LPA coherency unit, the active device may use the non-remote WB type of packet.

The RWBS, or remote write back shared, packet includes a RWBS command encoding. The RWBS type of packet may be used in a multi-node system to initiate a write back shared transaction in which a shared access right to the coherency unit is retained by the initiating device upon completion of the write back shared transaction. As with the RWB packet, in some embodiments, an active device in a multi-node system may only use the RWBS type of packet when the active device is initiating a WBS for a non-LPA coherency unit. If the active device is initiating a WBS for an LPA coherency unit, the active device may use the non-remote WBS type of packet.

The RWS, or remote WS, packet includes a RWS command encoding. The RWS type of packet may be used by an active device whenever the active device detects that the active device is included in a multi-node system. The active device may use the RWS type of packet whenever included in a multi-node system, regardless of whether the requested coherency unit is LPA or non-LPA in the active device's node.

The interface 148 in the same node as the active device initiating a RWB, RWBS, or RWS may be configured to send a coherency message to the home node for the specified coherency unit in response to receiving the RWB, RWBS, or RWS type of packet. All other non-interface client devices, including the initiating active device, may ignore remote-type address packets, and thus these types of address packets may be considered to be conveyed in a logical point-to-point mode by the address network. Accordingly, remote-type address packets do not cause changes in ownership or in access rights at any client device.

In response to receiving a remote-type packet, the interface 148 may send a coherency message indicating the remote-type transaction to the home node. The home node may responsively lock the specified coherency unit and send one or more coherency messages to the requesting node and any other slave nodes whose participation in the transaction may be necessary. In response to receiving a responsive coherency message from the home node, the interface 148 in the requesting node may send a proxy address packet and, in RWS transactions, a data packet to effect the desired coherency activity within the requesting node. In the case of a RWB, the interface 148 may send a PRTOM (or a PRTSM if a RWBS is requested) to invalidate shared copies within the node, to remove ownership, and to obtain a DATA packet corresponding to the coherency unit. Note that unlike in a non-remote WB transaction, a RWB that uses a PRTOM (or RWBS that uses a PRTSM) may avoid situations in which the write back can be NACKed. Thus, if another active device has gained ownership of the coherency unit before the interface sends the PRTOM in response to the RWB, the PRTOM may remove ownership from the new owner of the coherency unit, not from the active device that initiated the RWB. In WS transactions, the interface 148 may send a PI or PIM address packet (depending on the gTag of the requesting node). Upon receiving the PI or PIM packet (indicating that any other copies of the coherency unit have been invalidated) and receiving a token representing the coherency unit (either from an owning device within the node or from the gM node), the interface may send a PRACK data packet to the initiating device. In response to the PRACK, the requesting device gains the A access right to the coherency unit and sends a DATA packet containing the updated coherency unit to the interface. Upon receiving a DATA packet in RWS, RWB, and RWBS transactions, the interface 148 may send a coherency message containing the data and acknowledging satisfaction of the remote-type transaction to the home node so that the home node can update its copy of the coherency unit and/or global information for the coherency unit. The home node may also release the lock on the coherency unit in response to the coherency message from the requesting node.

In RWB and RWBS transactions, the proxy address packet sent by the interface 148 may have a different transaction ID than the RWB or RWBS packet sent by the initiating device. As a result, the requesting device may be unable to match the proxy address packet sent by the interface to the earlier transaction. As a result, the initiating device may be configured to deallocate resources allocated to the RWB or RWBS transaction and reuse the unique transaction ID assigned to the RWB or RWBS as soon as the initiating device loses ownership of the specified coherency unit. While the initiating device may lose ownership of the coherency unit in response to the proxy address packet sent by the interface, the initiating device may also lose ownership before receiving the proxy address packet. For example, if another active device initiates an RTO for the coherency unit before the interface sends the proxy address packet, the initiating active device may lose ownership upon receiving the RTO.

FIG. 40 illustrates how a RWB transaction may be performed, according to one embodiment. This example illustrates a requesting node 140R and the home node 140H for the requested coherency unit. The requesting node 140R includes an initiating active device D1 that currently has write access to and ownership of the coherency unit. The requesting node 140R also includes a second active device D2 that has neither access to nor ownership of the coherency unit and an interface 148R. The global access state of the coherency unit is gM in the requesting node 140R before the RWB transaction. The home node 140H includes an interface 148H and a memory M that maps the coherency unit. The global access state of the coherency unit is gI in the home node prior to the RWB transaction.

The initiating active device D1 initiates the RWB by sending a RWB packet on the address network. D1 may use a RWB type packet to initiate the transaction in response to determining that the device D1 is included in a multi-node system (e.g., as indicated by a setting in a mode register included in D1) and that the coherency unit is not LPA in node 140R (e.g., as indicated by the coherency unit's address). The address network in the requesting node 140R may convey the RWB address packet in broadcast mode since the RWB packet specifies a non-LPA coherency unit. However, the RWB is logically seen as a point-to-point communication to the interface 148R since devices D1 and D2 (and all other client devices other than interface 148R) in node 140R ignore the RWB packet.

The interface 148R may receive the logically point-to-point RWB and create a corresponding record in its outstanding transaction queue. When the record is handled, the interface 148R may send a coherency message, Home RWB, to the home node 140H. The interface 148H in the home node 140H receives the Home RWB coherency message and acquires a lock on the specified coherency unit. The interface 148H in the home node 140H determines that the requesting node 140R is the gM node for the coherency unit (e.g., by accessing interface 148H's global information cache and/or by communicating with the home memory subsystem M) and responsively sends a Slave RTO coherency message to the requesting node 140R. Interface 148H may include an indication of the gTag of the coherency unit in the requesting node 140R so that the interface 148R will know to send a PRTOM packet.

In response to the Slave RTO coherency message, the interface 148R sends a PRTOM packet on the address network of the requesting node 140R (note that although not shown, the PRTOM may also be conveyed to D2). Upon receipt of the PRTOM, D1 loses ownership of the coherency unit and commits to sending a DATA packet containing the coherency unit to the interface 148R. D1 may reuse the transaction ID used in the RWB packet upon losing ownership of the coherency unit. Also, upon losing ownership, D1 may reuse any resources allocated to the RWVB (unless those resources are needed to send the DATA packet, in which case those resources may be reallocated upon sending the DATA packet). In response to sending the DATA packet, D1 loses write access to the coherency unit. Upon receiving the PRTOM and the DATA packet, the interface 148R sends a Data/Acknowledgment coherency message to the home node 140H that acknowledges completion of the Slave RTO substransaction within the requesting node 140R and provides a copy of the coherency unit.

Upon receiving the Data/Acknowledgment coherency message from interface 148R, interface 148H may send a PMW to the home memory subsystem M to update the gTag of the home node to gM and to update the copy of the coherency unit in the home memory subsystem. The memory subsystem M may respond with a PRN data packet, causing the interface 148H to send a responsive DATAM packet containing the updated copy of the coherency unit and the new global information for the coherency unit. The interface 148H may also update information in its global information cache to indicate that the home node is the gM node for the coherency unit. The interface 148H may release a lock on the coherency unit upon completion of the RWB transaction.

Note that if, prior to the interface sending the PRTOM, D1 received an RTO packet sent by D2, ownership would transfer from D1 to D2. When interface 148R sent the PRTOM, D1 would not respond (having already given up ownership). Instead, D2 would lose ownership of the coherency unit upon receipt of the PRTOM and commit to sending a DATA packet.

If D1 initiates a RWBS instead of a RWB, the transaction may proceed similarly to the RWB transaction illustrated in FIG. 40. However, instead of sending a Slave RTO, the interface 148H in the home node 140H may send a Slave RTS to the requesting node 140R. Accordingly, interface 148R may send a PRTSM instead of a PRTOM. Upon receipt of the PRTSM, the initiating device still loses ownership of the coherency unit. However, upon sending the DATA packet containing the coherency unit, D1 transitions its access right to read access instead of invalid access. Additionally, the gTag of the home node is updated to gS instead of gM.

Figure 41:
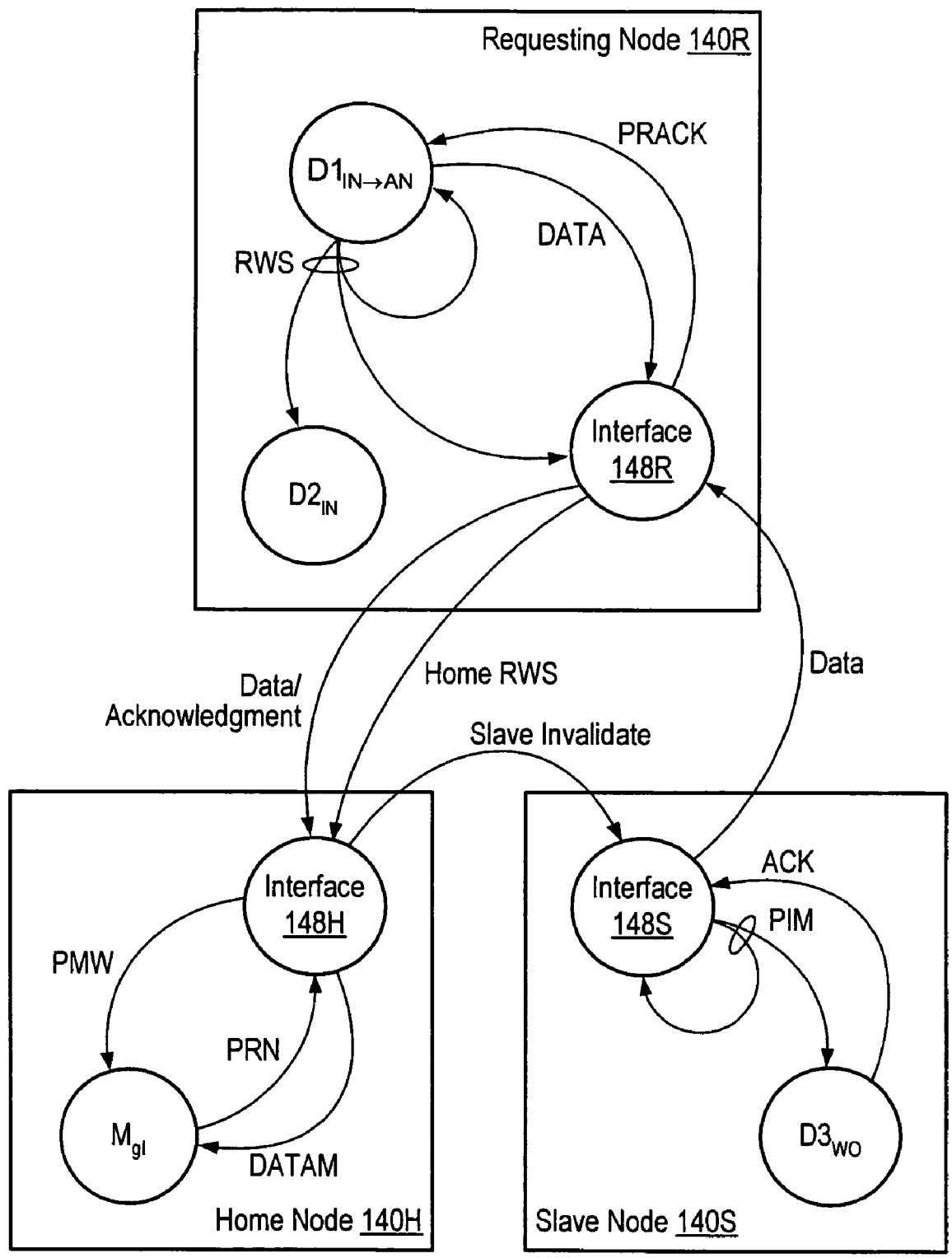
FIG. 41 shows an exemplary RWS transaction, according to one embodiment.

FIG. 41 illustrates how a RWS transaction may be performed in one embodiment. FIG. 41 illustrates three nodes, requesting node 140R, home node 140H, and slave node 140S. Before the RWS transaction, the requested coherency unit is gI in the requesting node 140R, gI in the home node 140H, and gm in slave node 140S. Requesting node 140R includes two active devices, D1 and D2, and an interface 148R. Home node 140H includes the coherency unit's home memory subsystem M and an interface 148H. Slave node 140S includes an interface 148S and an active device D3 that has ownership of and write access to the coherency unit.

D1 initially has neither ownership of nor access to the coherency unit. D1 initiates a RWS transaction by sending a RWS address packet on the address network. D1 initiates a remote-type WS, as opposed to a non-remote-type WS, in response to determining that D1 is included in a multi-node system (e.g., in response to a setting in a mode register included in D1). The RWS address packet is conveyed logically point-to-point to the interface 148R and is accordingly ignored by all client devices in the requesting node 140R other than the interface 148R. The interface 148R creates a record in its outstanding transaction queue corresponding to the RWS packet upon receiving the RWS.

When interface 148R handles the record corresponding to the RWS, interface 148R sends a coherency message, Home RWS, to the home node 140H for the requested coherency unit. The interface 148H in the home node 140H obtains a lock on the specified coherency unit in response to the Home RWS coherency message. The interface 148H may also determine which nodes should participate in the RWS (e.g., by sending a PMR to memory subsystem M to obtain global information associated with the coherency unit or by accessing a global information cache included in the interface 148H). The interface 148H may send coherency messages to each node having a valid copy of the specified coherency message in order to invalidate those copies. In this example, slave node 140S is the gM node for the coherency unit, and thus that is the only node in which copies need to be invalidated. Accordingly, interface 148H sends a Slave Invalidate coherency message to node 140S. If a valid copy of the coherency unit had also existed in the home node (e.g., if the home node was gS instead of gI), the interface 148H may send a PIM address packet to invalidate local copies of the coherency unit within home node 140H and to obtain an ACK data packet representing the coherency unit. Similarly, if valid copies of the coherency unit had existed in multiple other gS nodes, the interface 148H may send a Data +Count coherency message to the requesting node indicating that number of invalidation Acks the requesting node should receive before sending a ACK data packet to the initiating device D1 and containing a data token representing the requested coherency unit.

Interface 148S in slave node 140S receives the Slave Invalidate message from the home node 140H and responsively sends a PIM address packet on slave node 140S's address network. Upon receipt of the PIM, owning device D3 loses its ownership responsibility for the coherency unit and commits to sending an ACK packet representing the coherency unit to interface 148S. Upon sending the ACK packet, device D3 transitions its write access right to invalid. Upon receiving the PIM and the ACK, interface 148H sends an Ack coherency message containing a token representing the coherency message to the requesting node 140R.

In response to the Ack coherency message representing the coherency unit and indicating that other copies of the coherency unit in other nodes have been invalidated, interface 148 may send a PRACK (combination PRN and ACK) data packet to the initiating device D1. Upon receipt of the PRACK, the initiating device D1 gains A (All Write) access to the coherency unit and commits to sending a DATA packet containing an updated copy of the coherency unit to the interface 148R. In response to the DATA packet, the interface 148R sends a Data/Acknowledgment coherency message to the home node 140H indicating that the RWS has been satisfied within the requesting node 140R and containing the updated copy of the coherency unit.

In response to the Data/Acknowledgment coherency message from the requesting node 140R, interface 148H may send a PMW to the home memory subsystem M to update the gTag for the coherency unit in the home node to gM and to update the memory subsystem's copy of the coherency unit. The memory subsystem M may respond with a PRN data packet, causing the interface 148H to send a responsive DATAM packet containing the updated copy of the coherency unit and the new global information for the coherency unit. Upon completion of the RWS transaction, the interface 148H may release a lock on the coherency unit.

Note that if the requesting node 140R had been a gS node for the requested coherency unit when the RWS was initiated, interface 148H may send a Slave Invalidate coherency message to the slave agent in interface 148R, causing interface 148R to send a PI address packet to invalidate shared copies. The Slave Invalidate coherency message sent to the requesting node 140R may also contain a token representing the coherency unit and indicate the number of other nodes sent Slave Invalidate coherency messages. In such a situation, interface 148R may not send the PRACK to the initiating device until receipt of the PI and receipt of Ack coherency messages from each other node sent a Slave Invalidate coherency message.

Promise Arrays within Active Devices in a Multi-Node System

As mentioned above in the description of a single node system, each active device may maintain a promise array indicating requests for which that active device is responsible for responding with a copy of a requested coherency unit. In some embodiments of a multi-node system, an active device may be configured to allocate storage in the promise array for an additional promise per interface per coherency unit within the active device's node in order to avoid deadlock situations that may arise if inter-dependent transactions or subtransactions are pending in different nodes. For example, looking back at FIG. 15, an active device may include a fully-sized promise array 904 that, for each outstanding local transaction initiated by that active device to gain ownership of a coherency unit, has storage for one promise for each other active device and interface within the same node as that active device. As used herein, a promise is information identifying a data packet to be conveyed to another device in response to a pending local transaction involving a coherency unit for which the active device has an ownership responsibility.

In alternative embodiments, each active device's promise array 904 may be less than fully-sized. In such embodiments, each active device may be configured to assert flow control on one of the address network's virtual networks (e.g., on the Request Network) in the event promise array 904 becomes full (e.g., as indicated when the promise array stores a threshold number of promises) and is (or will soon be) unable to store additional information corresponding to additional data promises. Furthermore, another virtual address network, the Interface Request Network, may be implemented. The Interface Request Network may convey proxy packets sent by interfaces. As noted above, active devices may be able to assert flow control on the non-interface Request Network. In some embodiments, active devices may not assert flow control on the Interface Request Network. In other embodiments, active devices may assert flow control on the Interface Request Network but must be able to deassert flow control to the Interface Request Network even if the non-interface Request Network remains flow controlled. Since flow control on the Interface Request Network may either be prohibited or implemented independently of flow control on the non-interface Request Network, requests that need to be sent in a first node in order to satisfy a transaction in another node may be sent on the Interface Request Network, even if an active device in the first node is flow controlling the non-interface Request Network. By allowing proxy packets to progress when the Request Network is flow controlled, deadlock may be avoided.

Numerous variations and modifications will become apparent to those skilled in the art once the above disclosure is fully appreciated. It is intended that the following claims be interpreted to embrace all such variations and modifications.

What is claimed is:

1. A system, comprising:
a plurality of nodes coupled by an inter-node network, wherein each node includes a plurality of active devices, a memory subsystem, and an address network and a data network respectively configured to convey address packets and data packets between the plurality of active devices and the memory subsystem;
wherein a memory subsystem included in a node of the plurality of nodes is configured to maintain a response indication indicating whether the memory subsystem should send a data packet corresponding to a coherency unit in response to receiving from an active device in the node an address packet requesting an access right to the coherency unit;
wherein the node is configured to store a node identifier for the coherency unit, wherein the node identifier identifies a different node of the plurality nodes in which the coherency unit is in a modified global access state.

2. The system of claim 1, wherein each node includes an interface coupled to send and receive coherency messages on the inter-node network, wherein an interface included in the node is configured to store the node identifier for the coherency unit.

3. The system of claim 2, wherein the interface is configured to store the node identifier in a global information cache that includes storage for a plurality of node identifiers for a plurality of coherency units.

4. The system of claim 2, wherein the interface included in the node is further configured to store a global access state of the coherency unit in the node.

5. The system of claim 2, wherein in response to a coherency message sent by another one of the plurality of nodes requesting an access right to the coherency unit, the interface included in the node is configured to access the node identifier and to responsively send an additional coherency message to an interface included in the different node.

6. The system of claim 5, wherein in response to receiving yet another coherency message acknowledging that the other one of the plurality of nodes gained the access right to the coherency unit, the interface included in the node is configured to update the node identifier to identify the other one of the plurality of nodes if an active device included in the other one of the plurality of nodes gained write access to the coherency unit.

7. The system of claim 6, wherein if the interface included in the node updates the node identifier, the interface is configured to send an address packet indicating a new value of the node identifier to the memory subsystem included in the node.

8. The system of claim 2, wherein the memory subsystem is configured to update the response indication in response to receiving address packets from active devices included in the node.

9. The system of claim 8, wherein the memory subsystem is configured to update the response indication to indicate that the memory subsystem should not respond to address packets requesting an access right to the coherency unit in response to receiving an address packet requesting a write access right to the coherency unit from one of the active devices included in the node.

10. The system of claim 8, wherein the memory subsystem is configured to update the response indication to indicate that the memory subsystem should respond to address packets requesting an access right to the coherency unit in response to receiving an address packet requesting to write a new value of the coherency unit to the memory subsystem.

11. The system of claim 8, wherein the memory subsystem is configured to not update the response indication in response to address packets requesting a shared access right to the coherency unit.

12. The system of claim 8, wherein the memory subsystem is configured to send a packet corresponding to the address packet to the interface included in the node if:
the response indication indicates that the memory should not respond;
the coherency unit is in a shared global access state in the node; and
the address packet requests write access to the coherency unit.

13. The system of claim 12, wherein in response to the packet corresponding to the address packet, the interface is configured to send a coherency message requesting write access to the coherency unit to the different node identified by the node identifier.

14. The system of claim 8, wherein the memory subsystem is configured to send a packet corresponding to the address packet to the interface included in the node if:
the response indication indicates that the memory should not respond; and
the coherency unit is in an invalid global access state in the node.

15. The system of claim 1, wherein the node is configured to update the node identifier in response to receiving coherency messages from other ones of the plurality of nodes via the inter-node network.

16. The system of claim 1, wherein an active device that sends the address packet specifying the coherency unit gains the access right to the coherency unit in response to receiving the data packet from the memory subsystem if the memory subsystem sends the data packet.

17. A node for use in a multi-node computer system, the node comprising:
a plurality of client devices including a memory subsystem, an active device, and an interface configured to send and receive coherency messages on an inter-node network coupling nodes in the multi-node computer system;
an address network configured to convey address packets between the plurality of client devices;
a data network configured to convey data packets between the plurality of client devices;
wherein the memory is configured to maintain a response indication indicating whether the memory should send a data packet corresponding to a coherency unit on the data network in response to receiving an address packet requesting an access right to the coherency unit from the active device;
wherein the node is configured to store a node identifier for the coherency unit, wherein the node identifier identifies a different node in the multi-node system in which the coherency unit is in a modified global access state.

18. The node of claim 17, wherein the interface is configured to store the node identifier for the coherency unit.

19. The node of claim 18, wherein the interface is configured to store the node identifier in a global information cache that includes storage for a plurality of node identifiers for a plurality of coherency units.

20. The node of claim 18, wherein the interface included in the node is further configured to store a global access state of the coherency unit in the node.

21. The node of claim 18, wherein in response to receiving a coherency message sent by another one of the nodes requesting an access right to the coherency unit, the interface is configured to access the node identifier and to responsively send an additional coherency message to an interface included in the different node.

22. The node of claim 21, wherein in response to receiving yet another coherency message acknowledging that the other one of the plurality of nodes gained the access right to the coherency unit, the interface is configured to update the node identifier to identify the other one of the plurality of nodes if an active device included in the other one of the plurality of nodes gained write access to the coherency unit.

23. The node of claim 22, wherein if the interface updates the node identifier, the interface is configured to send an address packet indicating a new value of the node identifier to the memory subsystem.

24. The node of claim 17, wherein the memory subsystem is configured to update the response indication in response to receiving address packets from one or more active devices included in the node.

25. The node of claim 24, wherein the memory subsystem is configured to update the response indication to indicate that the memory subsystem should not respond to address packets requesting an access right to the coherency unit in response to receiving an address packet requesting a write access right to the coherency unit from one of the one or more active devices.

26. The node of claim 24, wherein the memory subsystem is configured to update the response indication to indicate that the memory subsystem should respond to address packets requesting an access right to the coherency unit in response to receiving an address packet requesting to write a new value of the coherency unit to the memory subsystem.

27. The node of claim 24, wherein the memory subsystem is configured to not update the response indication in response to address packets requesting a shared access right to the coherency unit.

28. The node of claim 24, wherein the memory subsystem is configured to send a packet corresponding to the address packet to the interface if:
the response indication indicates that the memory should not respond;
the coherency unit is in a shared global access state in the node; and
the address packet requests write access to the coherency unit.

29. The node of claim 28, wherein in response to the packet corresponding to the address packet, the interface is configured to send a coherency message requesting write access to the coherency unit to the different node identified by the node identifier.

30. The node of claim 24, wherein the memory subsystem is configured to send a packet corresponding to the address packet to the interface if:
the response indication indicates that the memory should not respond; and
the coherency unit is in an invalid global access state in the node.

31. The node of claim 17, wherein the node is configured to update the node identifier in response to the interface receiving coherency messages from other nodes in the multi-node system.

32. The node of claim 17, wherein the active device that sends the address packet specifying the coherency unit gains the access right to the coherency unit in response to receiving the data packet from the memory subsystem if the memory subsystem sends the data packet.

33. A method of operating a multi-node computer system, wherein the multi-node computer system includes a plurality of nodes coupled by an inter-node network, wherein each node includes an active device, a memory subsystem, and an address network coupling the active device and the memory subsystem, the method comprising:
a memory subsystem included in a node of the plurality of nodes receiving from an active device included in the node an address packet requesting an access right to a coherency unit;
in response to said receiving, the memory subsystem sending a responsive data packet to the active device dependent on response indication associated with the coherency unit;
the node sending a coherency message requesting the access right to a different node of the plurality of nodes in response to a node identifier identifying the different node as a node in which the coherency unit is in a modified global access state.

34. The method of claim 33, further comprising an interface included in the node storing the node identifier for the coherency unit and sending the coherency message to the different node.

35. The method of claim 34, wherein said storing comprises the interface storing the node identifier in a global information cache that includes storage for a plurality of node identifiers for a plurality of coherency units.

36. The method of claim 34, further comprising the interface storing a global access state of the coherency unit in the node.

37. The method of claim 34, further comprising:
in response to receiving a coherency message sent by another one of the nodes requesting an access right to the coherency unit, the interface sending an additional coherency message to an interface included in the different node identified by the node identifier.

38. The method of claim 37, further comprising:
in response to receiving yet another coherency message acknowledging that the other one of the plurality of nodes gained the access right to the coherency unit, the interface updating the node identifier to identify the other one of the plurality of nodes if an active device included in the other one of the plurality of nodes gained write access to the coherency unit.

39. The method of claim 38, further comprising the interface sending an address packet indicating a new value of the node identifier to the memory subsystem if the interface updates the node identifier.

40. The method of claim 34, further comprising the memory subsystem updating the response indication in response to receiving address packets from one or more active devices included in the node.

41. The method of claim 40, wherein said updating comprises updating the response indication to indicate that the memory subsystem should not respond to address packets requesting an access right to the coherency unit in response to receiving an address packet requesting a write access right to the coherency unit from one of the one or more active devices.

42. The method of claim 40, wherein said updating comprises updating the response indication to indicate that the memory subsystem should respond to address packets requesting an access right to the coherency unit in response to receiving an address packet requesting to write a new value of the coherency unit to the memory subsystem.

43. The method of claim 40, further comprising not updating the response indication in response to address packets requesting a shared access right to the coherency unit.

44. The method of claim 40, further comprising the memory subsystem sending a packet corresponding to the address packet to the interface if:
the response indication indicates that the memory should not respond;
the coherency unit is in a shared global access state in the node; and
the address packet requests write access to the coherency unit.

45. The method of claim 44, further comprising the interface sending a coherency message requesting write access to the coherency unit to the different node identified by the node identifier in response to receiving the packet corresponding to the address packet.

46. The method of claim 40, further comprising the memory subsystem sending a packet corresponding to the address packet to the interface if:
the response indication indicates that the memory should not respond; and
the coherency unit is in an invalid global access state in the node.

47. The method of claim 33, further comprising the node updating the node identifier in response to the interface receiving coherency messages from other nodes in the multi-node system.

48. The method of claim 33, further comprising the active device that sends the address packet specifying the coherency unit gaining the access right to the coherency unit in response to receiving the data packet from the memory subsystem if the memory subsystem sends the data packet.

* * * * *